(12) United States Patent
Chiou

(10) Patent No.: US 10,131,842 B2
(45) Date of Patent: Nov. 20, 2018

(54) LIQUID CRYSTAL ALIGNMENT AGENT, LIQUID CRYSTAL ALIGNMENT FILM, AND LIQUID CRYSTAL DISPLAY ELEMENT

(71) Applicant: Chi Mei Corporation, Tainan (TW)

(72) Inventor: Shin-Rong Chiou, Kaohsiung (TW)

(73) Assignee: Chi Mei Corporation, Tainan (TW)

( * ) Notice: Subject to any disclaimer, the term of this patent is extended or adjusted under 35 U.S.C. 154(b) by 23 days.

(21) Appl. No.: 15/361,013

(22) Filed: Nov. 24, 2016

(65) Prior Publication Data

US 2017/0152443 A1   Jun. 1, 2017

(30) Foreign Application Priority Data

Dec. 1, 2015 (TW) .............................. 104140038 A

(51) Int. Cl.
C09K 19/56 (2006.01)
C08L 79/08 (2006.01)
G02F 1/1337 (2006.01)

(52) U.S. Cl.
CPC .............. *C09K 19/56* (2013.01); *C08L 79/08* (2013.01); *G02F 1/133719* (2013.01); *G02F 1/133723* (2013.01); *G02F 1/133788* (2013.01); *G02F 2202/022* (2013.01)

(58) Field of Classification Search
CPC ............... C09K 19/56; G02F 1/133723; G02F 1/133719; G02F 1/133788; G02F 2202/022; C08L 79/08
See application file for complete search history.

(56) References Cited

U.S. PATENT DOCUMENTS

| | | | | |
|---|---|---|---|---|
| 8,304,031 B2* | 11/2012 | Akiike | ................... | C08G 77/38 427/489 |
| 8,730,437 B2* | 5/2014 | Hsueh | ................ | C08G 73/1032 349/124 |
| 9,188,812 B2* | 11/2015 | Tsai | .................. | G02F 1/133723 |
| 9,404,041 B2* | 8/2016 | Chiou | ............... | G02F 1/133723 |
| 9,644,147 B2* | 5/2017 | Chiou | .................... | C09K 19/56 |
| 2011/0105700 A1* | 5/2011 | Akiike | .................. | C09K 19/56 525/449 |
| 2013/0158208 A1* | 6/2013 | Yang | ...................... | C08G 73/16 525/421 |

FOREIGN PATENT DOCUMENTS

| | | |
|---|---|---|
| CN | 104178181 | 12/2014 |
| JP | 2005037654 | 2/2005 |
| JP | 2009520702 | 5/2009 |
| JP | 2011084724 | 4/2011 |
| JP | 2015022313 | 2/2015 |
| JP | 2015179158 | 10/2015 |
| TW | 200736214 | 10/2007 |
| TW | 201033253 | 9/2010 |
| TW | 201033253 A * | 9/2010 |
| TW | 201113328 | 4/2011 |
| TW | 201444887 | 12/2014 |
| TW | 201502170 | 1/2015 |
| TW | 201504281 | 2/2015 |
| WO | 2014189104 | 11/2014 |

OTHER PUBLICATIONS

"Office Action of Taiwan Counterpart Application," dated Aug. 14, 2017, p. 1-p. 6.
"Office Action of Japan Counterpart Application," dated Nov. 21, 2017, p. 1-p. 5.

* cited by examiner

*Primary Examiner* — Robert S Jones
(74) *Attorney, Agent, or Firm* — JCIPRNET

(57) ABSTRACT

A liquid crystal alignment agent allowing formation of an LCD element having good reliability and less residual image, a liquid crystal alignment film, and an LCD element having the liquid crystal alignment film are shown. The liquid crystal alignment agent includes a polymer (A), a photosensitive polysiloxane (B), and a solvent (C). The polymer (A) is obtained by reacting a mixture that includes a tetracarboxylic dianhydride component (a-1) and a diamine component (a-2). The photosensitive polysiloxane (B) is obtained by reacting a polysiloxane (b-1) having an epoxy group with a cinnamic acid derivative (b-2) and an aromatic heterocyclic derivative (b-3) containing nitride, oxide or sulfide.

10 Claims, 1 Drawing Sheet

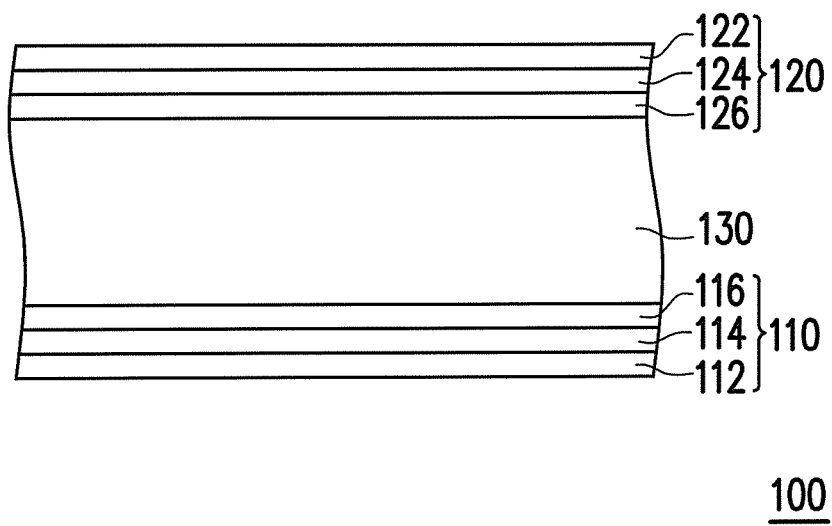

LIQUID CRYSTAL ALIGNMENT AGENT, LIQUID CRYSTAL ALIGNMENT FILM, AND LIQUID CRYSTAL DISPLAY ELEMENT

CROSS-REFERENCE TO RELATED APPLICATION

This application claims priority benefits of Taiwan application serial no. 104140038, filed on Dec. 1, 2015. The entirety of the above-mentioned patent application is hereby incorporated by reference herein and made a part of this specification.

BACKGROUND OF THE INVENTION

Field of the Invention

The invention relates to a liquid crystal alignment agent, a liquid crystal alignment film, and a liquid crystal display (LCD) element. More particularly, the invention relates to a liquid crystal alignment agent allowing formation of an LCD element having good reliability and less residual image, a liquid crystal alignment film formed by the liquid crystal alignment agent, and an LCD element having the liquid crystal alignment film.

Description of Related Art

The LCD is widely applied in, e.g., television and various monitors. LCD elements having the following types of liquid crystal cell are known: twisted nematic (TN)-type, super-twisted nematic (STN)-type, in-plane switching (IPS)-type, and fringe field switching (FFS)-type that changes the electrode structures of IPS-type, etc. and increases brightness by increasing the aperture ratio of the display part.

The following methods are known for aligning the liquid crystals of these liquid crystal cells: forming an organic film such as a liquid crystal alignment film on the surface of the substrate and using a cloth material such as rayon to rub the surface of the organic film in a certain direction, depositing silicon oxide on the surface of the substrate through oblique evaporation, using a Langmuir-Blodgett (LB) method to form a monomolecular film having long-chain alkyl groups, and so on. In particular, from the viewpoint of the substrate size, the uniformity of liquid crystal alignment, the treatment time, and the treatment cost, a rubbing treatment is most commonly used.

However, if a rubbing treatment is used to perform liquid crystal alignment, dust may adhere to the surface of the alignment film due to the dust or static electricity generated during the process, thus causing poor display. In particular, for a substrate having thin film transistors (TFTs), the generated static electricity causes damage to the circuit of TFTs, thus reducing the yield. Moreover, for the LCD element will become more and more delicate, with the densification of the pixels, the surface of the substrate becomes uneven, and therefore it is difficult to perform a uniform rubbing treatment.

As a result, to avoid such undesired situation, a photoalignment method, such as that described in JP 2005-037654 A, provides liquid crystal alignment capability by irradiating polarized or non-polarized radiation on a photosensitive film. The patent literature provides a liquid crystal alignment agent that has a repeating unit containing conjugated enone and has an imide structure. Thereby, static electricity and dust are not generated, and therefore uniform liquid crystal alignment can be achieved. Moreover, in comparison to the rubbing treatment, the method can precisely control the direction of liquid crystal alignment in any direction. Furthermore, by using, e.g., a photomask in the radiation irradiation, a plurality of regions having different directions of liquid crystal alignment can be formed on one substrate in any manner.

However, the LCD element obtained from the liquid crystal alignment film has the drawbacks of poor reliability and having residual image, and is not acceptable to the industry. Thus, how to provide a liquid crystal alignment agent capable of forming a liquid crystal alignment film having good reliability and less residual image, such that a better display quality can be achieved when the liquid crystal alignment film formed thereby is applied in an LCD element, is an issue that need to be addressed urgently.

SUMMARY OF THE INVENTION

Accordingly, the invention provides a liquid crystal alignment agent allowing formation of an LCD element having good reliability and less residual image, a liquid crystal alignment film, and an LCD element having the liquid crystal alignment film.

The invention provides a liquid crystal alignment agent including a polymer (A), a photosensitive polysiloxane (B), and a solvent (C). The polymer (A) is obtained by reacting a first mixture that includes a tetracarboxylic dianhydride component (a-1) and a diamine component (a-2). The photosensitive polysiloxane (B) contains a functional group derived from a cinnamic acid derivative and a functional group derived from an aromatic heterocyclic derivative containing nitrogen, oxygen or sulfur.

In an embodiment of the invention, the photosensitive polysiloxane (B) is obtained by reacting a polysiloxane (b-1) containing an epoxy group, a cinnamic acid derivative (b-2), and an aromatic heterocyclic derivative (b-3) containing nitrogen, oxygen or sulfur.

In an embodiment of the invention, the polysiloxane (b-1) containing an epoxy group includes at least one of a group represented by formula (2-1), a group represented by formula (2-2), and a group represented by formula (2-3).

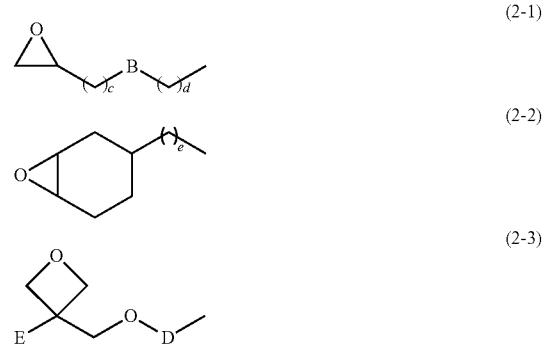

In formula (2-1), B represents —O— or a single bond, c represents an integer of 1 to 3, and d represents an integer of 0 to 6, wherein when d represents 0, B is a single bond.

In formula (2-2), e represents an integer of 0 to 6.

In formula (2-3), D represents $C_{2-6}$ alkylene, and E represents hydrogen or $C_{1-6}$ alkyl.

In an embodiment of the invention, the polysiloxane (b-1) containing an epoxy group includes a copolymer obtained from hydrolysis and partially condensation of a second mixture that includes a silane monomer (b-1-1) represented by formula (1-1).

$$Si(R^a)_p(OR^b)_{4-p} \qquad (1-1)$$

In formula (1-1), $R^a$ each independently represents hydrogen, $C_{1-10}$ alkyl, $C_{2-10}$ alkenyl, $C_{6-15}$ aryl, an alkyl group containing an epoxy group, or an alkoxy group containing an epoxy group, wherein at least one R is an alkyl group containing an epoxy group, or an alkoxy group containing an epoxy group; each $R^b$ independently represents hydrogen, $C_{1-6}$ alkyl, $C_{1-6}$ acyl, or $C_{6-15}$ is aryl; p represents an integer of 1 to 3. When p represents 2 or 3, the plurality of $R^a$ can be the same or different; when p represents 1 or 2, the plurality of $R^b$ can be the same or different.

In an embodiment of the invention, based on a total amount of 1 mole of the monomers in the $2^{nd}$ mixture, the amount of silane monomer (b-1-1) is 0.3 to 1.0 mole.

In an embodiment of the invention, the cinnamic acid derivative (b-2) is at least one compound selected from the group consisting of compounds represented by formulae (3-1) and (3-2).

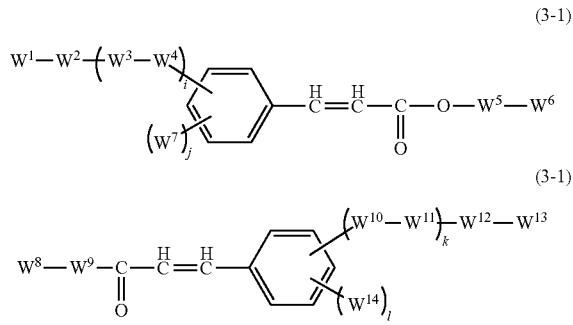

(3-1)

(3-1)

In formula (3-1), $W^1$ represents $C_{1-40}$ alkyl or a $C_{3-40}$ monovalent organic group containing an alicyclic group, wherein a part of or all of the hydrogen atoms of the alkyl group are optionally substituted by fluorine atoms; $W^2$ represents a single bond, —O—, —COO—, or —OCO—; $W^3$ represents a divalent aromatic group, a divalent alicyclic group, a divalent heterocyclic group, or a divalent fused-ring group; $W^4$ represents a single bond, —O—, —COO—, or —OCO—; $W^5$ represents a single bond, methylene, $C_{2-10}$ alkylene, or a divalent aromatic group; when $W^5$ represents a single bond, $W^6$ is hydrogen; when $W^5$ represents methylene, alkylene, or a divalent aromatic group, $W^6$ is carboxyl, hydroxyl, —SH, —NCO, —NHW, —CH=CH$_2$, or —SO$_2$Cl, wherein W represents hydrogen or $C_{1-6}$ alkyl; $W^7$ represents fluorine or cyano; i represents an integer of 0 to 3; and j represents an integer of 0 to 4.

In formula (3-2), $W^8$ represents $C_{1-40}$ alkyl or a $C_{3-40}$ monovalent organic group containing an alicyclic group, wherein a part of or all of the hydrogen atoms of the alkyl group can be substituted by fluorine atoms; $W^9$ represents —O— or a divalent aromatic group; $W^{10}$ represents —O—, —COO—, or —OCO—; $W^{11}$ represents a divalent aromatic group, a divalent heterocyclic group, or a divalent fused-ring group; $W^{12}$ represents a single bond, —OCO—(CH$_2$)$_e$—, or —O—(CH$_2$)$_g$—, wherein e and g each independently represent an integer of 1 to 10; $W^{13}$ represents carboxyl, hydroxyl, —SH, —NCO, —NHW, —CH=CH$_2$, or —SO$_2$Cl, wherein W represents hydrogen or $C_{1-6}$ alkyl; $W^{14}$ represents fluorine or cyano; k represents an integer of 0 to 3; and l represents an integer of 0 to 4.

In an embodiment of the invention, the aromatic heterocyclic derivative (b-3) containing nitrogen, oxygen or sulfur includes a compound represented by formula (4).

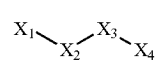

(4)

In formula (4), $X_1$ represents a functional group having reactivity to epoxy group; $X_2$ represents a single bond, or at least one divalent organic group selected from the group consisting of a $C_{1-20}$ aliphatic hydrocarbon group, a non-aromatic cyclic hydrocarbon group and an aromatic hydrocarbon group; $X_3$ represents a single bond, or at least one divalent group selected from the group consisting of —O—, —NQ$^2$-, —CONQ$^2$-, —NQ$^2$CO—, —COO—, —OCO—, —CO—, —NQ$^2$(CH$_2$)$_r$— and —O(CH$_2$)$_r$—, wherein r represents an integer of 1 to 5, $Q^2$ represents hydrogen or $C_{1-3}$ alkyl; $X^4$ represents an aromatic heterocyclic ring containing nitrogen, oxygen or sulfur.

In an embodiment of the invention, $X_1$ represents at least one monovalent organic group selected from the group consisting of HO—, HNQ$^1$-, HCONQ$^1$-, HNQ$^1$CO— and HOCO—, wherein $Q^1$ represents hydrogen or $C_{1-3}$ alkyl.

In an embodiment of the invention, based on 100 weight parts of the polymer (A), the amount of the photosensitive polysiloxane (B) is 3 to 50 weight parts; and the amount of the solvent (C) is 1000 to 8000 weight parts.

In an embodiment of the invention, the molar ratio (b-2)/(b-3) of the cinnamic acid derivative (b-2) to the aromatic heterocyclic derivative (b-3) containing nitrogen, oxygen or sulfur is 2 to 20.

The invention further provides a liquid crystal alignment film that is formed from the above liquid crystal alignment agent.

The invention further provides an LCD element that includes the above liquid crystal alignment film.

Based on the above, the liquid crystal alignment agent of the invention allows formation of an LCD element having good reliability and less residual image, such that the liquid crystal alignment agent is suitable for an LCD element.

To make the aforementioned features and advantages of the disclosure more comprehensible, embodiments accompanied with FIGURES are described in detail below.

BRIEF DESCRIPTION OF THE DRAWINGS

FIG. 1 is a cross-sectional view of an LCD element according to an embodiment of the invention.

DESCRIPTION OF THE EMBODIMENTS

<Liquid Crystal Alignment Agent>

The invention provides a liquid crystal alignment agent including a polymer (A), a photosensitive polysiloxane (B), and a solvent (C). Moreover, the liquid crystal alignment agent can further include an additive (D) if needed.

Each component of the liquid crystal alignment agent of the invention is described in detail below.

It should be mentioned that, in the following, (meth)acrylic acid represents acrylic acid and/or methacrylic acid, and (meth)acrylate represents acrylate and/or methacrylate. Similarly, (meth)acryloyl group represents acryloyl group and/or methacryloyl group.

Polymer (A)

The polymer (A) is obtained by reacting a first mixture that includes a tetracarboxylic dianhydride component (a-1) and a diamine component (a-2).

Specifically, the polymer (A) includes a polyamic acid, a polyimide, a polyimide-based block copolymer, or a combination of the polymers. In particular, the polyimide-based block copolymer includes a polyamic acid block copolymer, a polyimide block copolymer, a polyamic acid-polyimide block copolymer, or a combination of the polymers. The polyamic acid polymer, the polyimide polymer, and the polyamic acid-polyimide block copolymer can all be obtained by reacting a mixture of the tetracarboxylic dianhydride component (a-1) and the diamine component (a-2).

Tetracarboxylic Dianhydride Component (a-1)

The tetracarboxylic dianhydride component (a-1) includes an aliphatic tetracarboxylic dianhydride compound, an alicyclic tetracarboxylic dianhydride compound, an aromatic tetracarboxylic dianhydride compound, at least one of the tetracarboxylic dianhydride compounds represented by formulae (I-1) to (I-6), or a combination thereof.

Specific examples of the aliphatic tetracarboxylic dianhydride compound, the alicyclic tetracarboxylic dianhydride compound, and the aromatic tetracarboxylic dianhydride compound are listed below. However, the invention is not limited thereto.

Specific examples of the aliphatic tetracarboxylic dianhydride compound include, but are not limited to, ethane tetracarboxylic dianhydride, butane tetracarboxylic dianhydride, or a combination of the compounds.

Specific examples of the alicyclic tetracarboxylic dianhydride compound include, but are not limited to, 1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dichloro-1,2,3,4-cyclobutane tetracarboxylic dianhydride, 1,2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexyl tetracarboxylic dianhydride, cis-3,7-dibutyl-cycloheptyl-1,5-diene-1,2,5,6-tetracarboxylic dianhydride, 2,3,5-tricarboxycyclopentylacetic dianhydride, and a combination of the compounds.

Specific examples of the aromatic tetracarboxylic dianhydride compound include, but are not limited to, 3,4-dicarboxy-1,2,3,4-tetrahydronaphthalene-1-succinic dianhydride, pyromellitic dianhydride, 3,3',4,4'-benzophenone tetracarboxylic dianhydride, 3',3,4,4'-biphenylsulfone tetracarboxylic dianhydride, 1,4,5,8-naphthalene tetracarboxylic dianhydride, 2,3,6,7-naphthalene tetracarboxylic dianhydride, 3,3'4,4'-diphenylethane tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furan tetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphenyl tetracarboxylic dianhydride, 3,3',4,4'-diphenyl tetracarboxylic dianhydride, bis(phthalic acid)phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate), 2,3,4,5-tetrahydrofuran tetracarboxylic dianhydride, 1,3,3a,4,5,9b-hexahydro-5-(tetrahydro-2,5-dioxo-3-furanyl)naphtho[1,2-c]furan-1,3-dione, 1,3,3a,4,5,9b-hexahydro-5-methyl-5-(tetrahydro-2,5-dioxo-3-furanyl)naphtho[1,2-c]furan-1,3-dione, 1,3,3a,4,5,9b-hexahydro-5-ethyl-5-(tetrahydro-2,5-dioxo-3-furanyl)naphtho[1,2-c]furan-1,3-dione, 1,3,3a,4,5,9b-hexahydro-7-methyl-5-(tetrahydro-2,5-dioxo-3-furanyl)naphtho[1,2-c]furan-1,3-dione, 1,3,3a,4,5,9b-hexahydro-7-ethyl-5-(tetrahydro-2,5-dioxo-3-furanyl)naphtho[1,2-c]furan-1,3-dione, 1,3,3a,4,5,9b-hexahydro-8-methyl-5-(tetrahydro-2,5-dioxo-3-furanyl)naphtho[1,2-c]furan-1,3-dione, 1,3,3a,4,5,9b-hexahydro-8-ethyl-5-(tetrahydro-2,5-dioxo-3-furanyl)naphtho[1,2-c]furan-1,3-dione, 1,3,3a,4,5,9b-hexahydro-5,8-dimethyl-5-(tetrahydro-2,5-dioxo-3-furanyl)naphtho[1,2-c]furan-1,3-dione, 5-(2,5-dioxotetrahydrofural)-3-methyl-3-cyclohexene-1,2-dicarboxylic dianhydride, and a combination of the compounds.

The tetracarboxylic dianhydride compounds represented by formulae (I-1) to (I-6) are as shown below.

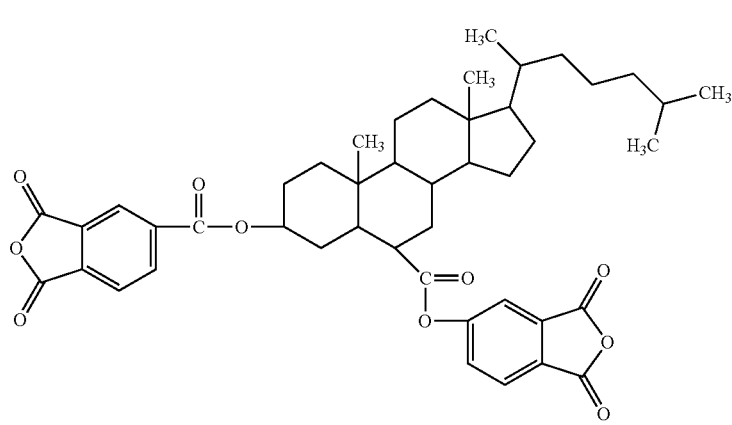

(I-1)

-continued
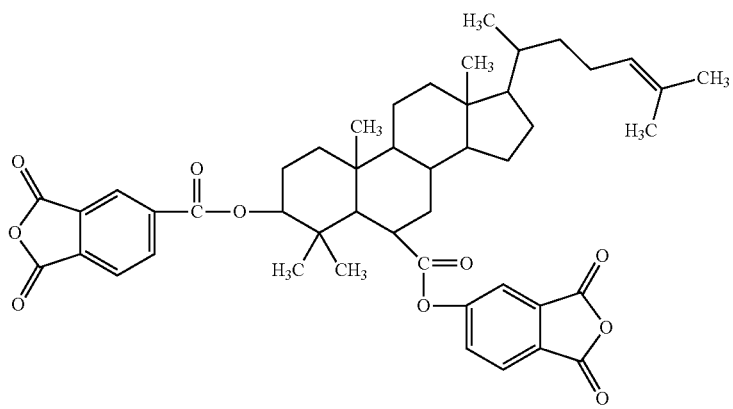
(I-2)
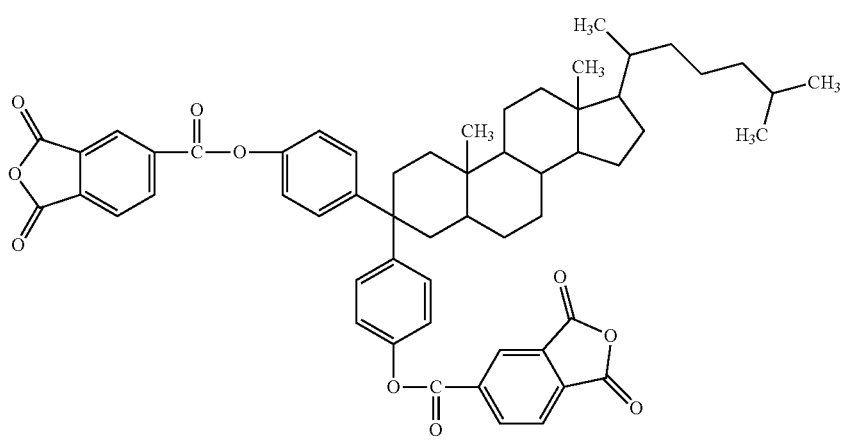
(I-3)
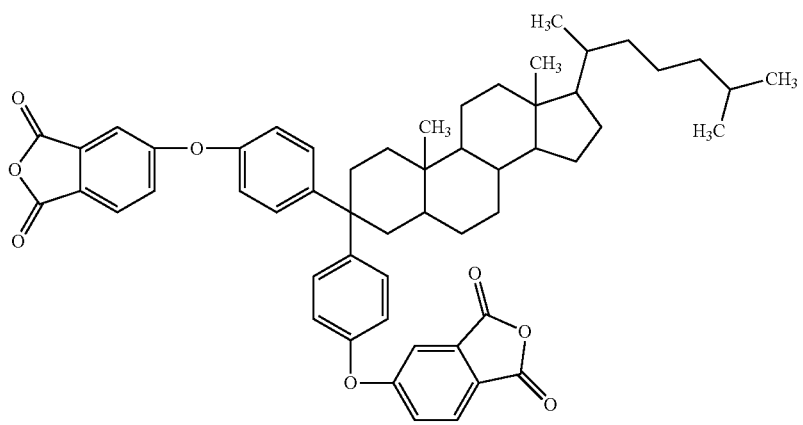
(I-4)
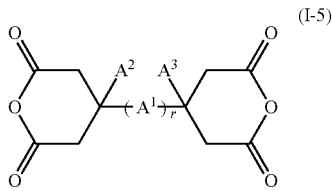
(I-5)
In formula (1-5), $A^1$ represents a divalent group containing an aromatic ring; r represents an integer of 1 to 2; $A^2$ and $A^3$ can be the same or different, and may each independently represent hydrogen or alkyl. Specific examples of tetracarboxylic dianhydride compounds of formula (I-5) include at least one of the compounds of formulae (I-5-1) to (I-5-3).

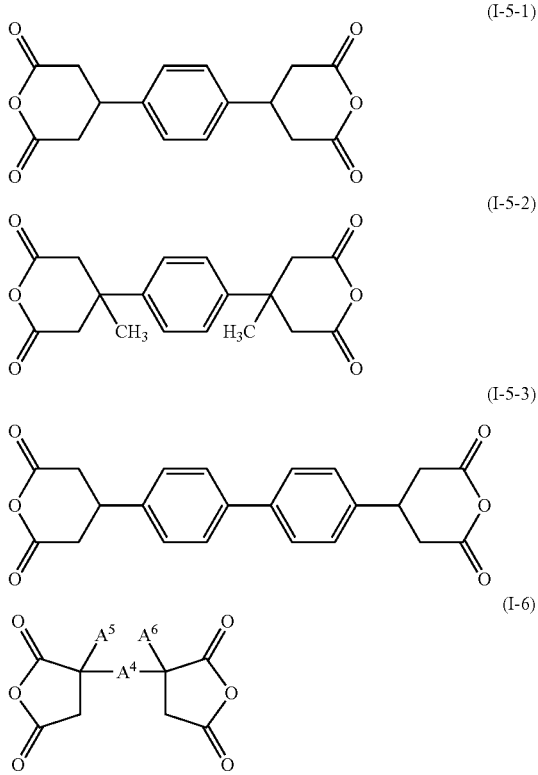

(I-5-1)

(I-5-2)

(I-5-3)

(I-6)

In formula (I-6), $A^4$ represents a divalent group containing an aromatic ring; $A^5$ and $A^6$ may be the same or different, and each independently represent hydrogen or alkyl. The tetracarboxylic dianhydride of formula (I-6) is preferably a compound of formula (I-6-1).

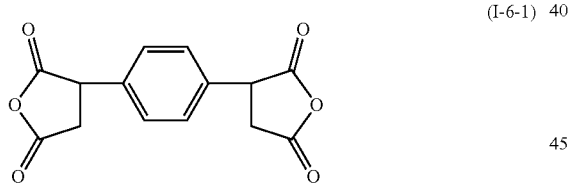

(I-6-1)

The tetracarboxylic dianhydride compounds (a-1) can be used alone or in combination.

Specific examples of the tetracarboxylic dianhydride compound (a-1) preferably include 1,2,3,4-cyclobutane tetracarboxylic dianhydride, 1,2,3,4-cyclopentane tetracarboxylic dianhydride, 2,3,5-tricarboxycyclopentylacetic dianhydride, 1,2,4,5-cyclohexane tetracarboxylic dianhydride, 3,4-dicarboxy-1,2,3,4-tetrahydronaphthalene-1-succinic dianhydride, pyromellitic dianhydride, 3,3',4,4'-benzophenone tetracarboxylic dianhydride, 3',3,4,4'-diphenylsulfone tetracarboxylic dianhydride, a compound of formula (I-1), and a combination thereof.

Based on a total number of moles of 100 moles of the diamine component (a-2), the range of the usage amount of the tetracarboxylic dianhydride component (a-1) is preferably 20 to 200 moles, more preferably 30 to 120 moles.

Diamine Component (a-2)

The diamine compound (a-2) includes an aliphatic diamine compound, an alicyclic diamine compound, an aromatic diamine compound, diamine compounds represented by formulae (II-1) to (II-30), or a combination thereof.

Specific examples of the aliphatic diamine compound include, but are not limited to, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,1-diaminododecane, 1,12-diaminooctadecane, 1,2-bis(3-aminopropoxy)ethane, and a combination of the compounds.

Specific examples of the alicyclic diamine compound include, but are not limited to, 4,4'-diaminodicyclohexylmethane, 4,4'-diamino-3,3'-dimethyl-dicyclohexylamine, 1,3-diaminocyclohexane, 1,4-diaminocyclohexane, isophorone diamine, tetrahydrodicyclopentadiene diamine, tricyclo[6.2.1.0$^{2,7}$]undecenedimethyldiamine, 4,4'-methylene bis(cyclohexylamine), and a combination of the compounds.

Specific examples of the aromatic diamine compound include, but are not limited to, 4,4'-diaminodiphenylmethane, 4,4'-diaminodiphenylethane, 4,4'-diaminodiphenylsulfone, 4,4'-diaminobenzoylaniline, 4,4'-diaminostilbene, 4,4'-diaminodiphenylether, 3,4'-diaminodiphenylether, 3,3'-diaminochalcone, 1,5-diaminonaphthalene, 5-amino-1-(4'-aminophenyl)-1,3,3-trimethylindene, 6-amino-1-(4'-aminophenyl)-1,3,3-trimethylindene, hexahydro-4,7-methanoindanylenedimethylenediamine, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,10-bis(4-aminophenyl)anthracene, 2,7-diaminofluorene, 9,9-bis(4-aminophenyl)fluorene, 4,4'-methylene-bis(2-chloroaniline), 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-bis[(4-amino-2-trifluoromethyl)phenoxy]-octafluorobiphenyl, 5-[4-(4-n-pentylcyclohexyl)cyclohexyl]phenylmethylene-1,3-diaminobenzene, 1,1-bis[4-(4-aminophenoxy)phenyl]-4-(4-ethylphenyl)cyclohexane, and their combinations.

The diamine compounds of formulae (II-1) to (II-30) are described below.

(II-1)

In formula (II-1), $B^1$ represents

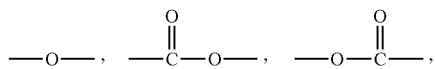

-continued $$-\underset{H}{N}-\underset{\parallel}{\overset{O}{C}}-, \quad -\underset{\parallel}{\overset{O}{C}}-\underset{H}{N}-, \quad \text{or} \quad -\underset{\parallel}{\overset{O}{C}}-;$$

and $B^2$ represents a group having a steroid skeleton, trifluoromethyl, fluorine, $C_{2-30}$ alkyl, or a monovalent group derived from a nitrogen-containing cyclic structure such as pyridine, pyrimidine, triazine, piperidine, or piperazine.

Specific examples of compounds represented by formula (II-1) include, but are not limited to, ethyl 2,4-diaminophenylformate, ethyl 3,5-diaminophenylformate, propyl 2,4-diaminophenylformate, propyl 3,5-diaminophenylformate, 1-dodecoxy-2,4-diaminobenzene, 1-hexadecoxy-2,4-diaminobenzene, I-octadecoxy-2,4-diaminobenzene, at least one of the compounds represented by formulae (II-1-1) to (II-1-6), and a combination thereof.

The compounds represented by formulae (II-1-1) to (II-1-6) are shown below.

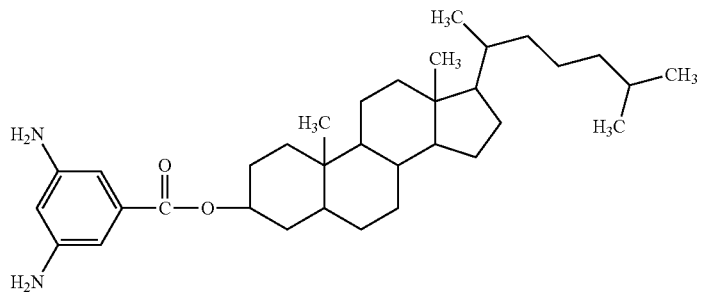

(II-1-1)

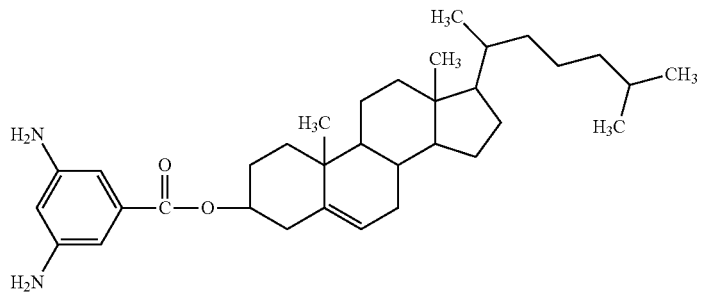

(II-1-2)

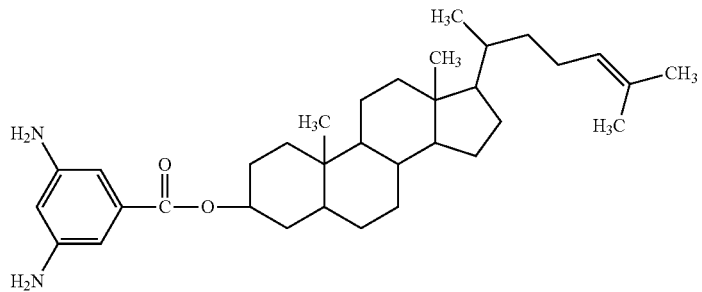

(II-1-3)

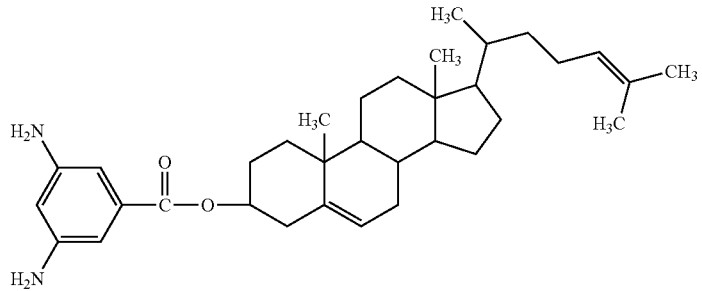

(II-1-4)

(II-1-5)
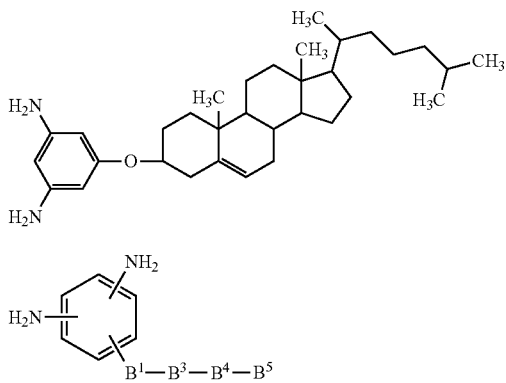

(II-1-6)
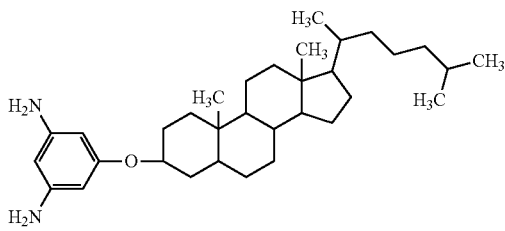

(II-2)
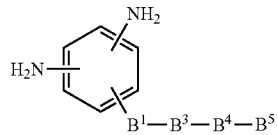

$B^1$—$B^3$—$B^4$—$B^5$

In formula (II-2), $B^1$ is the same as the $B^1$ in formula (II-1), $B^3$ and $B^4$ each independently represent a divalent aliphatic ring, a divalent aromatic ring, or a divalent heterocyclic group; $B^5$ represents $C_{3-18}$ alkyl, $C_{3-18}$ alkoxy, $C_{1-5}$ fluoroalkyl, $C_1$-$C_5$ fluoroalkyloxy, cyano, or a halogen atom.

Specific examples of the compound represented by formula (II-2) include at least one of the compounds represented by formulae (II-2-1) to (II-2-13). Specifically, the compounds represented by formulae (II-2-1) to (II-2-13) are as follows.

(II-2-1)
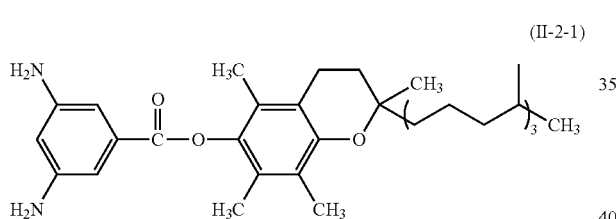

(II-2-2)
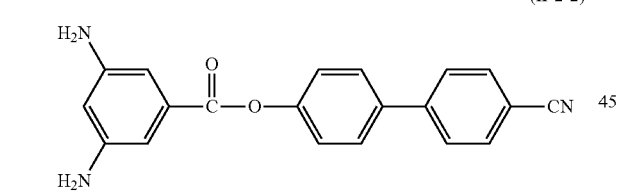

(II-2-3)
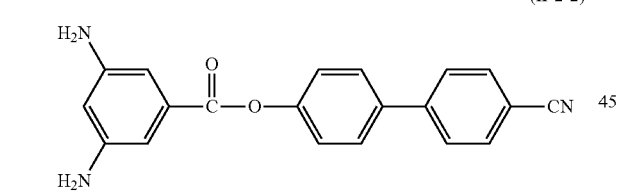

(II-2-4)
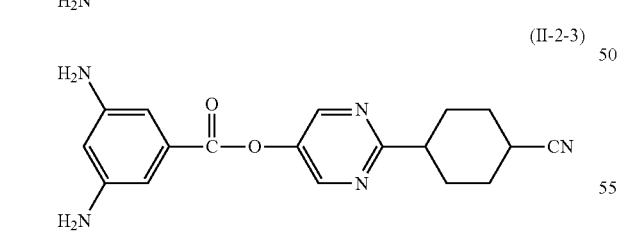

(II-2-5)
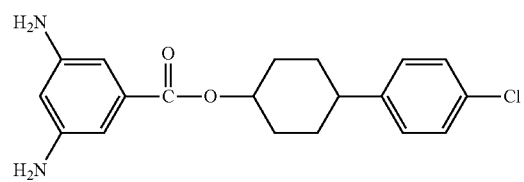

(II-2-6)
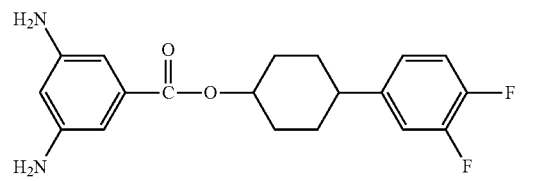

(II-2-7)
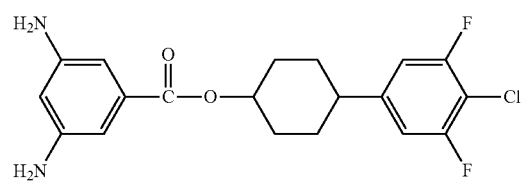

(II-2-8)
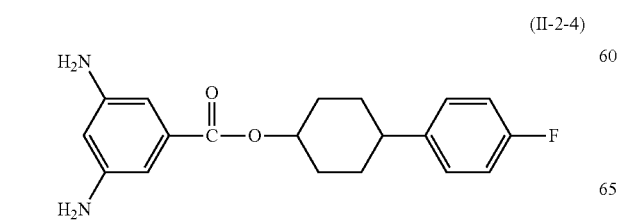

(II-2-9)
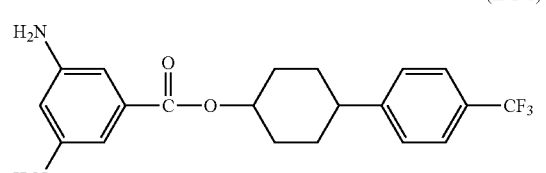

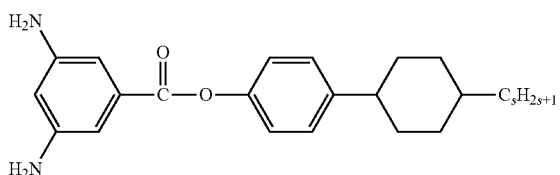
(II-2-10)

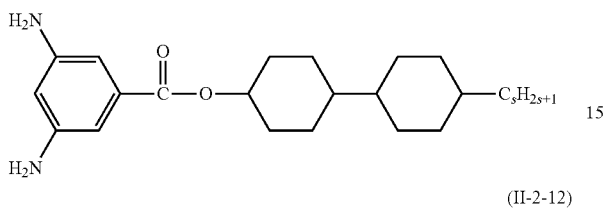
(II-2-11)

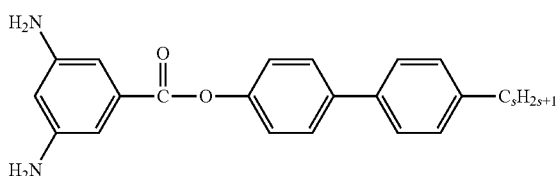
(II-2-12)

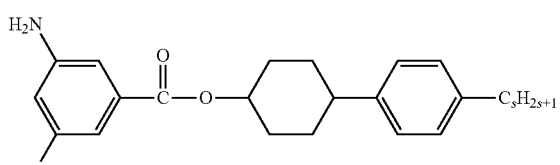
(II-2-13)

In formulae (II-2-10) to (II-2-13), s represents an integer of 3 to 12.

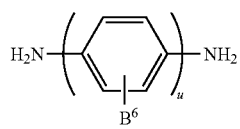
(II-3)

In formula (II-3), each $B^6$ independently represents hydrogen, $C_1$-$C_5$ acyl, $C_{1-5}$ alkyl, $C_{1-5}$ alkoxy, or halogen, and the plurality of $B^6$ in respective repeating units can be the same or different; and u represents an integer of 1 to 3.

Specific examples of the compound represented by formula (II-3) include: p-diaminobenzene, m-diaminobenzene, o-diaminobenzene, and 2,5-diaminotoluene, etc. of u=1; 4,4'-diaminobiphenyl, 2,2'-dimethyl-4,4'-diaminobiphenyl, 3,3'-dimethyl-4,4'-diaminobiphenyl, 3,3'-dimethoxy-4,4'-diaminobiphenyl, 2,2'-dichloro-4,4'-diaminobiphenyl, 3,3'-dichloro-4,4'-diaminobiphenyl, 2,2',5,5'-tetrachloro-4,4'-diaminobiphenyl, 2,2'-dichloro-4,4'-diamino-5,5'-dimethoxybiphenyl, and 4,4'-diamino-2,2'-bis(trifluoromethyl)biphenyl, etc. of u=2; and 1,4-bis(4'-aminophenyl)benzene, etc. of u=3.

Specific examples of the compound represented by formula (II-3) preferably include p-diaminobenzene, 2,5-diaminotoluene, 4,4'-diaminobiphenyl, 3,3'-dimethoxy-4,4'-diaminobiphenyl, 1,4-bis(4'-aminophenyl)benzene, and a combination of the compounds.

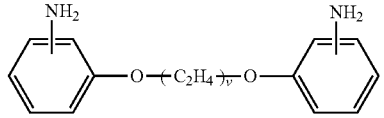
(II-4)

In formula (II-4), v represents an integer of 2 to 12.

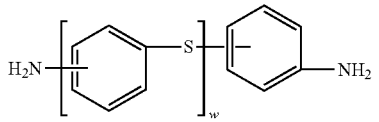
(II-5)

In formula (II-5), w represents an integer of 1 to 5. The compound represented by formula (II-5) is preferably 4,4'-diamino-diphenyl sulfide.

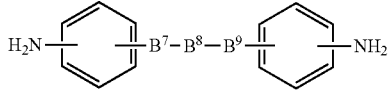
(II-6)

In formula (II-6), $B^7$ and $B^9$ each independently represent a divalent organic group, and $B^7$ and $B^9$ can be the same or different; $B^8$ represents a divalent group derived from a nitrogen-containing cyclic structure such as pyridine, pyrimidine, triazine, piperidine, or piperazine.

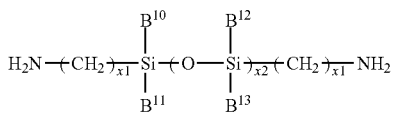
(II-7)

In formula (II-7), $B^{10}$, $B^{11}$, $B^{12}$, and $B^{13}$ each independently represent a $C_{1-12}$ hydrocarbon group, and $B^{10}$, $B^{11}$, $B^{12}$, and $B^{13}$ can be the same or different; each X1 independently represents an integer of 1 to 3; and X2 represents an integer of 1 to 20.

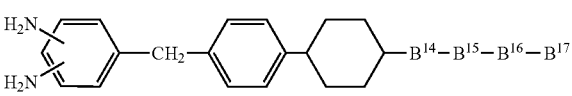
(II-8)

In formula (II-8), $B^{14}$ represents —O— or cyclohexylene, $B^{15}$ represents methylene (—$CH_2$—), $B^{16}$ represents phenylene or cyclohexylene, and $B^{17}$ represents hydrogen or heptyl.

Specific examples of the compound represented by formula (II-8) include a compound of formula (II-8-1), a compound of formula (II-8-2), and a combination thereof.

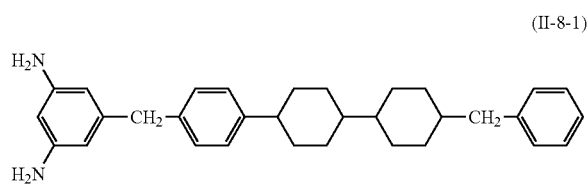
(II-8-1)
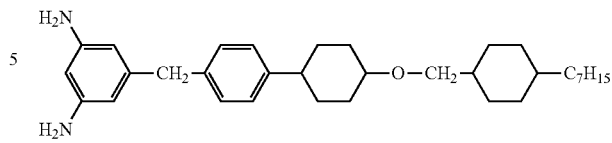
(II-8-2)
The compounds represented by formulae (II-9) to (II-30) are as shown below.
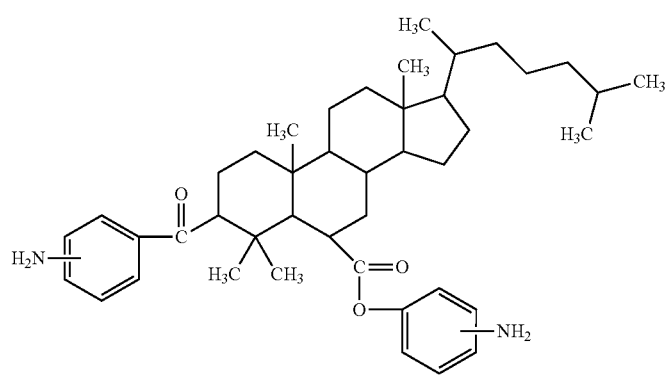
(II-9)
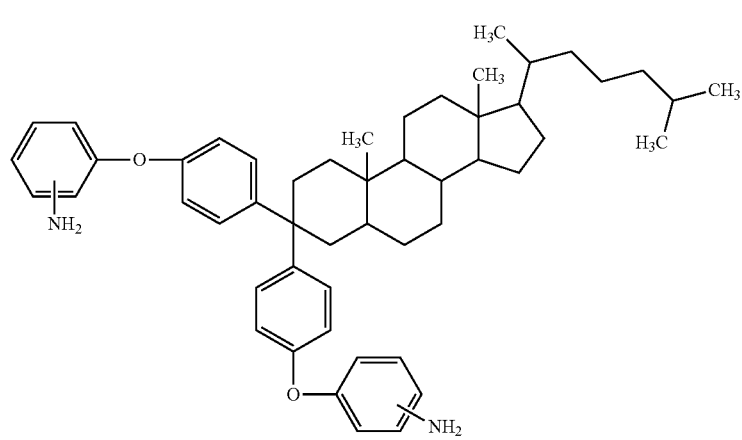
(II-10)
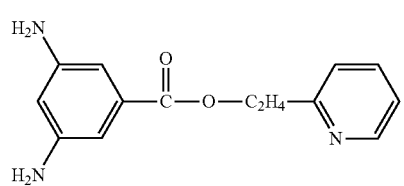
(II-11)
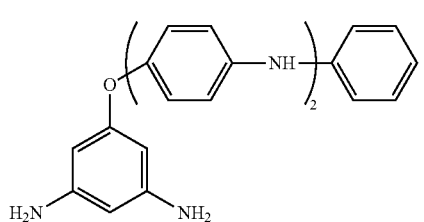
(II-12)

-continued
(II-13)
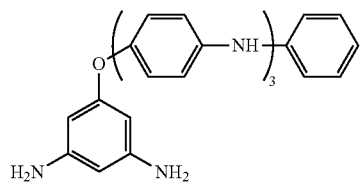
(II-14)
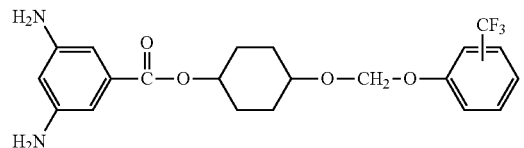
(II-15)
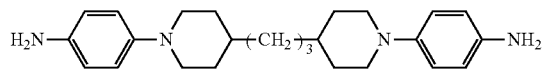
(II-16)
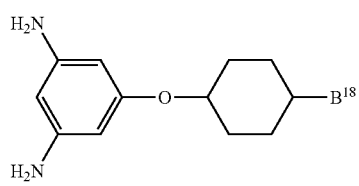
(II-17)
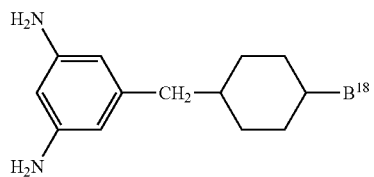
(II-18)
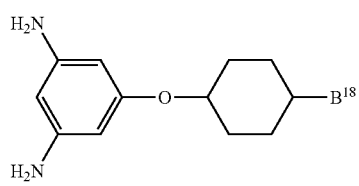
(II-19)
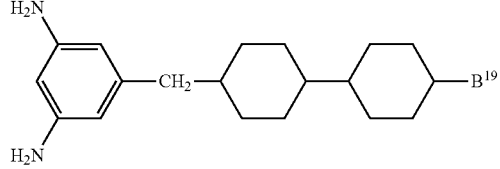
(II-20)
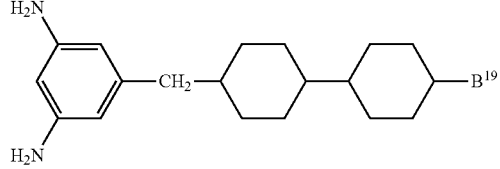
(II-21)
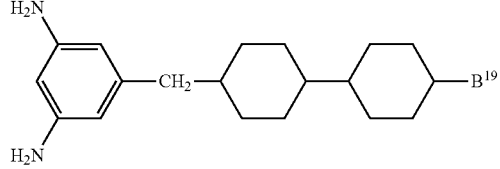
(II-22)
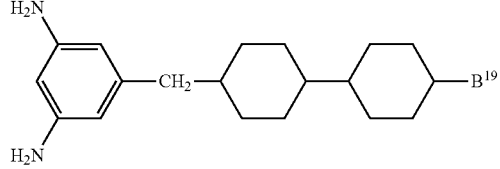
(II-23)
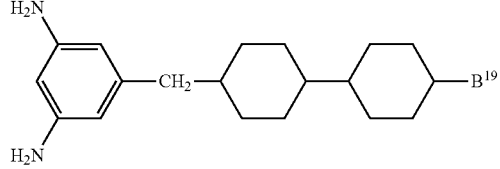
(II-24)
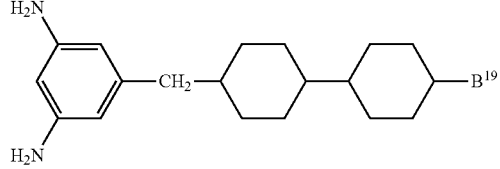
(II-25)
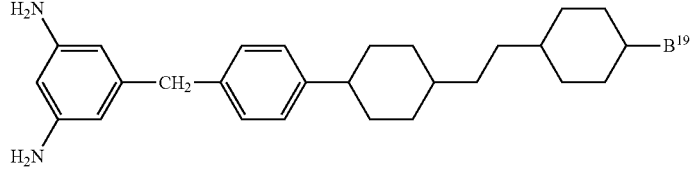
(II-26)
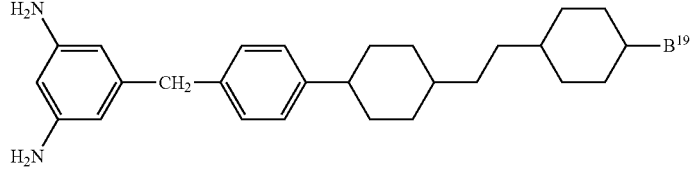
(II-27)
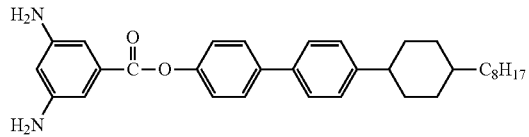
(II-28)
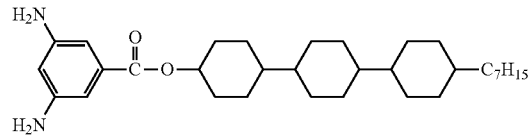

(II-29) 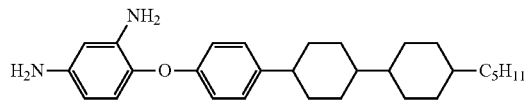

(II-30) 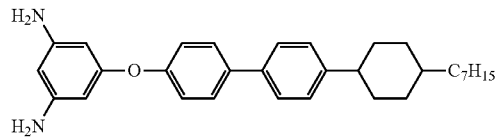

In formulae (II-17) to (II-25), $B^{18}$ preferably represents $C_{1-10}$ alkyl or $C_{1-10}$ alkoxy, and $B^{19}$ preferably represents hydrogen, $C_{1-10}$ alkyl, or $C_{1-10}$ alkoxy.

The diamine compounds (a-2) can be used alone or in combination.

Specific examples of the diamine compound (a-2) preferably include, but are not limited to, 1,2-diaminoethane, 3,3'-diaminochalcone, 4,4'-diaminostilbene, 4,4'-diaminodicyclohexylmethane, 4,4'-diaminodiphenylmethane, 4,4'-diaminodiphenyl ether, 5-[4-(4-n-pentylcyclohexyl)cyclohexyl]phenylmethylene-1,3-diaminobenzene, 1,1-bis[4-(4-aminophenoxy)phenyl]-4-(4-ethylphenyl)cyclohexane, ethyl 2,4-diaminophenylformate, 1-octadecoxy-2,4-diaminobenzene, a compound represented by formula (II-1-1), a compound represented by formula (II-1-2), a compound represented by formula (II-1-4), a compound represented by formula (II-1-5), a compound represented by formula (II-2-1), a compound represented by formula (II-2-11), p-diaminobenzene, m-diaminobenzene, o-diaminobenzene, a compound represented by formula (II-8-1), compounds represented by formulae (II-26) to (II-30), and a combination of the compounds.

Method of Preparing Polymer (A)

The polymer (A) may include at least one of a polyamic acid and a polyimide. The polymer (A) may further include a polyimide-based block copolymer. The method of preparing each of the various polymers above is further described below.

Method of Preparing Polyamic Acid

The method of preparing the polyamic acid includes first dissolving, in a solvent, a first mixture that includes the tetracarboxylic dianhydride component (a-1) and the diamine component (a-2). A polycondensation reaction is then performed at a temperature of 0° C. to 100° C. After reacting for 1 to 24 hours, the reaction solution is distilled under a reduced pressure with an evaporator to obtain a polyamic acid. Alternatively, the reaction solution is poured into a large amount of a poor solvent to obtain a precipitate. Then, the precipitate is dried under a reduced pressure to obtain a polyamic acid.

The solvent used in the polycondensation reaction can be the same as or different from the solvent in the liquid crystal alignment agent below, and is not particularly limited, provided the solvent can dissolve the reactants and the products. The solvent preferably includes, but is not limited to, 1) an aprotic polar solvent, such as N-methyl-2-pyrrolidinone (NMP), N,N-dimethylacetamide, N,N-dimethylformamide, dimethylsulfoxide, γ-butyrolactone, tetramethylurea, or hexamethylphosphoramide; or 2) a phenolic solvent, such as m-cresol, xylenol, phenol, or a halogenated phenol. Based on a total amount of 100 weight parts of the first mixture, the amount of the solvent used in the polycondensation reaction is preferably 200 to 2000 weight parts, more preferably 300 to 1800 weight parts.

It should be mentioned that, in the polycondensation reaction, the solvent can be used with a suitable amount of a poor solvent that does not cause precipitation of the polyamic acid. The poor solvents can be used alone or in combination, and include, but is not limited to, 1) alcohols such as methanol, ethanol, isopropanol, cyclohexanol, ethylene glycol, propylene glycol, 1,4-butanediol, and triglycol; 2) ketones such as acetone, methyl ethyl ketone, methyl isobutyl ketone, and cyclohexanone; 3) esters such as methyl acetate, ethyl acetate, butyl acetate, diethyl oxalate, diethyl malonate, and ethylene glycol monoethyl ether acetate; 4) ethers such as diethyl ether, ethylene glycol monomethyl ether, ethylene glycol monoethyl ether, ethylene glycol n-propyl ether, ethylene glycol isopropyl ether, ethylene glycol n-butyl ether, ethylene glycol dimethyl ether, diethylene glycol dimethyl ether, and tetrahydrofuran; 5) halogenated hydrocarbons such as dichloromethane, 1,2-dichloroethane, 1,4-dichlorobutane, trichloroethane, chlorobenzene, and o-dichlorobenzene; and 6) hydrocarbons such as hexane, heptane, octane, benzene, toluene, and xylene; and any combination of the solvents. Based on 100 weight parts of the diamine component (a-2), the amount of the poor solvent is preferably 0 to 60 weight parts, more preferably 0 to 50 weight parts.

Method of Preparing Polyimide

The method of preparing the polyimide includes heating the polyamic acid obtained by the above method of preparing polyamic acid in the presence of a dehydrating agent and a catalyst. In the heating process, the amic acid functional groups in the polyamic acid are converted to imide functional groups through a cyclodehydration reaction (i.e., imidization).

The solvent used in the cyclodehydration reaction can be the same as the solvent (C) in the liquid crystal alignment agent and is therefore not repeated herein. Based on 100 weight parts of the polyamic acid, the amount of the solvent used in the cyclodehydration reaction is preferably 200 to 2000 weight parts, more preferably 300 to 1800 weight parts.

To obtain a preferable degree of imidization of the polyamic acid, the operating temperature of the cyclodehydration reaction is preferably 40° C. to 200° C., more preferably 40° C. to 150° C. If the operating temperature of the cyclodehydration reaction is less than 40° C., the imidization reaction is incomplete, so the degree of imidization of the polyamic acid is reduced. If the operating temperature of the cyclodehydration reaction is higher than 200° C., the weight-average molecular weight of the obtained polyimide is lower.

The dehydrating agent used in the cyclodehydration reaction can be selected from anhydride compounds, and specific examples thereof include, for instance, acetic anhydride, propionic anhydride, and trifluoroacetic anhydride. Based on 1 mole of the polyamic acid, the amount of the dehydrating agent used is 0.01 to 20 moles. The catalyst used in the cyclodehydration reaction can be selected from 1) a pyridine compound such as pyridine, trimethylpyridine or dimethylpyridine, and 2) a tertiary amine compound such as triethylamine. Based on 1 mole of the dehydrating agent used, the amount of the catalyst can be 0.5 to 10 moles.

The imidization ratio of the polymer (A) can be 0% to 50%, preferably 0% to 45%, and more preferably 0% to 40%. When the imidization ratio of the polymer (A) in the liquid crystal alignment agent is within the above ranges, the reliability of the LCD element can be further increased.

Method of Preparing Polyimide-Based Block Copolymer

The polyimide-based block copolymer is selected from a polyamic acid block copolymer, a polyimide block copolymer, a polyamic acid-polyimide block copolymer, and any combination of the polymers.

The method of preparing the polyimide-based block copolymer preferably includes dissolving a starting material in a solvent and then performing a polycondensation reaction. The starting material includes at least one kind of polyamic acid and/or at least one kind of polyimide and can also include a carboxylic anhydride component and a diamine component.

The carboxylic anhydride component and the diamine component in the starting material can be the same as the tetracarboxylic dianhydride component (a-1) and the diamine component (a-2) used in the method of preparing the polyamic acid. Moreover, the solvent used in the polycondensation reaction can be the same as the solvent (C) in the liquid crystal alignment agent below and is not repeated herein.

Based on 100 weight parts of the starting material used, the amount of the solvent used in the polycondensation reaction is preferably 200 to 2000 weight parts, more preferably 300 to 1800 weight parts. The operating temperature of the polycondensation reaction is preferably 0° C. to 200° C., more preferably 0° C. to 100° C.

The starting material preferably includes, but is not limited to, 1) two polyamic acids of which the terminal groups are different and the structures are different, 2) two polyimides of which the terminal groups are different and the structures are different, 3) a polyamic acid and a polyimide of which the terminal groups are different and the structures are different, 4) a polyamic acid, a carboxylic anhydride component and a diamine component, wherein the structure of at least one of the carboxylic anhydride component and the diamine component is different from the structure of the carboxylic anhydride component or the diamine component used to form the polyamic acid, 5) a polyimide, a carboxylic anhydride component and a diamine component, wherein the structure of at least one of the carboxylic anhydride component and the diamine component is different from the structure of the carboxylic anhydride component or diamine component used to form the polyimide, 6) a polyamic acid, a polyimide, a carboxylic anhydride component and a diamine component, wherein the structure of at least one of the carboxylic anhydride component and the diamine component is different from the structure of the carboxylic anhydride component or the diamine component used to form the polyamic acid or the polyimide, 7) two polyamic acids having different structures, a carboxylic anhydride component, and a diamine component, 8) two polyimides having different structures, a carboxylic anhydride component, and a diamine component, 9) two polyamic acids having anhydride groups as terminal groups and having different structures, and a diamine component, 10) two polyamic acids having amine groups as terminal groups and having different structures, and a carboxylic anhydride component, 11) two polyimides having anhydride groups as terminal groups and having different structures, and a diamine component, or 12) two polyimides having amine groups as terminal groups and having different structures, and a carboxylic anhydride component.

Without affecting the efficacy of the invention, the polyamic acid, the polyimide, and the polyimide-based block copolymer are preferably terminal-modified polymers formed through molecular weight regulation. By using the terminal-modified polymers, the coating performance of the liquid crystal alignment agent can be improved. The method of preparing the terminal-modified polymers may include adding a monofunctional compound during the polycondensation reaction for forming the polyamic acid.

Specific examples of the monofunctional compound include, but are not limited to, 1) monoanhydrides, such as maleic anhydride, phthalic anhydride, itaconic anhydride, n-decylsuccinic anhydride, n-dodecylsuccinic anhydride, n-tetradecylsuccinic anhydride, and n-hexadecylsuccinic anhydride, 2) monoamine compounds such as aniline, cyclohexylamine, n-butylamine, n-amylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, and n-eicosylamine, and 3) monoisocyanate compounds such as phenyl isocyanate and naphthyl isocyanate.

Photosensitive Polysiloxane (B)

The photosensitive polysiloxane (B) is obtained by reacting a polysiloxane (b-1) containing an epoxy group with a cinnamic acid derivative (b-2) and an aromatic heterocyclic derivative (b-3) containing nitrogen, oxygen or sulfur. In the following, specific examples and synthesis methods of the polysiloxane (b-1) containing an epoxy group, the cinnamic acid derivative (b-2) and the aromatic heterocyclic derivative (b-3) containing nitrogen, oxygen or sulfur are described.

Polysiloxane (b-1) containing an epoxy group

The group containing an epoxy group contained in the polysiloxane (b-1) containing an epoxy group is, for instance, a glycidyl group, a glycidyloxy group, an epoxycyclohexyl group, or an oxetanyl group.

The group containing an epoxy group contained in the polysiloxane (b-1) containing an epoxy group includes at least one of a group represented by formula (2-1), a group represented by formula (2-2), and a group represented by formula (2-3).

(2-1)

(2-2)

(2-3)

In formula (2-1), B represents —O— or a single bond, c represents an integer of 1 to 3, and d represents an integer of 0 to 6, wherein when d represents 0, B is a single bond.

In formula (2-2), e represents an integer of 0 to 6.

In formula (2-3), D represents $C_{2-6}$ alkylene, and E represents hydrogen or $C_{1-6}$ alkyl.

The group containing an epoxy group preferably includes at least one of a group represented by formula (2-1-1), a group represented by formula (2-2-2), and a group represented by formula (2-3-1).

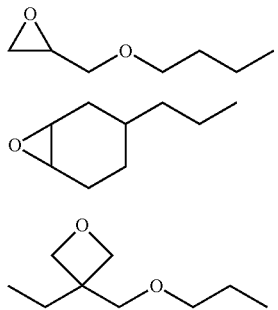

(2-1-1)

(2-2-1)

(2-3-1)

The polysiloxane (b-1) containing an epoxy group of the invention includes a copolymer obtained from hydrolysis and partially condensation of a second mixture that includes a silane monomer (b-1-1) represented by formula (1-1).

$$Si(R^a)_p(OR^b)_{4-p} \quad (1\text{-}1)$$

In formula (1-1), each $R^a$ independently represents hydrogen, $C_{1-10}$ alkyl, $C_{2-10}$ alkenyl, $C_{6-15}$ aryl, an alkyl group containing an epoxy group, or an alkoxy group containing an epoxy group, at least one $R^a$ is an alkyl group containing an epoxy group, or an alkoxy group containing an epoxy group, each $R^b$ independently represents hydrogen, $C_{1-6}$ alkyl, $C_{1-6}$ acyl, or $C_{6-15}$ aryl, and p represents an integer of 1 to 3. When p represents 2 or 3, the plurality of $R^a$ can be the same or different. When p represents 1 or 2, the plurality of $R^b$ can be the same or different.

More specifically, when $R^a$ in formula (1-1) represents $C_{1-10}$ alkyl, specifically, $R^a$ is, e.g., methyl, ethyl, n-propyl, isopropyl, n-butyl, t-butyl, n-hexyl or n-decyl. Alternatively, R may be a substituted alkyl group such as, specifically, trifluoromethyl, 3,3,3-trifluoropropyl, 3-aminopropyl, 3-mercaptopropyl, or 3-isocyanatepropyl.

When $R^a$ in formula (1-1) represents $C_{2-10}$ alkenyl, specifically, R is, e.g., vinyl. Alternatively, $R^a$ may be a substituted alkenyl group such as, specifically, 3-acryoyloxypropyl or 3-methylacryloyloxypropyl.

When $R^a$ in formula (1-1) represents $C_{6-15}$ aryl, specifically, $R^a$ is, e.g., phenyl, tolyl, or naphthyl. Alternatively, $R^a$ may be a substituted aryl group such as, specifically, o-hydroxyphenyl, 1-(o-hydroxyphenyl)ethyl, 2-(o-hydroxyphenyl)ethyl, or 4-hydroxy-5-(p-hydroxyphenylcarbonyloxy)pentyl.

Moreover, when $R^a$ in formula (1-1) represents an alkyl group containing an epoxy group or an alkoxy group containing an epoxy group, specific examples of $R^a$ can be the same as the examples of the epoxy-containing group contained in the polysiloxane (b-1) containing an epoxy group and are therefore not repeated herein.

Moreover, when $R^b$ in formula (1-1) represents $C_{1-6}$ alkyl, specifically, $R^b$ is, e.g., methyl, ethyl, n-propyl, isopropyl or n-butyl. When $R^b$ in formula (1-1) represents $C_{1-6}$ acyl, specifically, $R^b$ is, e.g., acetyl. When $R^b$ in formula (1-1) represents $C_{6-15}$ aryl, specifically, $R^b$ is, e.g., phenyl.

Specific examples of the silane monomer (b-1-1) include 3-(N,N-diglycidyl)aminopropyltrimethoxysilane, 3-(N-allyl-N-glycidyl)aminopropyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-glycidoxypropyldimethylmethoxysilane, 3-glycidoxypropyldimethylethoxysilane, 2-glycidoxyethyltrimethoxysilane, 2-glycidoxyethyltriethoxysilane, 2-glycidoxyethylmethyldimethoxysilane, 2-glycidoxyethylmethyldiethoxysilane, 2-glycidoxyethyldimethylmethoxysilane, 2-glycidoxyethyldimethylethoxysilane, 4-glycidoxybutyltrimethoxysilane, 4-glycidoxybutyltriethoxysilane, 4-glycidoxybutylmethyldimethoxysilane, 4-glycidoxybutylmethyldiethoxysilane, 4-glycidoxybutyldimethylmethoxysilane, 4-glycidoxybutyldimethylethoxysilane, 2-(3,4-epoxycyclohexyl)ethyltrimethoxysilane, 2-(3,4-epoxycyclohexyl)ethyltriethoxysilane, 3-(3,4-epoxycyclohexyl)propyltrimethoxysilane, 3-(3,4-epoxycyclohexyl)propyltriethoxysilane, ((3-ethyl-3-oxetanyl)methoxy)propyltrimethoxysilane, ((3-ethyl-3-oxetanyl)methoxy)propyltriethoxysilane, ((3-ethyl-3-oxetanyl)methoxy)propylmethyldimethoxysilane, ((3-ethyl-3-oxetanyl)methoxy)propyldimethylmethoxysilane, commercial products such as DMS-E01, DMS-E12, DMS-E21, and EMS-32 (made by JNC), and a combination thereof.

Specific examples of the silane monomer (b-1-1) preferably include 3-glycidoxypropyltrimethoxysilane, 2-glycidoxyethyltrimethoxysilane, 4-glycidoxybutyltrimethoxysilane, 2-(3,4-epoxycyclohexyl)ethyltrimethoxysilane, 2-(3,4-epoxycyclohexyl)ethyltriethoxysilane, ((3-ethyl-3-oxetanyl)methoxy)propyltrimethoxysilane, ((3-ethyl-3-oxetanyl)methoxy)propyltriethoxysilane, DMS-E01, DMS-E12, and a combination thereof.

Based on a total amount of 1 mole of the monomers in the second mixture, the amount of the silane monomer (b-1-1) is 0.3 to 1 mole, preferably 0.4 to 1 mole, and more preferably 0.5 to 1 mole.

Other Silane Monomers (b-1-2)

The second mixture being reacted to generate the polysiloxane (b-1) containing an epoxy group preferably further includes other silane monomer (b-1-2) represented by formula (1-2).

$$Si(R^c)_q(OR^d)_{4-q} \quad (1\text{-}2)$$

In formula (1-2), each $R^c$ independently represents hydrogen, $C_{1-10}$ alkyl, $C_{2-10}$ alkenyl, $C_{6-15}$ aryl, or an alkyl group containing an anhydride group, each $R^d$ independently represents hydrogen, $C_{1-6}$ alkyl, $C_{1-6}$ acyl, or $C_{6-15}$ aryl, and q represents an integer of 0 to 3. When q represents 2 or 3, the plurality of $R^c$ can be the same or different. When q represents 0 to 2, the plurality of $R^d$ can be the same or different.

When $R^c$ in formula (1-2) represents $C_{1-10}$ alkyl, $C_{2-10}$ alkenyl or $C_{6-15}$ aryl, specific examples and preferred examples of $R^c$ are the same as those mentioned in the case of $R^a$, and are therefore not repeated herein.

When $R^c$ in formula (1-2) represents an alkyl group containing an anhydride group, the alkyl group is preferably $C_{1-10}$ alkyl. Specifically, the alkyl group containing an anhydride group is, e.g., ethylsuccinic anhydride of formula (1-2-1), propylsuccinic anhydride of formula (1-2-2), or propylglutaric anhydride of formula (1-2-3). It is noted that, the anhydride group is a group formed by intramolecular dehydration of a dicarboxylic acid, wherein the dicarboxylic acid is, e.g., succinic acid or glutaric acid.

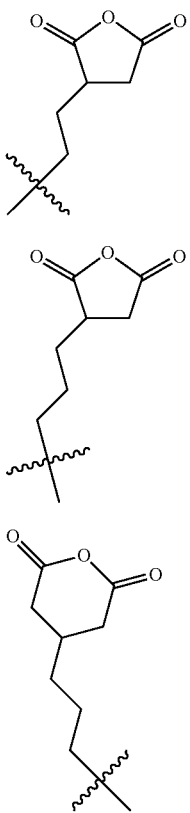

(1-2-1)

(1-2-2)

(1-2-3)

When $R^d$ in formula (1-2) represents $C_{1-6}$ alkyl, $C_{1-6}$ acyl, or $C_{6-15}$ aryl, specific examples and preferred examples of $R^d$ are the same as those mentioned in the case of $R^b$, and are therefore not repeated herein.

The other silane monomers (b-1-2) represented by formula (1-2) can be used alone or in combination. Moreover, the other silane monomers (b-1-2) represented by formula (1-2) include compounds having one silicon atom. The compound having one silicone atom includes a silane compound having four hydrolyzable groups, a silane compound having three hydrolyzable groups, a silane compound having two hydrolyzable groups, a silane compound having one hydrolyzable group, or a combination thereof.

Specific examples of the silane compound having four hydrolyzable groups include tetrachlorosilane, tetramethoxysilane, tetraethoxysilane, tetra-n-propoxysilane, tetraisopropoxysilane, tetra-n-butoxysilane, tetra-sec-butoxysilane, and combinations thereof.

Specific examples of the silane compound having three hydrolyzable groups include methyltrimethoxysilane (MTMS), methyltriethoxysilane, methyltriisopropoxysilane, methyltri-n-butoxysilane, ethyltrimethoxysilane, ethyltriethoxysilane, ethyltriisopropoxysilane, ethyltri-n-butoxysilane, n-propyltrimethoxysilane, n-propyltriethoxysilane, n-butyltrimethoxysilane, n-butyltriethoxysilane, n-hexyltrimethoxysilane, n-hexyltriethoxysilane, decyltrimethoxysilane, vinyltrimethoxysilane, vinyltriethoxysilane, 3-acryloyloxypropyltrimethoxysilane, 3-methacryloyloxypropyltrimethoxysilane (MPTMS), 3-methylacryloyloxypropyltriethoxysilane, phenyltrimethoxysilane (PTMS), phenyltriethoxysilane (PTES), p-hydroxyphenyltrimethoxysilane, 1-(p-hydroxyphenyl)ethyltrimethoxysilane, 2-(p-hydroxyphenyl)ethyltrimethoxysilane, 4-hydroxy-5-(p-hydroxyphenylcarbonyloxy)pentyltrimethoxysilane, trifluoromethyltrimethoxysilane, trifluoromethyltriethoxysilane, 3,3,3-trifluoropropyltrimethoxysilane, 3-aminopropyltrimethoxysilane, 3-aminopropyltriethoxysilane, 3-mercaptopropyltrimethoxysilane, 3-triphenoxysilylpropyl succinic anhydride, a commercial product made by Shin-Etsu Chemical: 3-(trimethoxysilyl)propyl succinic anhydride (trade name: X-12-967), a commercial product made by WACKER: 3-(triethoxysilyl)propyl succinic anhydride (trade name: GF-20), 3-(trimethoxysilyl)propyl glutaric anhydride (TMSG), 3-(triethoxysilyl)propyl glutaric anhydride, 3-(triphenoxysilyl)propyl glutaric anhydride, and a combination thereof.

Specific examples of the silane compound having two hydrolyzable groups include methyldimethoxysilane, methyldiethoxysilane, dimethyldimethoxysilane, dimethyldiethoxysilane, methyl[2-(perfluoro-n-octyl)ethyl]dimethoxysilane, 3-mercaptopropylmethyldimethoxysilane, diphenyldimethoxysilane, dimethyldiacetoxysilane, di-n-butyldimethoxysilane, and a combination thereof.

Specific examples of the silane compound having one hydrolyzable group include methoxydimethylsilane, methoxytrimethylsilane, methoxymethyldiphenylsilane, tri-n-butylethoxysilane, and a combination thereof.

The other silane monomers (b-1-2) represented by formula (1-2) are preferably tetramethoxysilane, tetraethoxysilane, methyltrimethoxysilane, methyltriethoxysilane, phenyltrimethoxysilane, phenyltriethoxysilane, 3-mercaptopropyltrimethoxysilane, 3-mercaptopropyltriethoxysilane, mercaptomethyltrimethoxysilane, mercaptomethyltriethoxysilane, dimethyldimethoxysilane, dimethyldiethoxysilane, and a combination of the compounds.

Based on a total amount of 1 mole of the monomers in the second mixture, the amount of the other silane monomers (b-1-2) is 0 to 0.7 mole, preferably 0 to 0.6 mole, and more preferably 0 to 0.5 mole.

The second mixture may further include a silane monomer as a commercial product. Specific examples thereof include, e.g., partial condensates of the followings: KC-89, KC-89S, X-21-3153, X-21-5841, X-21-5842, X-21-5843, X-21-5844, X-21-5845, X-21-5846, X-21-5847, X-21-5848, X-22-160AS, X-22-170B, X-22-170BX, X-22-170D, X-22-170DX, X-22-176B, X-22-176D, X-22-176DX, X-22-176F, X-40-2308, X-40-2651, X-40-2655A, X-40-2671, X-40-2672, X-40-9220, X-40-9225, X-40-9227, X-40-9246, X-40-9247, X-40-9250, X-40-9323, X-41-1053, X-41-1056, X-41-1805, X-41-1810, KF6001, KF6002, KF6003, KR212, KR-213, KR-217, KR220L, KR242A, KR271, KR282, KR300, KR311, KR401N, KR500, KR510, KR5206, KR5230, KR5235, KR9218 and KR9706 (produced by Shin-Etsu Chemical), glass resin (by Showa Denko), SH804, SH805, SH806A, SH840, SR2400, SR2402, SR2405, SR2406, SR2410, SR2411, SR2416 and SR2420 (by Dow Corning Toray), FZ3711 and FZ3722 (by NUC), DMS-S12, DMS-S15, DMS-S21, DMS-S27, DMS-S31, DMS-S32, DMS-S33, DMS-S35, DMS-S38, DMS-S42, DMS-S45, DMS-S51, DMS-227, PSD-0332, PDS-1615, PDS-9931 and XMS-5025 (by JNC), MS51 and MS56 (by Mitsubishi Chemical), and GR100, GR650, GR908 and GR950 (by Showa Denko).

Method of Preparing Polysiloxane (b-1) Containing an Epoxy Group

The polycondensation reaction forming the polysiloxane compound containing an epoxy group may include a general method such as adding an organic solvent or water in the silane compound or a mixture thereof (and optionally further adding a catalyst thereto) and then performing heating via, e.g., an oil bath at 50° C. to 150° C., wherein the heating time is preferably 0.5 to 120 hours. During heating, the mixed solution may be stirred, and may also be placed under a reflux condition.

The organic solvent is not particularly limited, and can be the same as or different from the solvent (C) contained in the liquid crystal alignment agent of the invention.

Specific examples of the organic solvent include: hydrocarbon compounds, such as toluene and xylene; ketone solvents, such as methyl ethyl ketone, methyl isobutyl ketone, methyl-n-pentyl ketone, diethyl ketone, cyclohexanone, 2-butanone and 2-hexanone; ester solvents, such as ethyl acetate, n-butyl acetate, isopentyl acetate, propylene glycol monomethyl ether acetate, 3-methoxybutyl acetate and ethyl lactate; ether solvents, such as ethylene glycol dimethyl ether, ethylene glycol diethyl ether, tetrahydrofuran and dioxane; alcohol solvents, such as 1-hexanol, 4-methyl-2-pentanol, ethylene glycol monomethyl ether, ethylene glycol monoethyl ether, ethylene glycol mono-n-propyl ether, ethylene glycol mono-n-butyl ether, propylene glycol monomethyl ether, propylene glycol monoethyl ether, and propylene glycol mono-n-propyl ether, amide solvents such as N-methyl-2-pyrrolidone, N,N-dimethylacetamide, N,N-dimethylformamide, hexamethylphosphoric triamide, and 1,3-dimethyl-2-imidazolidinone; and a combination of the above organic solvents.

The organic solvents can be used alone or in combination.

Based on 100 weight parts of all the silane compounds, the amount of the organic solvent used is preferably 10 to 1200 weight parts, more preferably 30 to 1000 weight parts.

Based on 1 mole of the hydrolyzable group of all the silane compounds, the amount of the used water is preferably 0.5 to 2 moles.

The catalyst is not particularly limited, and is preferably selected from an acid, an alkali metal compound, an organic base, a titanium compound, a zirconium compound, and a combination thereof.

Specific examples of the acid include hydrochloric acid, nitric acid, sulfuric acid, hydrofluoric acid, oxalic acid, phosphoric acid, acetic acid, trifluoroacetic acid, formic acid, polybasic carboxylic acid, polybasic acid anhydride, and a combination thereof.

Specific examples of the alkali metal compound include sodium hydroxide, potassium hydroxide, sodium methoxide, potassium methoxide, sodium ethoxide, potassium ethoxide, and a combination thereof.

Specific examples of the organic base include, e.g., primary and secondary organic amines, such as ethylamine, diethylamine, piperazine, piperidine, pyrrolidine, and pyrrole; tertiary organic amines, such as triethylamine, tri-n-propylamine, tri-n-butylamine, pyridine, 4-dimethylaminopyridine, and diazabicycloundecene; quaternary organic amines, such as tetramethylammonium hydroxide; and a combination of the compounds.

The amount of the catalyst used depends on, for instance, reaction conditions such as its type or the temperature, and can be suitably set. For instance, based on 1 mole of all of the silane compounds, the addition amount of the catalyst is 0.01 to 5 moles, preferably 0.03 to 3 moles, and more preferably 0.05 to 1 mole.

For stability concerns, after the polycondensation reaction is complete, the organic solvent layer fractionated from the reaction solution is preferably washed with water. In a case where washing is performed, water containing a small amount of salt, such as an aqueous solution of around 0.2 wt % of ammonium nitrate, is preferably used. The washing can be performed until the washed aqueous layer is neutral. After the organic solvent layer is dried via a desiccant such as anhydrous calcium sulfate or a molecular sieve as needed, the organic solvent is removed to obtain the polysiloxane (b-1) containing an epoxy group.

In a case that the polysiloxane (b-1) containing an epoxy group is not used in the photosensitive polysiloxane (B), the LCD element has the issue of poor reliability and is likely to have residual image.

Cinnamic Acid Derivative (b-2)

The cinnamic acid derivative (b-2) is at least one selected from the group consisting of compounds represented by formula (3-1) and formula (3-2).

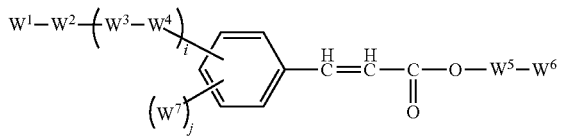

(3-1)

In formula (3-1), $W^1$ represents $C_{1-40}$ alkyl or a $C_{3-40}$ monovalent organic group containing an alicyclic group, wherein a part of or all of the hydrogen atoms of the alkyl are optionally substituted by fluorine atoms; $W^2$ represents a single bond, —O—, —COO—, or —OCO—; $W^3$ represents a divalent aromatic group, a divalent alicyclic group, a divalent heterocyclic group, or a divalent fused-ring group; $W^4$ represents a single bond, —O—, —COO—, or —OCO—; $W^5$ represents a single bond, methylene, $C_{2-10}$ alkylene, or a divalent aromatic group; when $W^5$ represents a single bond, $W^6$ is hydrogen; when $W^5$ represents methylene, alkylene, or a divalent aromatic group, $W^6$ is carboxyl, hydroxyl, —SH, —NCO, —NHW, —CH=CH$_2$, or —SO$_2$Cl, wherein W represents hydrogen or $C_{1-6}$ alkyl; $W^7$ represents fluorine or cyano; i represents an integer of 0 to 3; and j represents an integer of 0 to 4.

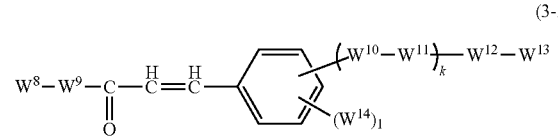

(3-2)

In formula (3-2), $W^8$ represents $C_{1-40}$ alkyl or a $C_{3-40}$ monovalent organic group containing an alicyclic group, wherein a part of or all of the hydrogen atoms of the alkyl are optionally substituted by fluorine atoms; $W^9$ represents —O— or a divalent aromatic group; $W^{10}$ represents —O—, —COO—, or —OCO—; $W^{11}$ represents a divalent aromatic group, a divalent heterocyclic group, or a divalent fused-ring group; $W^{12}$ represents a single bond, —OCO—(CH$_2$)$_e$—, or —O—(CH$_2$)$_g$—, wherein e and g each independently represent an integer of 1 to 10; $W^{13}$ represents carboxyl, hydroxyl, —SH, —NCO, —NHW, —CH=CH$_2$, or —SO$_2$Cl, wherein W represents hydrogen or $C_{1-6}$ alkyl; $W^{14}$ represents fluorine or cyano; k represents an integer of 0 to 3; and l represents an in integer of 0 to 4.

$W^1$ in formula (3-1) is $C_{1-40}$ alkyl, and is preferably $C_{1-20}$ alkyl, wherein a part of or all of the hydrogen atoms of the alkyl group are optionally substituted by fluorine atoms. Specific examples of the alkyl include, e.g., n-pentyl, n-hexyl, n-heptyl, n-octyl, n-nonyl, n-decyl, n-lauryl, n-dodecyl, n-tridecyl, n-tetradecyl, n-pentadecyl, n-hexadecyl, n-heptadecyl, n-octadecyl, n-nonadecyl, n-eicosyl, 4,4,4-trifluorobutyl, 4,4,5,5,5-pentafluoropentyl, 4,4,5,5,6,6,6-heptafluorohexyl, 3,3,4,4,5,5,5-heptafluoropentyl, 2,2,2-trifluoroethyl, 2,2,3,3,3-pentafluoropropyl, 2-(perfluorobutyl)ethyl, 2-(perfluorooctyl)ethyl, and 2-(perfluorodecyl)ethyl. In the scope of $W^1$, the $C_{3-40}$ monovalent organic group containing an alicyclic group may be exemplified by cholestenyl, cholestanyl, and adamantyl.

Examples of the divalent aromatic groups in the scope of $W^3$ and $W^5$ include, e.g., 1,4-phenylene, 2-fluoro-1,4-phenylene, 3-fluoro-1,4-phenylene, and 2,3,5,6-tetrafluoro-1,4-phenylene. Examples of the divalent heterocyclic group in the scope of $W^3$ include, e.g., 1,4-pyridylene, 2,5-pyridylene, and 1,4-furylene. Examples of the divalent fused-ring group in the scope of $W^3$ include, e.g., a naphthylene group. Examples of the divalent alicyclic group in the scope of $W^3$ include, e.g., 1,4-cyclohexylene.

Specific examples of the compound represented by formula (3-1) include at least one of the compounds represented by formulae (3-1-1) to (3-1-34).

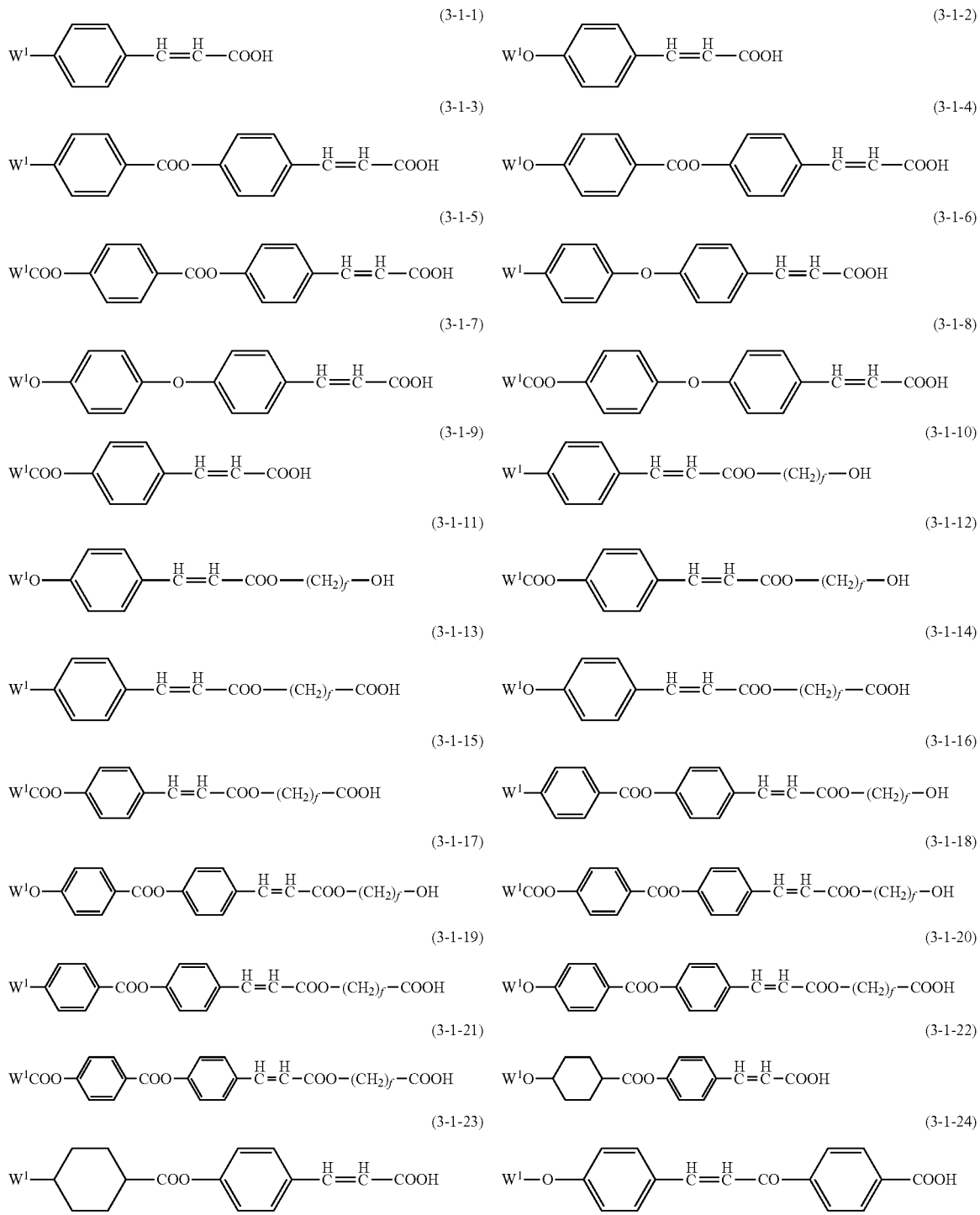

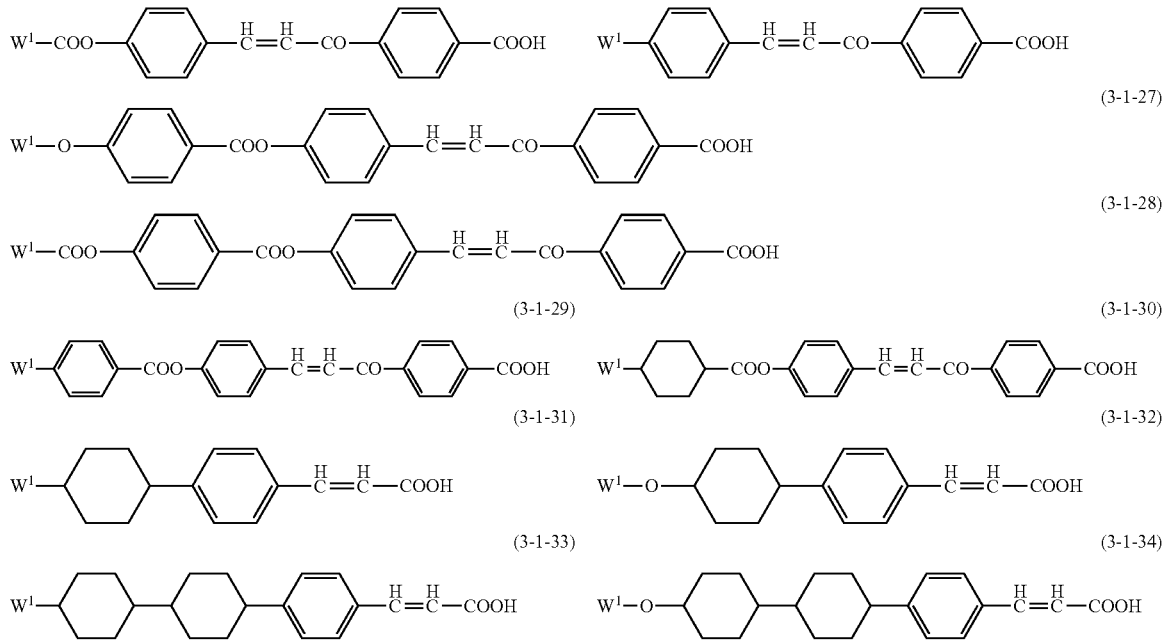

The $W^1$ in formulae (3-1-1) to (3-1-34) is the same as the $W^1$ in formula (3-1), and f represents an integer of 1 to 10.

$W^8$ in formula (3-2) is $C_{1-40}$ alkyl, and is preferably, e.g., $C_{1-20}$ alkyl, wherein a part of or all of the hydrogen atoms of the alkyl are optionally substituted by fluorine atoms. Examples of the alkyl include, e.g., the alkyl groups in the scope of $W^1$ in formula (3-1). The $C_{3-40}$ monovalent organic group containing an alicyclic group of $W^8$ may include, e.g., cholestenyl, cholestanyl or adamantyl.

Examples of the divalent aromatic group, the heterocyclic group, or the fused-ring group in the scope of $W^9$ and $W^{11}$ may include the examples of the divalent aromatic group, the heterocyclic group, or the fused-ring group in the scope of $W^3$ and $W^5$ in formula (3-1).

Specific examples of the compound represented by formula (3-2) include at least one of the compounds represented by formulae (3-2-1) to (3-2-11).

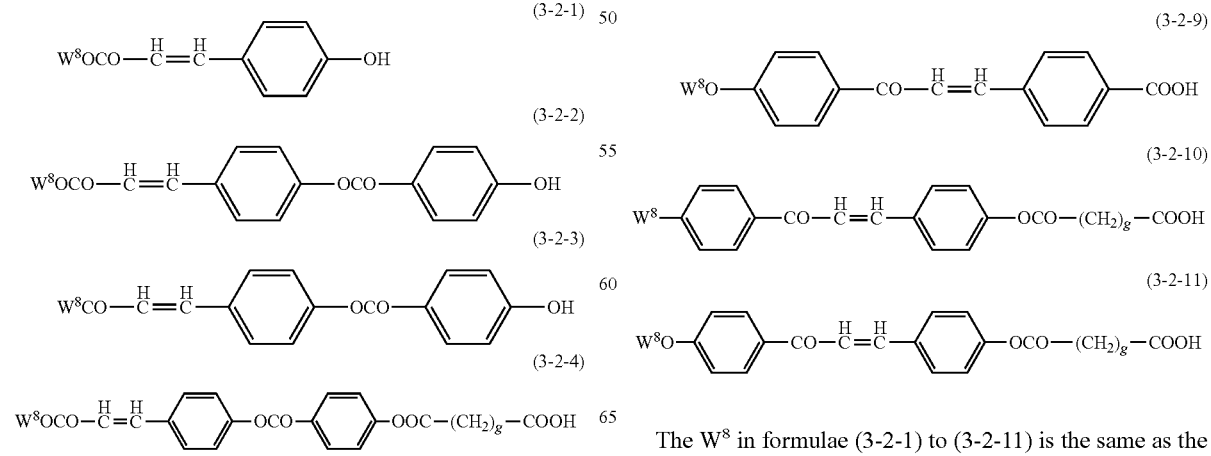

The $W^8$ in formulae (3-2-1) to (3-2-11) is the same as the $W^8$ in formula (3-2), and g represents an integer of 1 to 10.

Moreover, without compromising the effect of the invention, a part of the cinnamic acid derivative may be substituted by a compound represented by formula (3-3) below.

(3-3)

In formula (3-3), $W^{15}$ represents $C_{4-20}$ alkyl, $C_{4-20}$ alkoxy, or a $C_{3-40}$ monovalent organic group containing an alicyclic group, wherein a part of or all of the hydrogen atoms of the alkyl or alkoxy are optionally substituted by fluorine atoms; $W^{16}$ represents a single bond or phenylene, wherein when $W^{15}$ is an alkoxy group, $W^{16}$ is phenylene; $W^{17}$ represents carboxyl, hydroxyl, —SH, —NCO, or —NHW, wherein W represents hydrogen or at least one of $C_{1-6}$ alkyl, —CH=$CH_2$, and —$SO_2Cl$.

The cinnamic acid derivative (b-2) is preferably a compound represented by formula (3-1-3), (3-1-9), (3-1-11), (3-1-23), (3-1-24), (3-1-30), (3-2-2), (3-2-7), or (3-2-9), or a combination of the compounds.

Based on a total amount of 1 mole of the monomers in the second mixture, the amount of the cinnamic acid derivative (b-2) is 0.1 to 0.9 mole, preferably 0.15 to 0.8 mole, and more preferably 0.2 to 0.7 mole. In a case that the cinnamic acid derivative (b-2) is not used in the photosensitive polysiloxane (B), the LCD element has the issue of poor reliability and is likely to have residual image.

Aromatic Heterocyclic Derivative (b-3) Containing Nitrogen, Oxygen or Sulfur

The aromatic heterocyclic derivative (b-3) containing nitrogen, oxygen or sulfur includes a compound represented by formula (4).

(4)

In formula (4), $X_1$ represents a functional group having reactivity to epoxy group; $X_2$ represents a single bond, or at least one divalent organic group selected from the group consisting of a $C_{1-20}$ aliphatic hydrocarbon group, a non-aromatic cyclic hydrocarbon group and an aromatic hydrocarbon group; $X_3$ represents a single bond, or at least one divalent group selected from the group consisting of —O—, —$NQ^2$-, —$CONQ^2$-, —$NQ^2CO$—, —COO—, —OCO—, —CO—, —$NQ^2(CH_2)_r$— and —$O(CH_2)_r$—, wherein r represents an integer of 1 to 5 and $Q^2$ represents hydrogen or $C_{1-3}$ alkyl; and $X_4$ represents an aromatic heterocyclic ring containing nitrogen, oxygen or sulfur.

In formula (4), $X_1$ represents at least one monovalent organic group selected from the group consisting of HO—, $HNQ^1$-, $HCONQ^1$-, $HNQ^1CO$— and HOCO—, wherein $Q^1$ represents hydrogen or $C_{1-3}$ alkyl. $X_1$ is preferably HO—, $HNQ^1$-, $HCONQ^1$- or $HNQ^1CO$—.

$X_2$ represents a single bond, or at least one divalent organic group selected from the group consisting of a $C_{1-20}$ aliphatic hydrocarbon group, a non-aromatic cyclic hydrocarbon group and an aromatic hydrocarbon group. The $C_{1-20}$ aliphatic hydrocarbon group may be straight or branched. The $C_{1-20}$ aliphatic hydrocarbon group may also have an unsaturated bond. $X_2$ is preferably a $C_{1-10}$ aliphatic hydrocarbon group.

The non-aromatic cyclic hydrocarbon group may be exemplified by a cyclopropane ring, a cyclobutane ring, a cyclopentane ring, a cyclohexane ring, a cycloheptane ring, a cyclooctane ring, a cyclononane ring, a cyclodecane ring, a cycloundecane ring, a cyclododecane ring, a cyclotridecane ring, a cyclotetradecane ring, a cyclopentadecane ring, a cyclohexadecane ring, a cycloheptadecane ring, a cyclooctadecane ring, a cyclononadecane ring, a cycloeicosane ring, a tricycloeicosane ring, a tricyclodecane ring, a bicyclobutane ring, a decahydronaphthalene ring, a norbomene ring, and an adamantane ring.

The aromatic hydrocarbon group may be exemplified by a benzene ring, a naphthalene ring, a tetrahydronaphthalene ring, an azulene ring, an indene ring, a fluorene ring, an anthracene ring, a phenanthrene, and a phenalene ring.

$X^2$ is preferably a single bond, a $C_{1-10}$ straight or branched alkylene group, a $C_{1-10}$ unsaturated alkenylene group, a cyclopropane ring, a cyclobutane ring, a cyclopentane ring, a cyclohexane ring, a cycloheptane ring, a norbornene ring, an adamantane ring, a benzene ring, a naphthalene ring, a tetrahydronaphthalene ring, a fluorene ring, or an anthracene ring. $X^2$ is more preferably a single bond, a $C_{1-10}$ straight or branched alkylene group, a $C_{1-10}$ unsaturated alkenylene group, a cyclohexane ring, a norbornene ring, an adamantane ring, a benzene ring, a naphthalene ring, a fluorene ring, or an anthracene ring. $X^2$ is yet more preferably a single bond, a $C_{1-10}$ straight or branched alkylene group, cyclohexylene, phenylene, or naphthylene. $X^2$ is even more preferably a single bond, a $C_{1-5}$ straight or branched alkylene group, or phenylene. $X^2$ is yet even more preferably a single bond, a $C_{1-3}$ straight alkylene group, or phenylene.

$X_3$ represents a single bond, or at least one divalent group selected from the group consisting of —O—, —$NQ^2$-, —$CONQ^2$-, —$NQ^2CO$—, —COO—, —OCO—, —CO—, —$NQ^2(CH_2)_r$— and —$O(CH_2)_r$—, wherein r represents an integer of 1 to 5, $Q^2$ represents hydrogen or $C_{1-3}$ alkyl. $X_3$ is preferably a single bond, —O—, —$CONQ^2$-, —$NQ^2CO$—, —COO—, —OCO—, —CO—, —$NQ^2(CH_2)_r$— or —$O(CH_2)_r$—, and is more preferably a single bond, —OCO—, —CO—, —$NQ^2(CH_2)_r$— or —$O(CH_2)_r$—.

$X_4$ represents an aromatic heterocyclic ring containing nitrogen, oxygen or sulfur. Further, a nitrogen-containing aromatic heterocyclic ring contains at least one structure selected from the group consisting of formulae (4-I), (4-II) and (4-III) below:

(4-I)

(4-II)

(4-III)

wherein $Y_1$ represents a $C_{1-5}$ straight or branched alkyl group.

The nitrogen-containing aromatic heterocyclic ring may be exemplified by a pyrrole ring, an imidazole ring, an oxazole ring, a thiazole ring, a pyrazole ring, a pyridine ring, a pyrimidine ring, a quinoline ring, a pyrazoline ring, an isoquinoline ring, a carbazole ring, a purine ring, a thiadiazole ring, a pyridazine ring, a triazine ring, a pyrazolidine ring, a triazole ring, a piperidine ring, a benzimidazole ring, a thianoxaline ring, a phenanthroline ring, an indole ring, a quinoxaline ring, a benzothiazole ring, a phenothiazine ring, an oxadiazole ring, and an acridine ring. The nitrogen-containing aromatic heterocyclic ring is preferably a pyrrole ring, an imidazole ring, a pyrazole ring, a pyridine ring, a pyrimidine ring, a pyrazoline ring, a carbazole ring, a pyridazine ring, a triazine ring, a pyrazolidine ring, a triazole ring, a piperidine ring, or a benzimidazole ring. The nitrogen-containing aromatic heterocyclic ring is more preferably a pyrrole ring, an imidazole ring, a pyrazole ring, a pyridine ring, a pyrimidine ring, a triazine ring, a triazole ring, a piperidine ring, or a benzimidazole ring. The nitrogen-containing aromatic heterocyclic ring is yet more preferably a pyrrole ring, an imidazole ring, a pyrazole ring, a pyridine ring, or a pyrimidine ring. The nitrogen-containing aromatic heterocyclic ring is even more preferably an imidazole ring, a pyrazole ring, a pyridine ring, or a pyrimidine ring.

An oxygen-containing or a sulfur-containing aromatic heterocyclic ring contains a structure selected from formula (4-IV) below:

(4-IV)

wherein X represents —O— or —S—.

The oxygen- or sulfur-containing aromatic heterocyclic ring may be exemplified by a pyran ring, a furan ring, an isobenzofuran ring, a thianthrene ring, a thiophene ring, a chromane ring, an isochromane ring, a phenoxathiine ring, a xanthene ring, a chromene ring or an isochromene ring, and is preferably a thiophene ring or a furan ring.

Specific examples of the compound represented by formula (4) include at least one of the compounds represented by formulae (4-1) to (4-248).

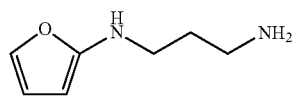

(4-1)

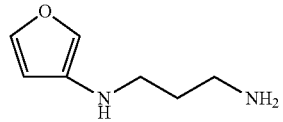

(4-2)

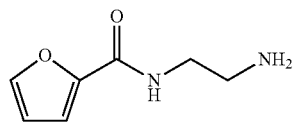

(4-3)

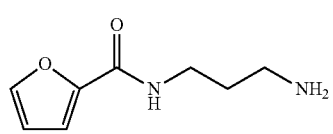

(4-4)

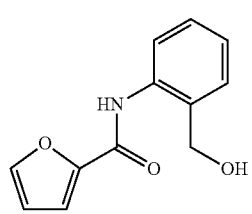

(4-5)

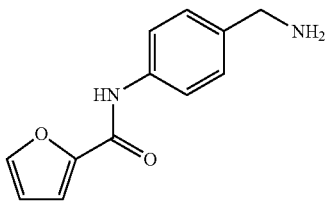

(4-6)

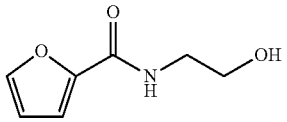

(4-7)

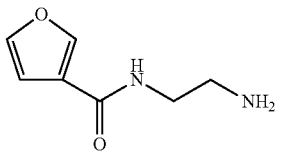

(4-8)

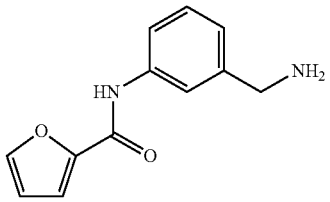

(4-9)

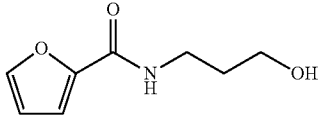

(4-10)

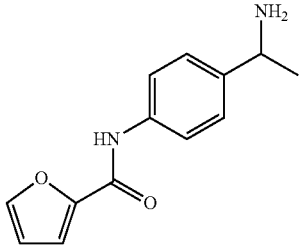

(4-11)

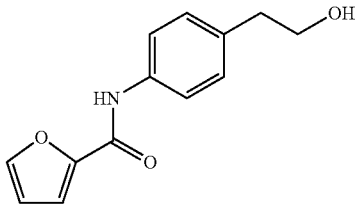

(4-12)

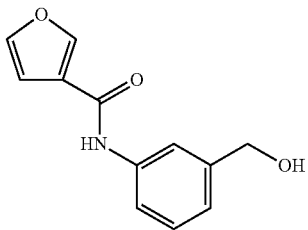

(4-13)

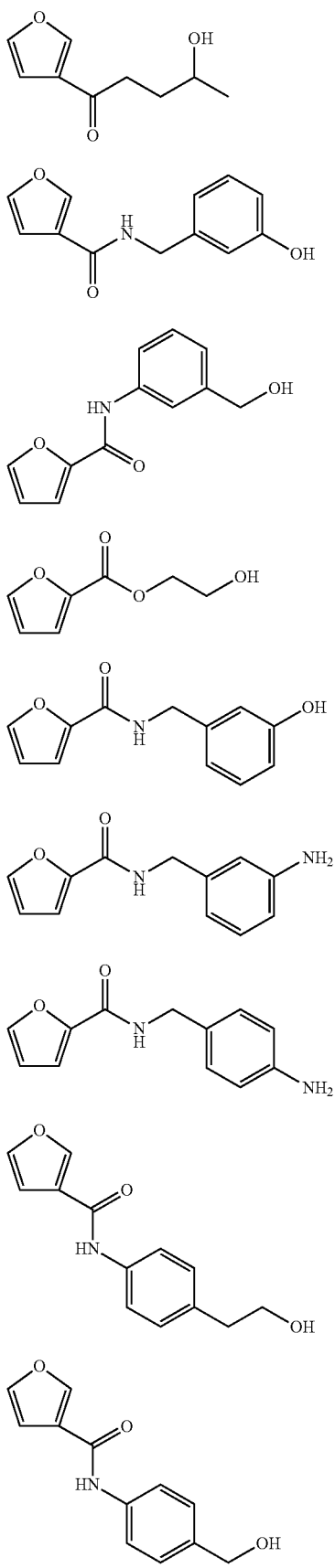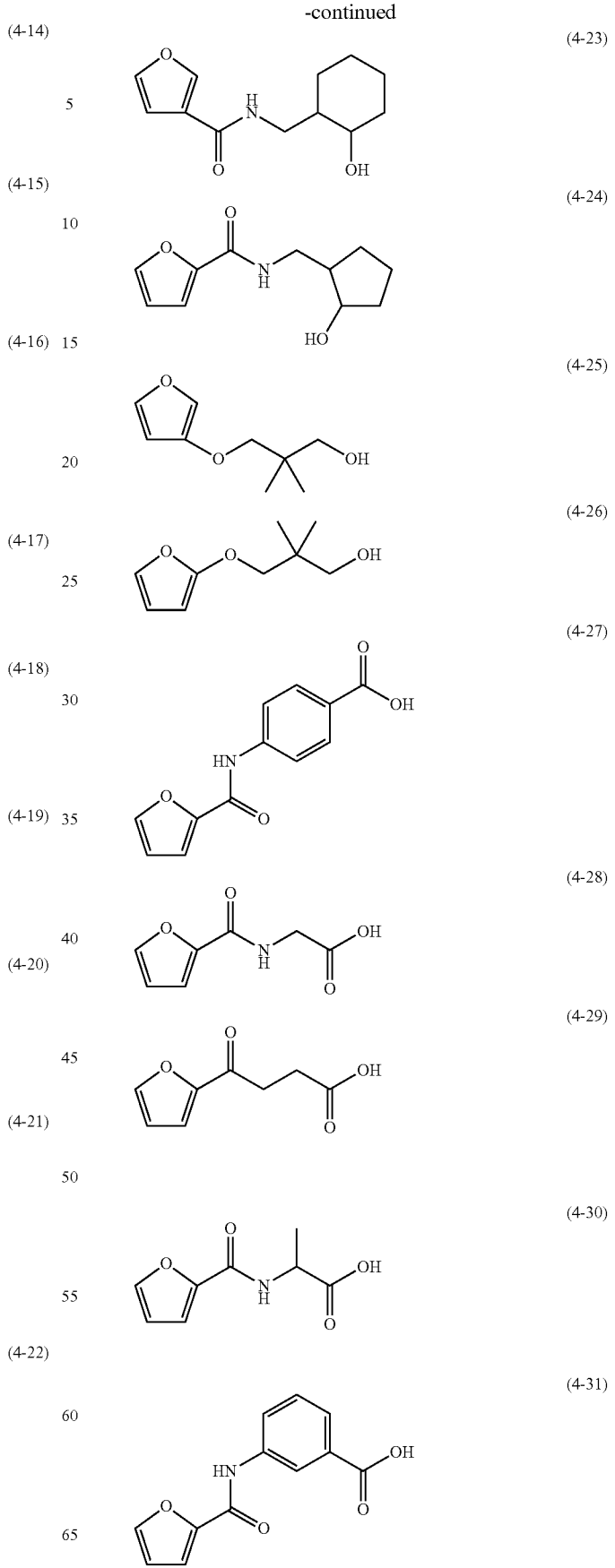

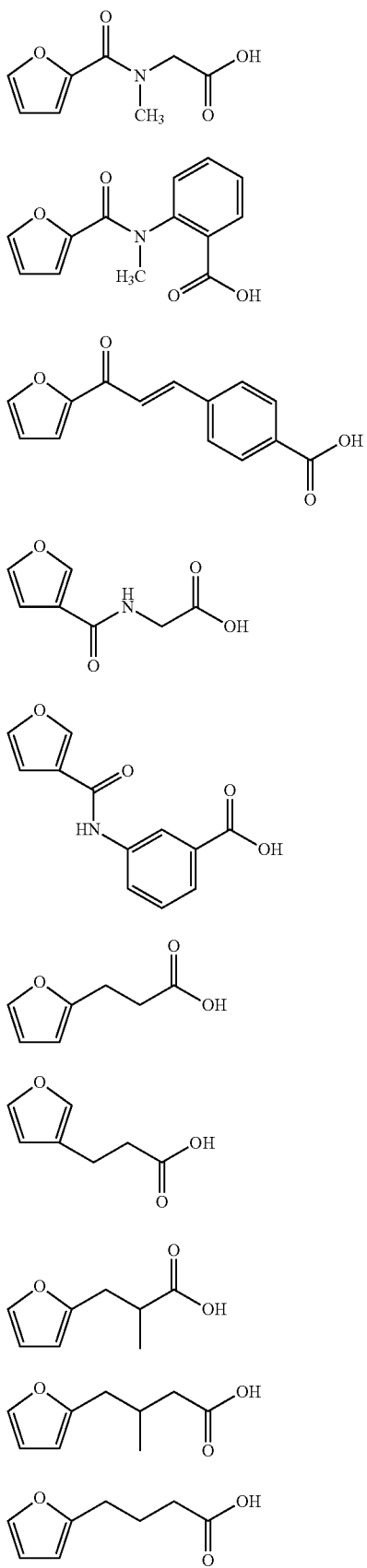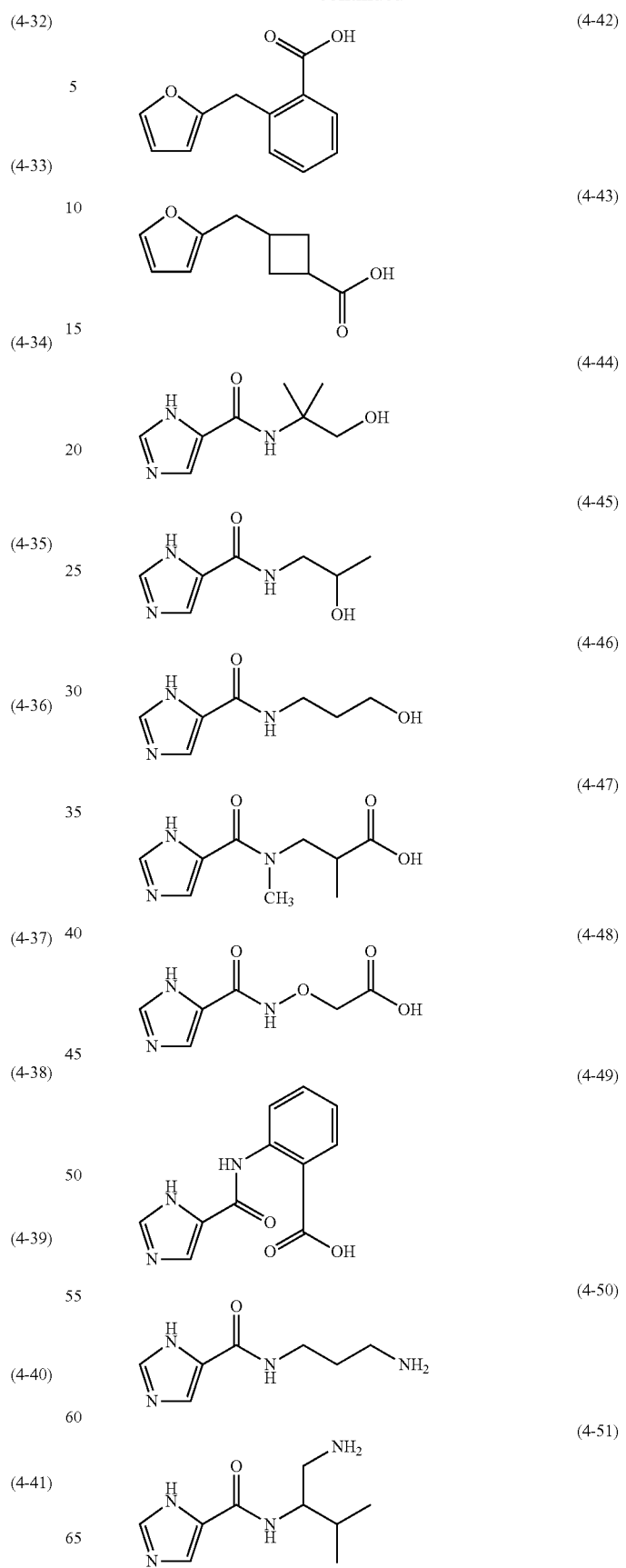

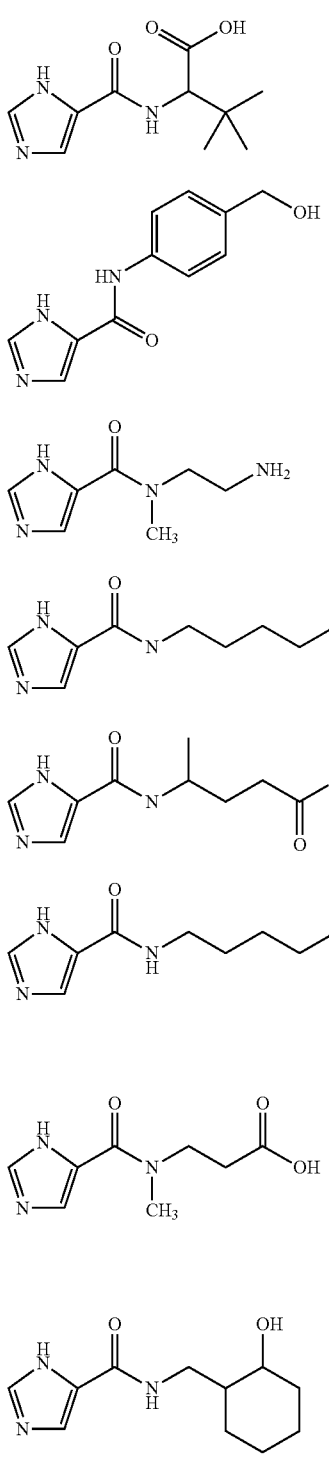
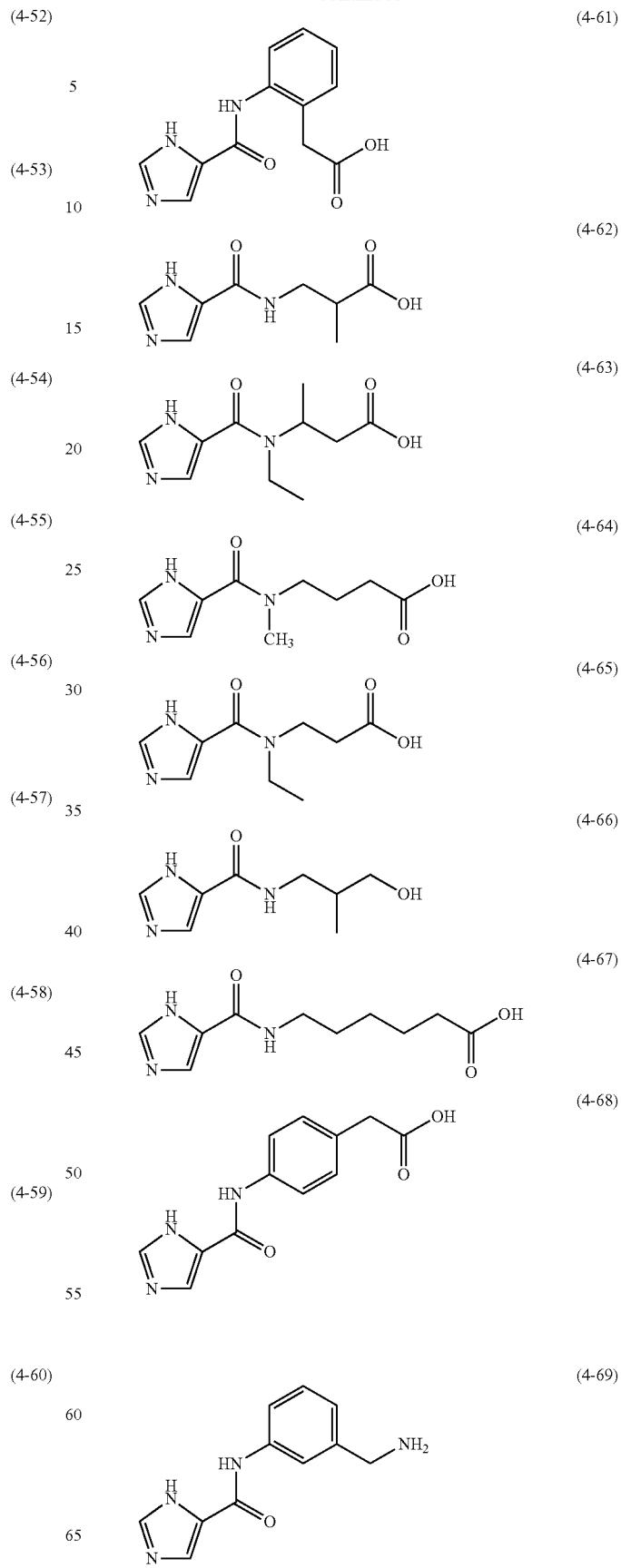

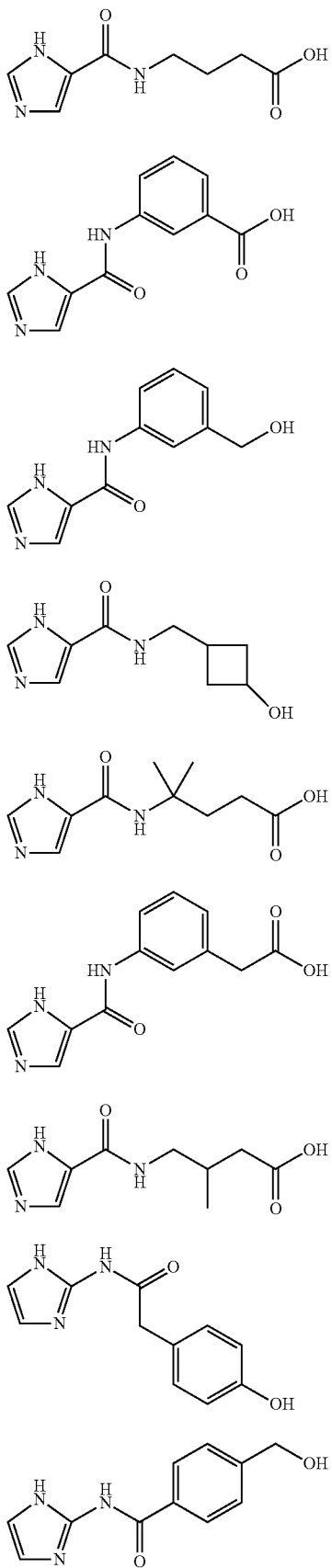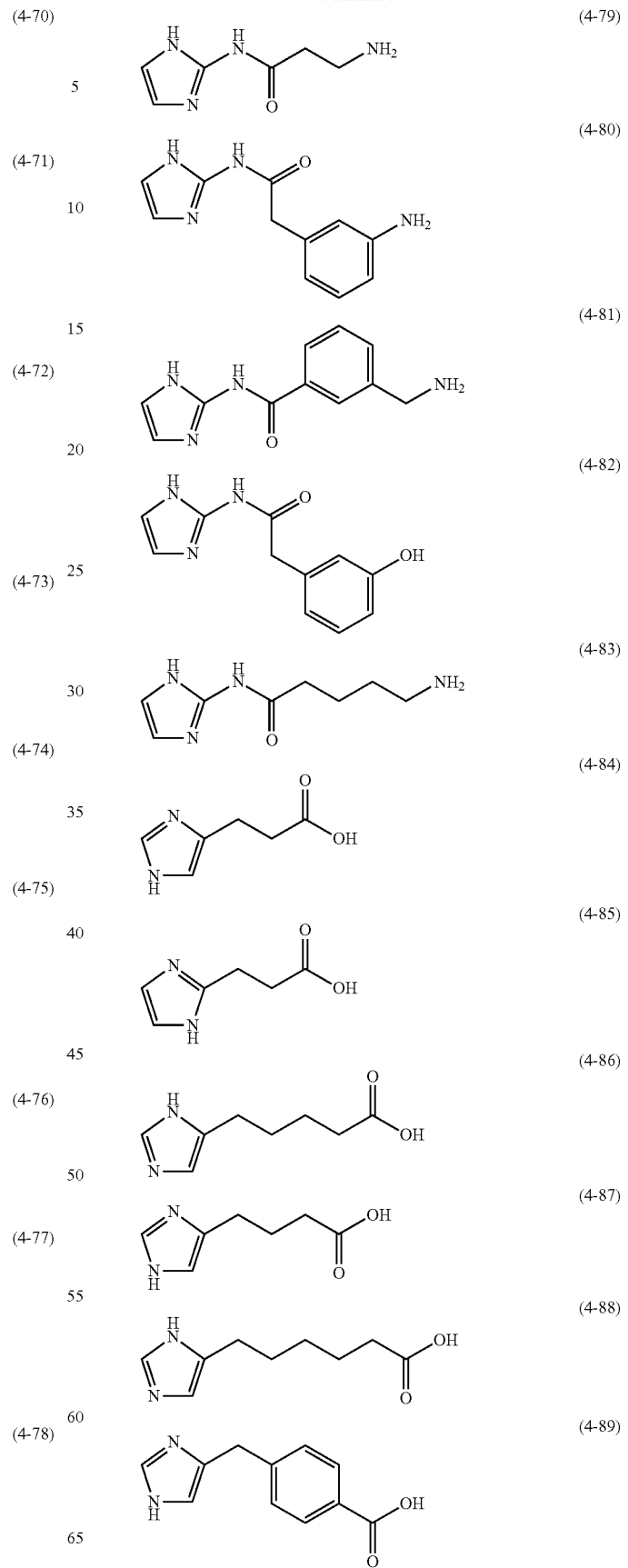

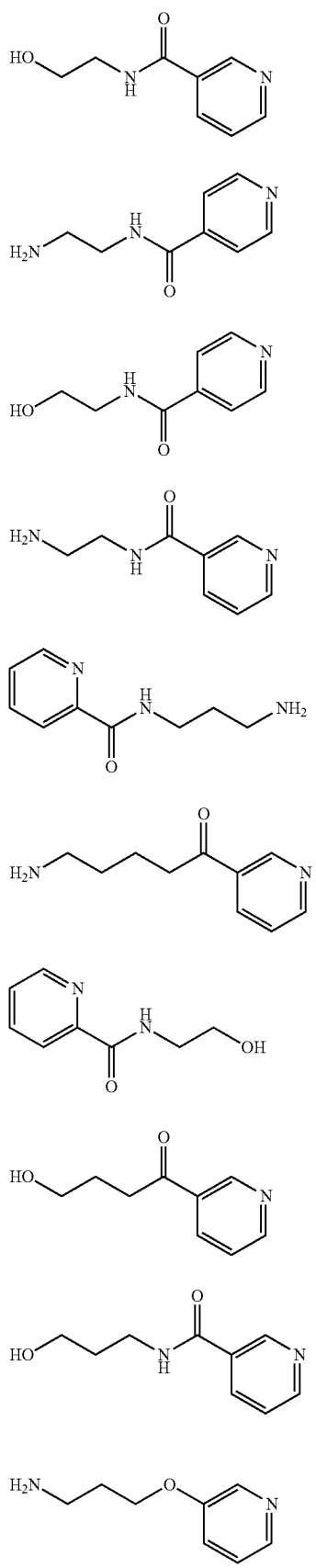
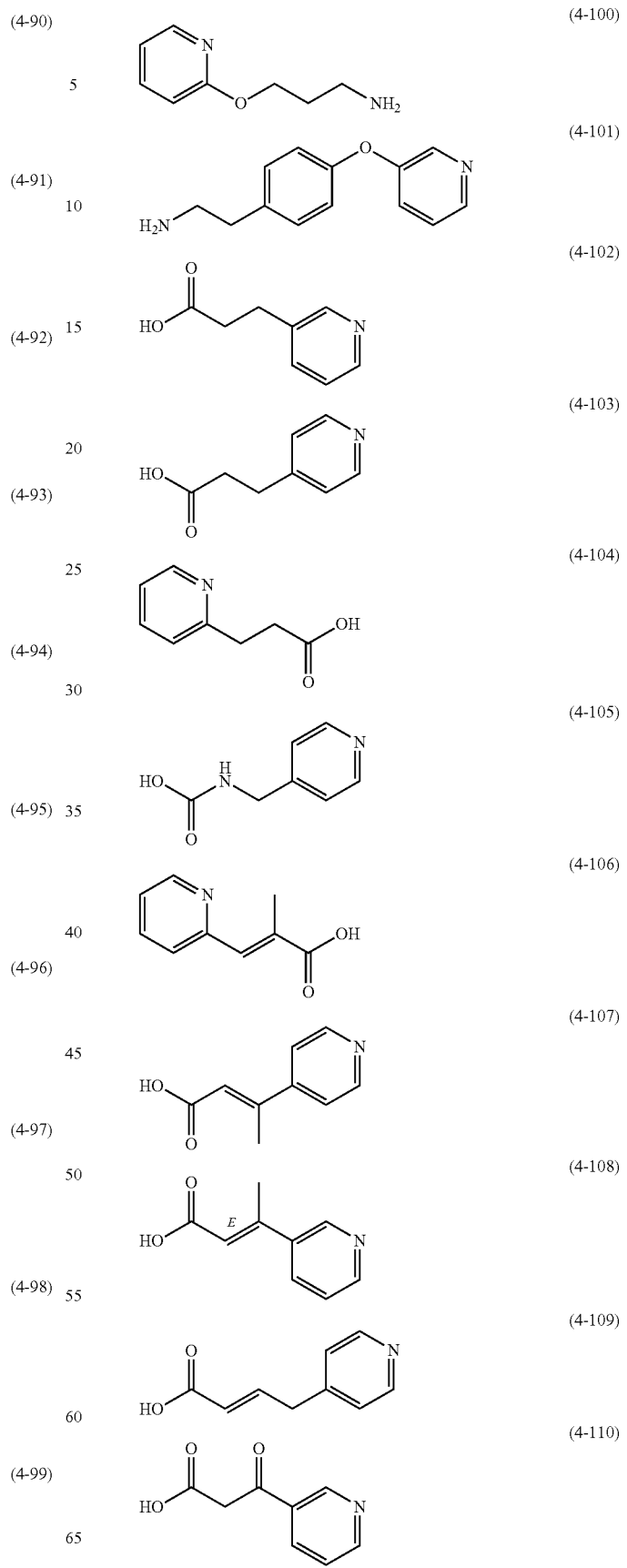

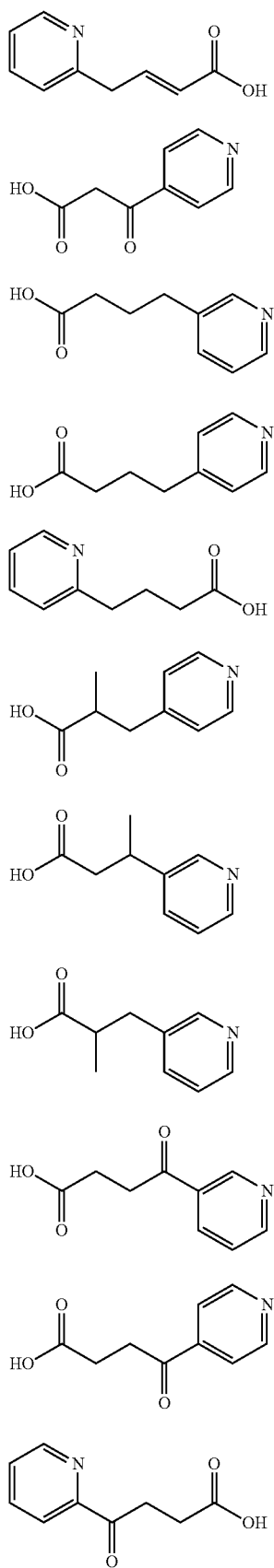
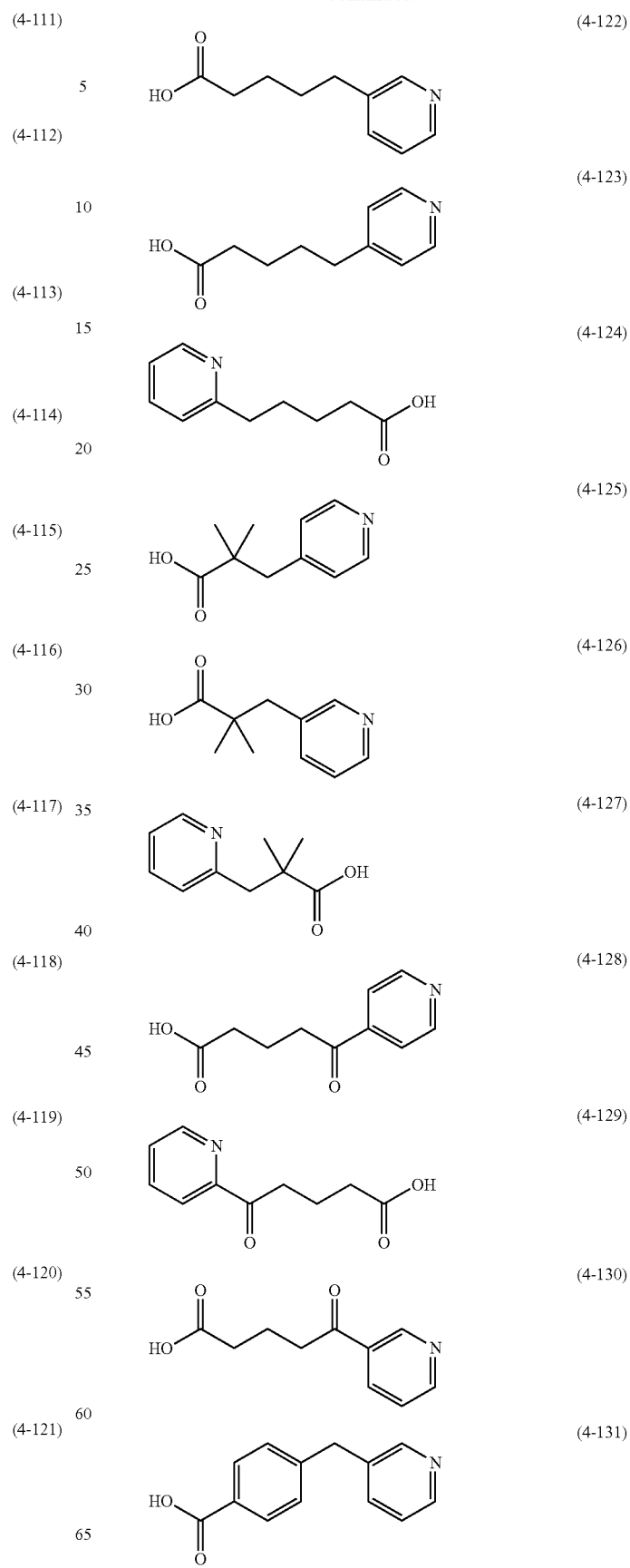

(4-132)
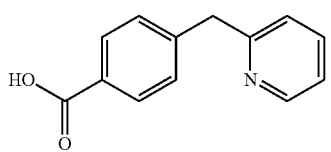
(4-133)
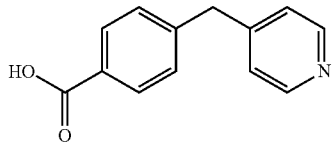
(4-134)
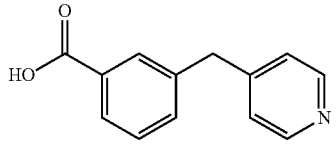
(4-135)
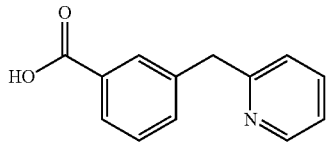
(4-136)
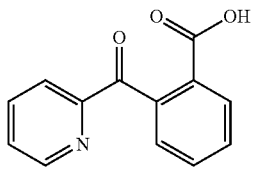
(4-137)
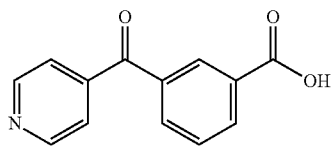
(4-138)
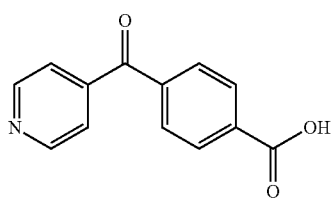
(4-139)
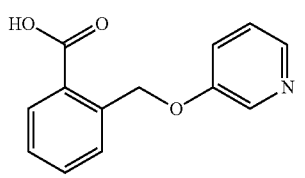
(4-140)
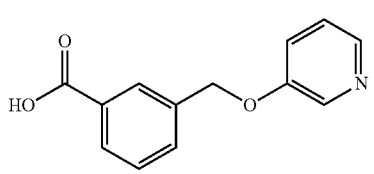
(4-141)
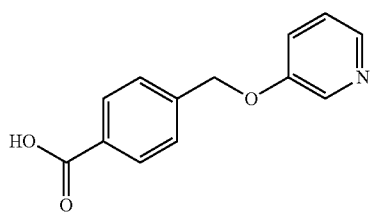
(4-142)
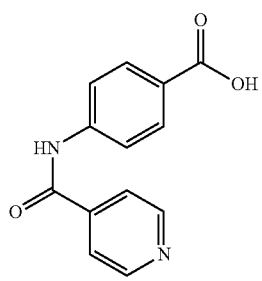
(4-143)
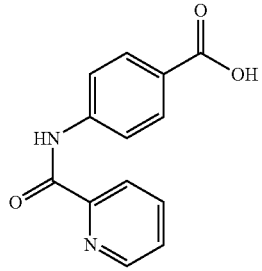
(4-144)
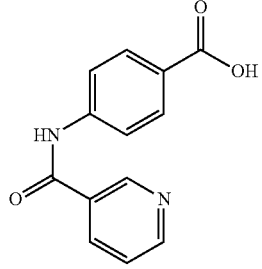
(4-145)
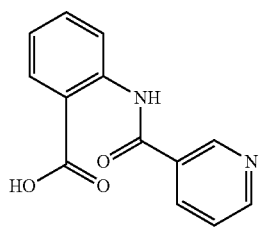
(4-146)
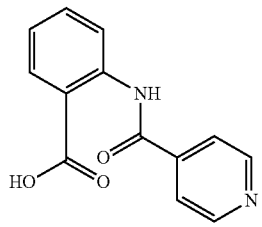

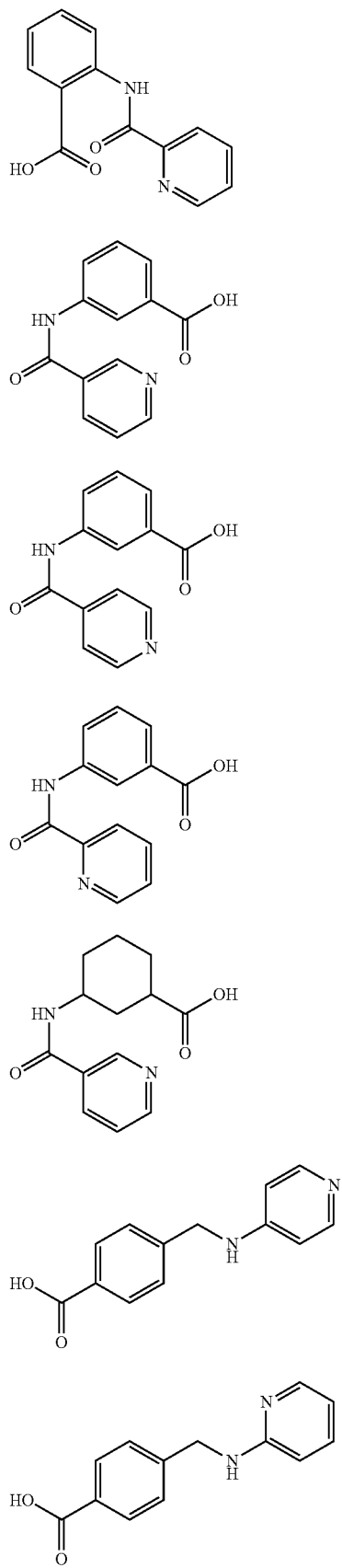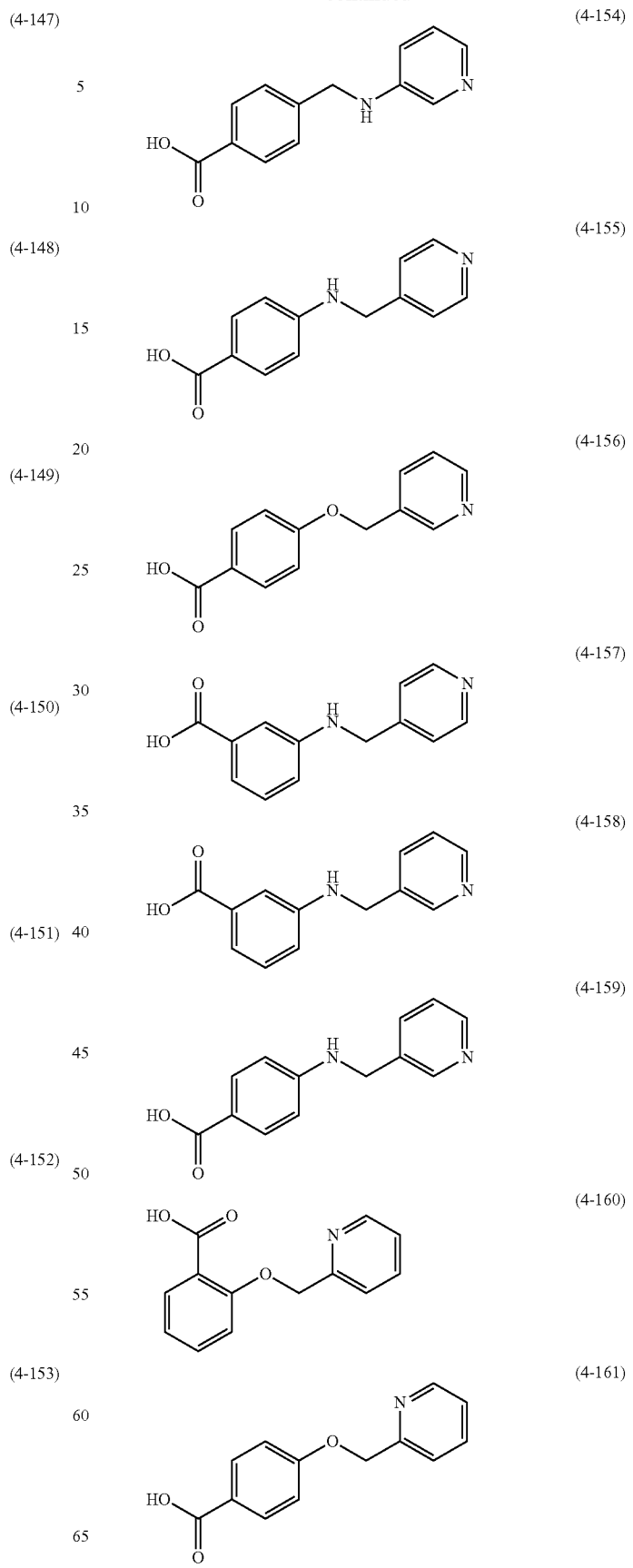

(4-162) 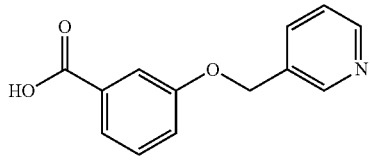
(4-163) 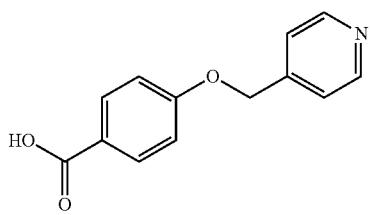
(4-164) 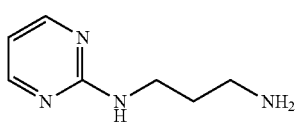
(4-165) 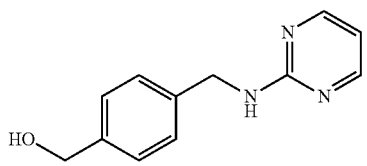
(4-166) 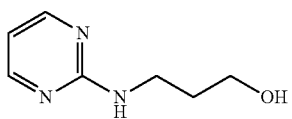
(4-167) 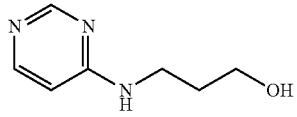
(4-168) 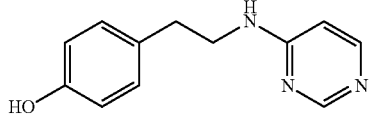
(4-169) 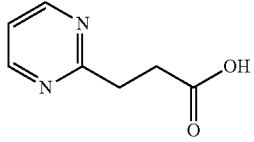
(4-170) 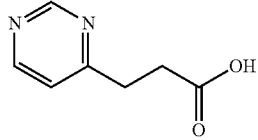
(4-171) 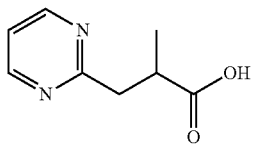
(4-172)
(4-173)
(4-174)
(4-175)
(4-176)
(4-177)
(4-178)
(4-179)
(4-180)

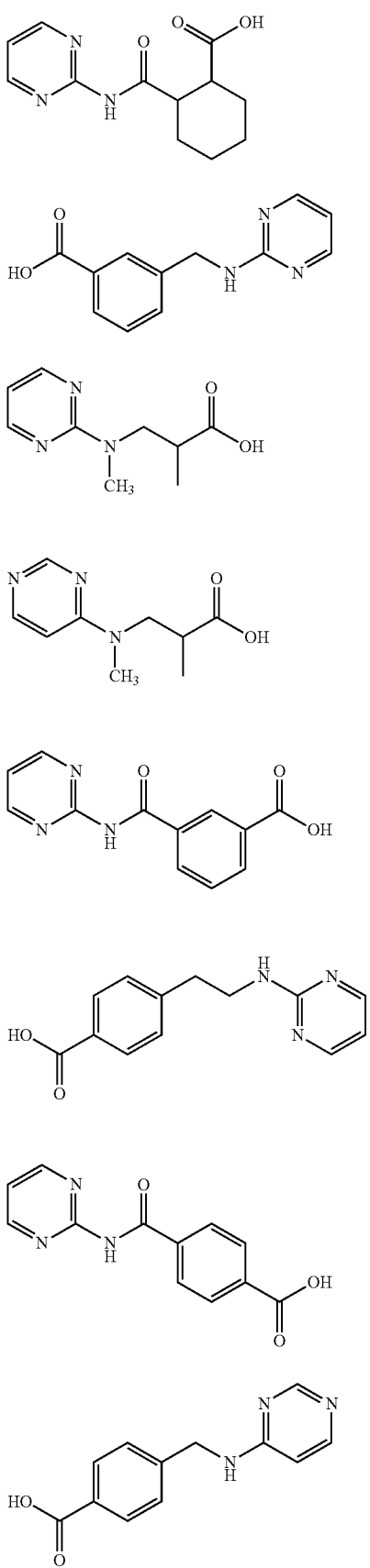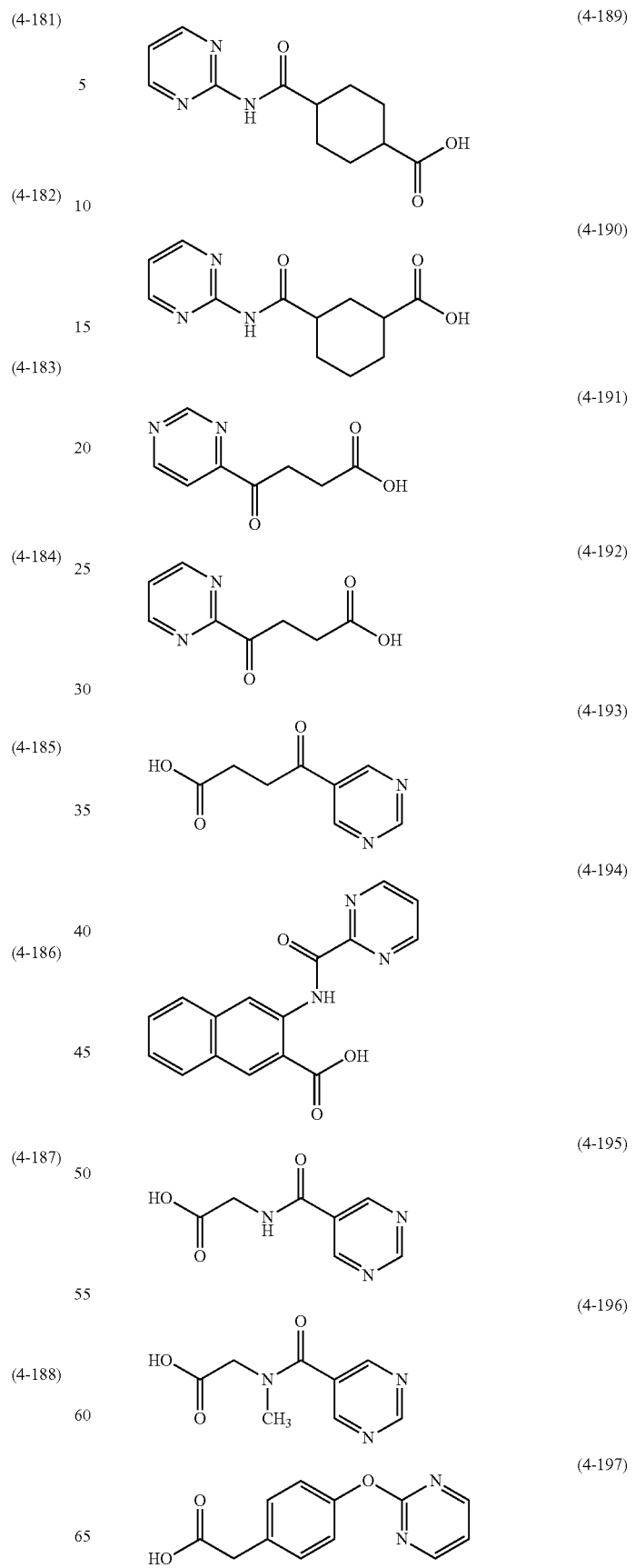

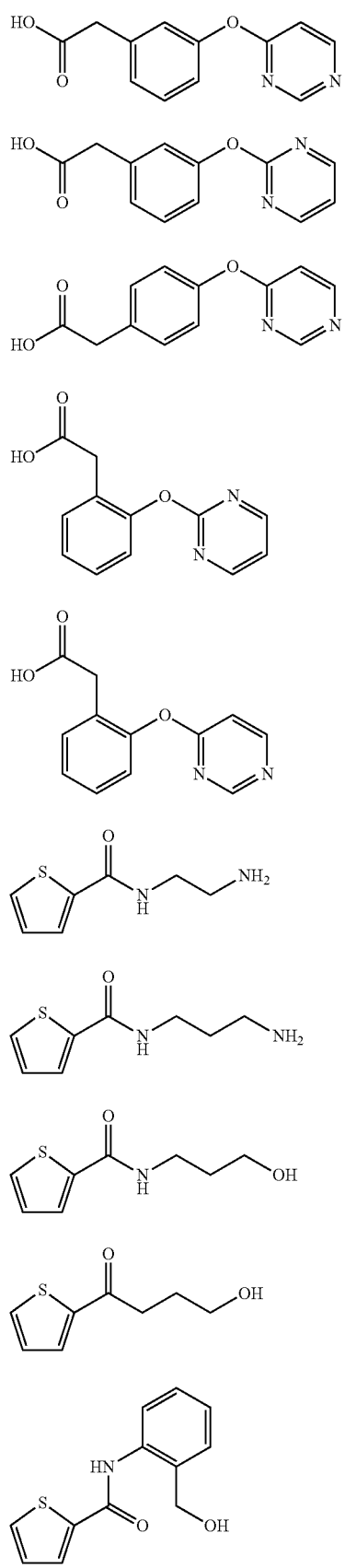
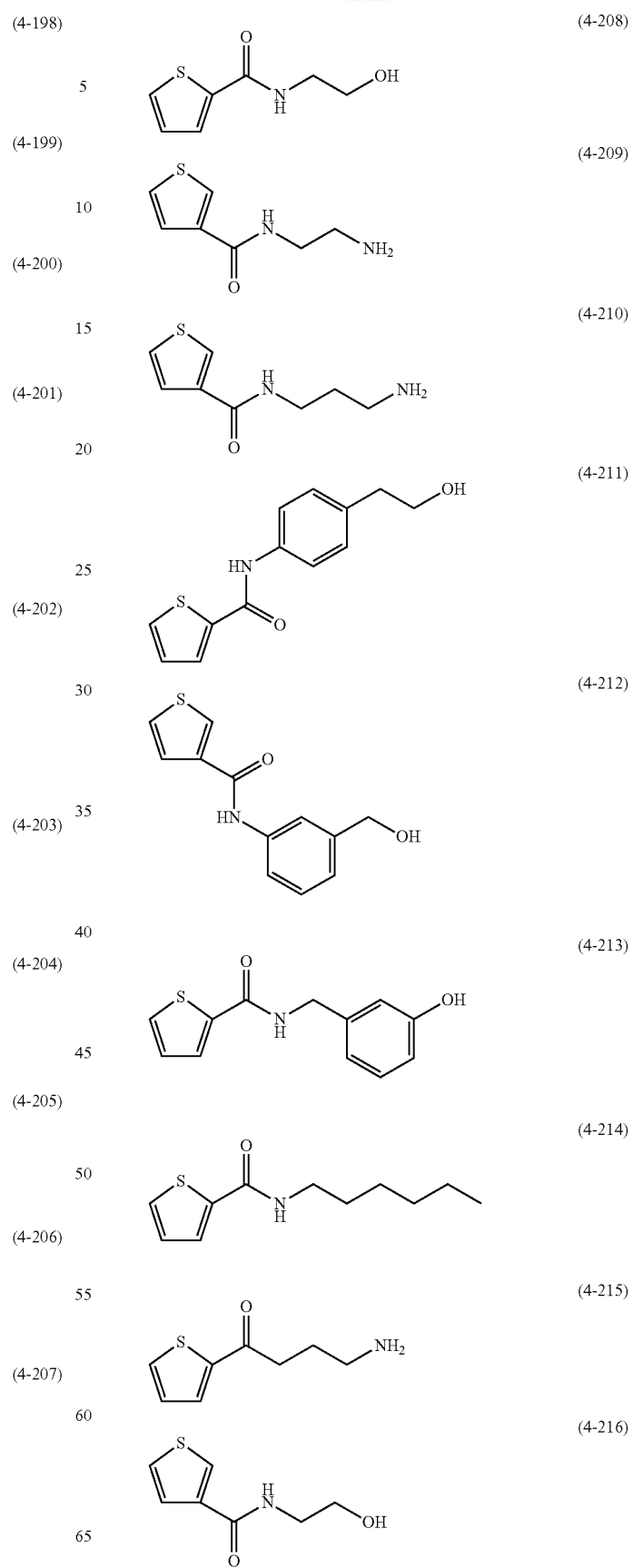

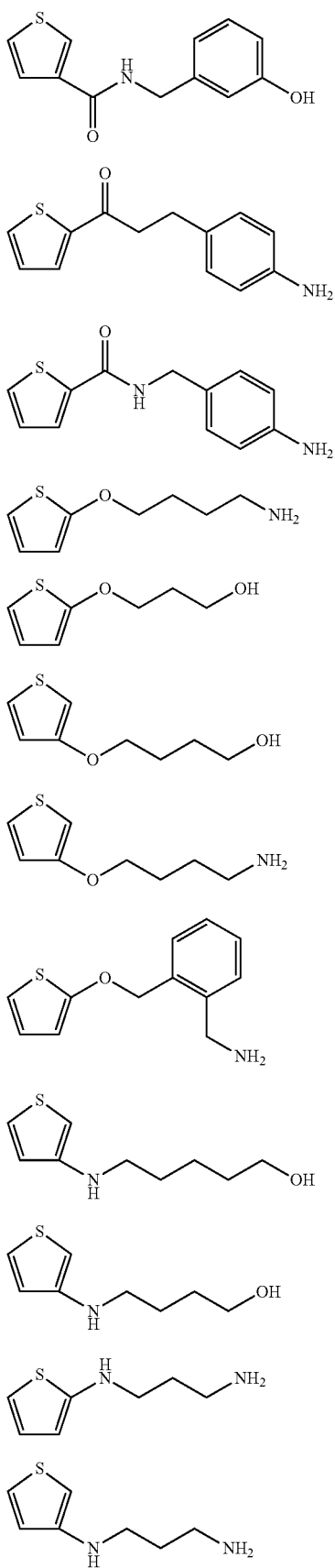
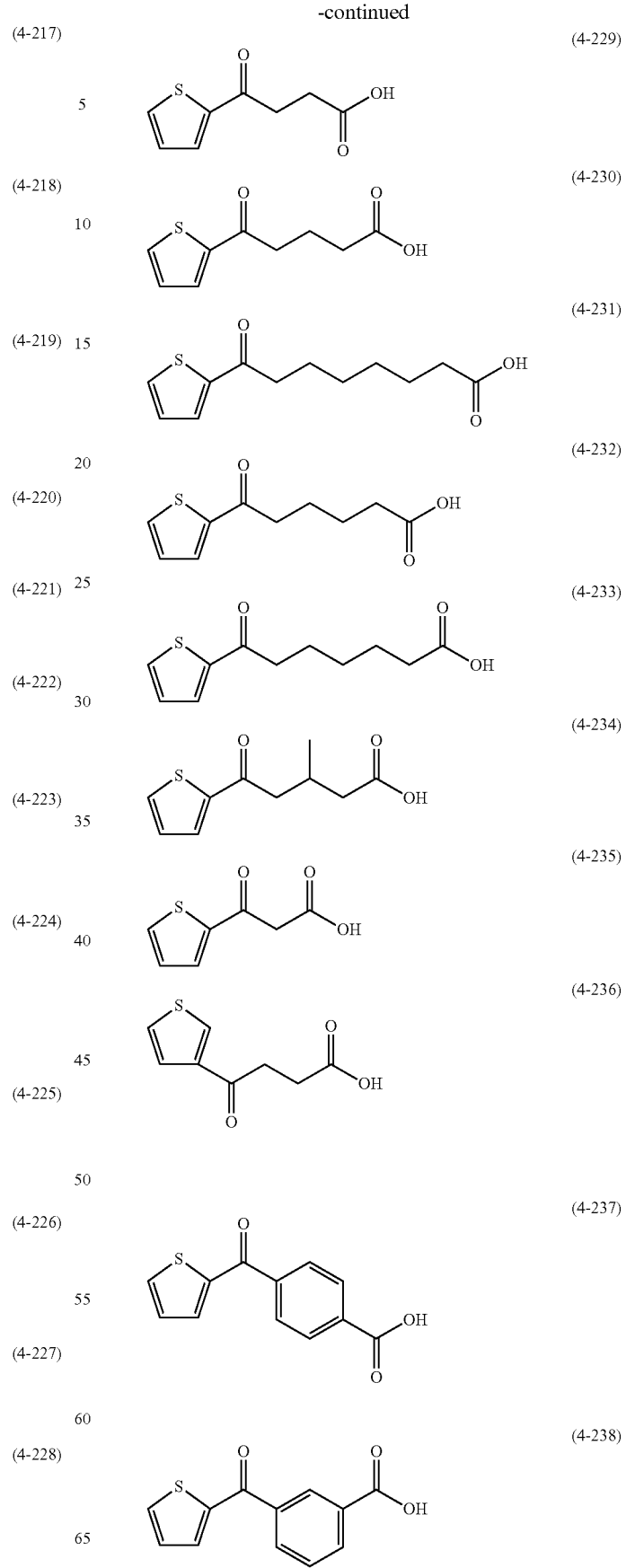

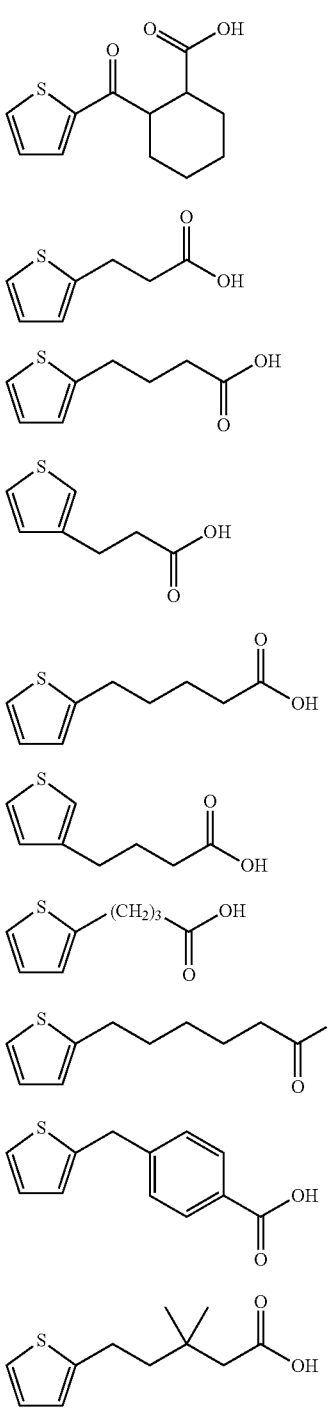

(4-239)
(4-240)
(4-241)
(4-242)
(4-243)
(4-244)
(4-245)
(4-246)
(4-247)
(4-248)

The aromatic heterocyclic derivative containing nitrogen, oxygen or sulfur (b-3) is preferably a compound represented by formula (4-3), (4-27), (4-77), (4-84), (4-100), (4-102), (4-105), (4-142), (4-168), (4-179), (4-211) or (4-229), or a combination of the compounds.

In a case that the aromatic heterocyclic derivative (b-3) containing nitrogen, oxygen or sulfur is not used in the photosensitive polysiloxane (B), the LCD element has the issue of poor reliability and is likely to have residual image.

The molar ratio (b-2)/(b-3) of the cinnamic acid derivative (b-2) to the aromatic heterocyclic derivative (b-3) containing nitrogen, oxygen or sulfur is 2 to 20, preferably 2.5 to 15, and more preferably 3 to 12. When the molar ratio (b-2)/(b-3) is in the above range, the LCD has better reliability.

Method of Preparing Photosensitive Polysiloxane (B)

The photosensitive polysiloxane (B) used in the invention can be synthesized by reacting the polysiloxane (b-1) containing an epoxy group with the cinnamic acid derivative (b-2) and the aromatic heterocyclic derivative (b-3) containing nitrogen, oxygen or sulfur in the presence of a catalyst.

The catalyst may include an organic salt, or a known compound such as a curing promoter capable of facilitating the reaction of an epoxy compound and an anhydride.

The organic salt may include, e.g., a primary or secondary organic amine such as ethylamine, diethylamine, piperazine, piperidine, pyrrolidine or pyrrole, a tertiary organic amine such as triethylamine, tri-n-propylamine, tri-n-butylamine, pyridine, 4-dimethylaminopyridine or diazabicycloundecene, or a quaternary organic amine such as tetramethylammonium hydroxide. Among these organic amines, a tertiary organic amine such as triethylamine, tri-n-propylamine, tri-n-butylamine, pyridine, or 4-dimethylaminopyridine, or a quaternary organic amine such as tetramethylammonium hydroxide is preferred.

Specific examples of the curing promoter include, e.g., tertiary amines, such as benzyldimethylamine, 2,4,6-tris(dimethylaminomethyl)phenol, cyclohexyldimethylamine and triethanolamine; imidazole compounds, such as 2-methylimidazole, 2-n-heptyl-imidazole, 2-n-alkylimidazole, 2-phenylimidazole, 2-phenyl-4-methylimidazole, 1-benzyl-2-methylimidazole, 1-benzyl-2-phenylimidazole, 1,2-dimethylimidazole, 2-ethyl-4-methylimidazole, 1-(2-cyanoethyl)-2-methylimidazole, 1-(2-cyanoethyl)-2-5-n-undecylimidazole, 1-(2-cyanoethyl)-2-phenylimidazole, 1-(2-cyanoethyl)-2-ethyl-4-methylimidazole, 2-phenyl-4-methyl-5-hydroxymethylimidazole, 2-phenyl-4,5-bis(hydroxymethyl)imidazole, 1-(2-cyanoethyl)-2-phenyl-4,5-bis[(2'-cyanoethoxy)methyl]imidazole, 1-(2-cyanoethyl)-2-n-undecanyl imidazolium trimellitate, 1-(2-cyanoethyl)-2-phenyl imidazolium trimellitate, 1-(2-cyanoethyl)-2-ethyl-4-methyl imidazolium trimellitate, 2,4-diamino-6-[2'-methylimidazolyl-(1')]ethyl-S-triazine, 2,4-diamino-6-(2'-n-undecylimidazolyl)ethyl-S-triazine, 2,4-diamino-6-[2'-ethyl-4'-methylimidazolyl-(1')]ethyl-S-triazine, an isocyanuric acid adduct of 2-methylimidazole, an isocyanuric acid adduct of 2-phenylimidazole, and an isocyanuric acid adduct of 2,4-diamino-6-[2'-methylimidazolyl-(1')]ethyl-S-triazine; organophosphorus compounds, such as diphenylphosphine, triphenylphosphine, and triphenyl phosphite; quaternary phosphonium salts, such as benzyltriphenylphosphonium chloride, tetra-n-butylphosphonium bromide, methyltriphenylphosphonium bromide, ethyltriphenylphosphonium bromide, n-butyltriphenylphosphonium bromide, tetraphenylphosphonium bromide, ethyltriphenylphosphonium iodide, ethyltriphenylphosphonium acetate, tetra-n-butylphosphonium-O,O-diethyl phosphorodithionate, tetra-n-butylphosphonium benzotriazolate, tetra-n-butylphosphonium tetrafluoroborate, tetra-n-butylphosphonium tetraphenylborate, and tetraphenylphosphonium tetraphenylborate; diazabicycloalkenes, such as 1,8-diazabicyclo[5.4.0]undec-7-ene and an organic acid salt thereof; organometallic compounds, such as zinc octoate, tin octoate, and aluminium acetylacetone complex; quaternary ammonium salts, such as tetraethylammonium bromide, tetra-n-butyl ammonium bromide, tetraethylammonium chloride, and tetra-n-butyl ammonium chloride; boron compounds, such as boron trifluoride and triphenyl borate; metal halogen compounds, such as zinc chloride and tin tetrachloride;

high-melting point dispersion-type latent curing promoters, such as dicyandiamide, and an amine addition-type promoter such as an adduct of an amine and an epoxy resin; microcapsule-type latent curing promoters covering the surface of a curing promoter such as the imidazole compound, the organophosphorus compound, or the quaternary phosphonium salt via a polymer; amine salt-type latent curing promoters; and high-temperature dissociation-type thermal cationic polymerization latent curing promoters, such as a Lewis acid and a Bronsted acid salt.

Specific examples of the curing promoter preferably include quaternary ammonium salts, such as tetraethylammonium bromide, tetra-n-butylammonium bromide, tetraethylammonium chloride, and tetra-n-butylammonium chloride.

Based on 100 weight parts of the polysiloxane (b-1) containing an epoxy group, the amount of the catalyst used is 100 weight parts or less, preferably 0.01 to 100 weight parts, and more preferably 0.1 to 20 weight parts.

The reaction temperature is preferably 0° C. to 200° C., more preferably 50° C. to 150° C. The reaction time is preferably 0.1 to 50 hours, more preferably 0.5 to 20 hours.

The synthesis reaction of the photosensitive polysiloxane (B) can be performed in the presence of an organic solvent as needed. The organic solvent is not particularly limited, and may be the same as or different from the organic solvent used in the preparation of the polysiloxane (b-1) containing an epoxy group and the solvent (C) contained in the liquid crystal alignment agent of the invention. Specific examples of the organic solvent are preferably 2-butanone, 2-hexanone, methyl isobutyl ketone, n-butyl acetate, and a combination thereof.

Based on a total amount of 100 weight parts of the polymer (A) used, the amount of the photosensitive polysiloxane (B) used is 3 to 50 weight parts, preferably 4 to 45 weight parts, and more preferably 5 to 40 weight parts. If the liquid crystal alignment agent does not include the photosensitive polysiloxane (B), the LCD element has the issue of poor reliability and is likely to have residual image.

Solvent (C)

The solvent used in the liquid crystal alignment agent of the invention is not particularly limited, as long as being able to dissolve the polymer (A), the photosensitive polysiloxane (B), and any other components without reacting therewith. The solvent is preferably the same as the solvent used in the synthesis of the polyamic acid, and the poor solvent used in the synthesis of the polyamic acid can also be used together.

Specific examples of the solvent (C) include, but are not limited to, N-methyl-2-pyrrolidone (NMP), γ-butyrolactone, γ-butyrolactam, 4-hydroxy-4-methyl-2-pentanone, ethylene glycol monomethyl ether, butyl lactate, butyl acetate, methyl methoxypropionate, ethyl ethoxypropionate, ethylene glycol monomethyl ether, ethylene glycol monoethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, N,N-dimethylformamide, and N,N-dimethylacetamide. The solvents (C) can be used alone or in combination.

Based on 100 weight parts of the polymer (A) used, the amount of the solvent (C) used is 1000 to 8000 weight parts, preferably 1200 to 7000 weight parts, and more preferably 1500 to 6000 weight parts.

Additive (D)

Without affecting the efficacy of the invention, an additive (D) can optionally further be added to the liquid crystal alignment agent. The additive (D) includes a compound having at least two epoxy groups, a silane compound having a functional group, or a combination thereof.

Examples of the compound having at least two epoxy groups include, but are not limited to, ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerol diglycidyl ether, 2,2-dibromo-neopentyl glycol diglycidyl ether, 1,3,5,6-tetraglycidyl-2,4-hexanediol, N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane, 3-(N,N-diglycidyl) aminopropyltrimethoxysilane, and a combination of the compounds.

The compounds having at least two epoxy groups can be used alone or in combination.

Based on 100 weight parts of the polymer (A) used, the amount of the compound with at least two epoxy groups may be 0 to 40 weight parts, preferably 0.1 to 30 weight parts.

Specific examples of the silane compound having a functional group include, but are not limited to, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane, and a combination of the compounds.

The silicon compounds having a functional group can be used alone or in combination.

Based on 100 weight parts of the polymer (A), the amount of the silane compound having a functional group may be 0 to 10 weight parts, and preferably 0.5 to 10 weight parts.

Based on 100 weight parts of the polymer (A) used, the amount of the additive (D) used is preferably 0.5 to 50 weight parts, and more preferably 1 to 45 weight parts.

<Method of Preparing Liquid Crystal Alignment Agent>

The method of preparing the liquid crystal alignment agent of the invention is not particularly limited, and a general mixing method can be used. For instance, the polymer (A) and the photosensitive polysiloxane (B) formed by the above methods are uniformly mixed to form a mixture, the solvent (C) is then added at a temperature of 0° C. to 200° C., the additive (D) is optionally added then, and then the mixture is continuously stirred with a stirring apparatus until being dissolved. Moreover, the solvent (C) is preferably added at a temperature of 20° C. to 60° C.

At 25° C., the viscosity of the liquid crystal alignment agent of the invention is generally 15 cps to 35 cps, preferably 17 cps to 33 cps, and more preferably 20 cps to 30 cps.

<Method of Preparing Liquid Crystal Alignment Film>

The liquid crystal alignment agent of the invention is suitable for forming a liquid crystal alignment film through a photoalignment method.

The method of forming the liquid crystal alignment film may include, e.g., coating the liquid crystal alignment agent on a substrate to form a coating film, and irradiating the same with polarized or non-polarized radiation from a direction inclined to the surface thereof or irradiating the same with polarized radiation from a direction perpendicular to the surface thereof, to provide liquid crystal alignment capability to the coating film.

First, the liquid crystal alignment agent of the invention is coated on one side of a transparent conductive film of a substrate on which a patterned transparent conductive film is disposed, through a suitable coating method such as a roll coating method, a spin coating method, a printing method, or an ink-jet method. After coating, a pre-bake treatment is performed on the coating surface, and then a post-bake treatment is performed to form a coating film. The purpose of the pre-bake treatment is to evaporate the organic solvent in the pre-coating layer. The pre-bake treatment is, e.g., performed under the condition of 0.1 to 5 min at 40° C. to 120° C. The post-bake treatment is preferably performed under the condition of 120° C. to 300° C., more preferably 150° C. to 250° C., and is preferably performed for 5 to 200 min, more preferably 10 to 100 min. The film thickness of the coating film after the post-bake is preferably 0.001 μm to 1 μm, more preferably 0.005 μm to 0.5 μm.

The substrate may include, for instance, a transparent substrate formed by a glass such as a float glass or a soda-lime glass, or by a plastic such as poly(ethylene terephthalate), poly(butylene terephthalate), polyethersulfone, or polycarbonate.

The transparent conductive film may include, for instance, a NESA film formed by $SnO_2$ or an ITO (indium tin oxide) film formed by $In_2O_3$—$SnO_2$. To form the transparent conductive film patterns, a method such as photo-etching or a method in which a mask is used when the transparent conductive film is formed can be used.

When the liquid crystal alignment agent is coated, to improve the adhesion between the substrate or transparent conductive film and the coating film, a functional silane compound or a titanate compound, etc. can be pre-coated on the substrate and the transparent conductive film.

Then, liquid crystal alignment capability is provided by irradiating the coating film with polarized or non-polarized radiation, and the liquid crystal alignment film is formed from the coating film. Here, the radiation may include, for instance, ultraviolet or visible light having a wavelength of 150 nm to 800 nm, and preferably includes ultraviolet light having a wavelength of 300 nm to 400 nm. When the radiation used is polarized light (linearly polarized light or partially polarized light), irradiation can be performed from a direction perpendicular to the coating film surface. Moreover, to provide a pre-tilt angle, irradiation can also be performed from an inclined angle. Moreover, when non-polarized radiation is used, the irradiation needs to be performed from the direction inclined with respect to the coating film surface.

The light source of the radiation exposure may include, for instance, a low-pressure mercury lamp, a high-pressure mercury lamp, a deuterium lamp, a metal halide lamp, an argon resonance lamp, a xenon lamp, or an excimer laser. The ultraviolet in the preferred wavelength region can be obtained by, for instance, using the light sources with, for instance, a filter or a diffraction grating.

The radiation exposure is preferably equal to or greater than 1 $J/m^2$ and less than 10000 $J/m^2$, more preferably 10 to 3000 $J/m^2$. Moreover, when liquid crystal alignment capability is provided to a coating film formed by a conventional liquid crystal alignment agent through a photoalignment method, a radiation exposure equal to or greater than 10000 $J/m^2$ is needed. However, when the liquid crystal alignment agent of the invention is used, even if the radiation exposure in the photoalignment method is 3000 $J/m^2$ or less, 1000 $J/m^2$ or less, or even 300 $J/m^2$ or less, good liquid crystal alignment capability can still be provided. As a result, production cost of the liquid crystal display element can be reduced.

<LCD Element and Preparation Method Thereof>

The LCD element of the invention includes the liquid crystal alignment film formed by the liquid crystal alignment agent of the invention. The LCD element of the invention can be manufactured with the following method.

Two substrates on which a liquid crystal alignment film is formed are prepared, and liquid crystal is disposed between the two substrates to make a liquid crystal cell. To make the liquid crystal cell, the following two methods can be taken as examples.

The first method includes: disposing the two substrates opposite to each other with a gap (cell gap) in between such that each liquid crystal alignment film is opposite to one another, laminating the peripheries of the two substrates together with a sealant, injecting a liquid crystal into the cell gap defined by the surfaces of the substrates and the sealant, and then sealing the injection hole to obtain the liquid crystal cell.

The second method is called ODF (one drop fill). First, a UV-curable sealing material for instance is coated on a predetermined portion on one of the two substrates forming the liquid crystal alignment films. A liquid crystal is then dropped onto the liquid crystal alignment film, and then the other substrate is laminated such that the liquid crystal alignment films are opposite to each other. Next, the entire surface of the substrate is UV-irradiated to cure the sealant. The liquid crystal cell can thus be made.

When either method is used, preferably, the liquid crystal cell is next heated to the temperature at which the liquid crystals used are in an isotropic phase, and is then slowly cooled to room temperature to remove the flow alignment when the liquid crystals are filled.

Next, by adhering a polarizer on the outer surface of the liquid crystal cell, the LCD element of the invention can be obtained. Here, when the liquid crystal alignment films have parallel alignment capability, an LCD element having a TN-type or STN-type liquid crystal cell can be obtained by adjusting the angle formed by the polarization direction of the linear polarized radiation irradiating the two substrates on which a liquid crystal alignment film is formed and the angle of each substrate and the polarizer. Moreover, when the liquid crystal alignment films have vertical alignment capability, an LCD element having a vertical alignment-type liquid crystal cell can be obtained by constructing the liquid crystal cell such that the directions of easy-to-align axes of the two substrates on which a liquid crystal alignment film is formed are parallel, and adhering a polarizer to the liquid crystal cell, wherein the polarization direction thereof and the easy-to-align axes form a 450 angle.

The sealant includes, for instance, an epoxy resin containing a curing agent and alumina balls as a spacer.

Specific examples of the liquid crystal include, for instance, a nematic liquid crystal and a smectic liquid crystal.

When a TN- or STN-type liquid crystal cell is used, the TN- or STN-type liquid crystal cell preferably has a nematic liquid crystal having positive dielectric anisotropy, and examples thereof include, e.g., a biphenyl-based liquid crystal, a phenylcyclohexane-based liquid crystal, an ester-based liquid crystal, a terphenyl liquid crystal, a biphenylcyclohexane-based liquid crystal, a pyrimidine-based liquid crystal, a dioxane-based liquid crystal, a bicyclooctane-based liquid crystal, or a cubane-based liquid crystal. Moreover, a cholesteric liquid crystal such as cholesteryl chloride, cholesteryl nonanoate, or cholesteryl carbonate, etc., a chiral agent sold under the trade name of "C-15" or "CB-15" (made by Merck & Co.), or a ferroelectric liquid crystal such as p-decyloxybenzylidene-p-amino-2-methyl-butyl cinnamate can further be added to the above liquid crystal.

Moreover, when a vertical alignment-type liquid crystal cell is used, the cell preferably has a nematic liquid crystal having negative dielectric anisotropy, and examples thereof include, e.g., a dicyanobenzene-based liquid crystal, a pyridazine-based liquid crystal, a Schiffbase-based liquid crystal, an azoxy-based liquid crystal, a biphenyl-based liquid crystal, and a phenylcyclohexane-based liquid crystal.

The polarizer used on the outside of the liquid crystal cell may include, e.g., a polarizer formed by sandwiching, between acetate protective films, a polarizing film known as "H film" that is obtained by stretch-aligning polyvinyl alcohol and making the same absorb iodine simultaneously, or a polarizer formed by the "H film" itself.

The LCD element of the invention thus made has excellent display performance, and even after prolonged use, the display performance is not worsened.

FIG. 1 is a cross-sectional view of an LCD element according to an embodiment of the invention. The LCD element 100 includes a first unit 110, a second unit 120, and a liquid crystal unit 130, wherein the second unit 120 and the first unit 110 are separately disposed and the liquid crystal unit 130 is disposed between them.

The first unit 110 includes a first substrate 112, a first conductive film 114, and a first liquid crystal alignment film 116, wherein the first conductive film 114 is located between the first substrate 112 and the first liquid crystal alignment film 116, and the first liquid crystal alignment film 116 is located on one side of the liquid crystal unit 130.

The second unit 120 includes a second substrate 122, a second conductive film 124, and a second liquid crystal alignment film 126, wherein the second conductive film 124 is located between the second substrate 122 and the second liquid crystal alignment film 126, and the second liquid crystal alignment film 126 is located on another side of the liquid crystal unit 130. In other words, the liquid crystal unit 130 is located between the first liquid crystal alignment film 116 and the second liquid crystal alignment film 126.

The first substrate 112 and the second substrate 122 are selected from, for instance, a transparent material, which includes, but is not limited to, for instance, alkali-free glass, soda-lime glass, hard glass (Pyrex glass), quartz glass, polyethylene terephthalate, polybutylene terephthalate, polyethersulfone, or polycarbonate for an LCD apparatus. The material of each of the first conductive film 114 and the second conductive film 124 is selected from, e.g., tin oxide ($SnO_2$) and indium oxide-tin oxide ($In_2O_3$—$SnO_2$).

Each of the first liquid crystal alignment film 116 and the second liquid crystal alignment film 126 is the above liquid crystal alignment film, and the function thereof is to make the liquid crystal unit 130 form a pre-tilt angle. Moreover, when a voltage is applied to the first conductive film 114 and the second conductive film 124, an electric field can be generated between the first conductive film 114 and the second conductive film 124. The electric field can drive the liquid crystal unit 130, thereby causing change to the arrangement of the liquid crystal molecules in the liquid crystal unit 130.

The following examples are used to further describe the invention, which are only exemplary but are not intended to limit the implementation of the invention.

Synthesis Examples of Polymer (A)

In the followings, Synthesis Examples A-1-1 to A-1-10 and Synthesis Examples A-2-1 to A-2-4 of the polymer (A) are described:

Synthesis Example A-1-1

A nitrogen inlet, a stirrer, a condenser, and a thermometer were provided to a 500 ml four-neck flask, and then $N_2$ gas was introduced. Then, in the four-necked flask, 5.41 g (0.05 mole) of p-diaminobenzene (hereinafter a-2-1), and 80 g of N-methyl-2-pyrrolidone (NMP) were added, and the components were stirred under room temperature until dissolved. Next, 10.91 g (0.05 mole) of pyromellitic dianhydride (hereinafter "a-1-1") and 20 g of NMP were added, and the mixture was reacted at room temperature for 2 hours. After the reaction was complete, the reaction solution was poured into 1500 ml of water to precipitate a polymer. Then, the obtained polymer was filtered and was repeatedly washed with methanol and filtered three times. The polymer was then placed in a vacuum oven and dried at a temperature of 60° C., thereby obtaining a polymer (A-1-1).

Synthesis Examples A-1-2 to A-1-10

Polymers (A-1-2) to (A-1-10) of Synthesis Examples A-1-2 to A-1-10 were respectively prepared with the same steps as Synthesis Example A-1-1, except that the species and the amounts of the monomers used were changed (see Table 1).

Synthesis Example A-2-1

A nitrogen inlet, a stirrer, a condenser, and a thermometer were provided to a 500 ml four-neck flask, and then nitrogen gas was introduced. Then, in the four-necked flask, 5.41 g (0.05 mole) of p-diaminobenzene (hereinafter "a-2-1"), and 80 g of NMP were added, and the components were stirred under room temperature until dissolved. Next, 10.91 g (0.05 mole) of pyromellitic dianhydride (hereinafter "a-1-1") and 20 g of NMP were added. After the mixture was reacted at room temperature for 6 hours, 97 g of NMP, 2.55 g of acetic anhydride, and 19.75 g of pyridine were added. Then, the temperature was raised to 60° C., and the mixture was continuously stirred for 2 hours to perform an imidization reaction. After the reaction was complete, the reaction solution was poured into 1500 ml of water to precipitate a polymer. Then, the obtained polymer was filtered and was repeatedly washed with methanol and filtered three times. The polymer was then placed in a vacuum oven and dried at a temperature of 60° C., thereby obtaining a polymer (A-2-1).

Synthesis Examples A-2-2 to A-2-4

Polymerd (A-2-2) to (A-2-4) of Synthesis Examples A-2-2 to A-2-4 were respectively prepared with the same steps as Synthesis Example A-2-1, except that the species and the amounts of the monomers used were changed (see Table 1).

The compounds corresponding to the abbreviations in Table 1 are shown below.

| Abbreviation | Component |
|---|---|
| a-1-1 | Pyromellitic dianhydride |
| a-1-2 | 1,2,3,4-cyclobutane tetracarboxylic dianhydride |
| a-1-3 | 2,3,5-tricarboxycyclopentylacetic acid dianhydride |
| a-2-1 | p-diaminobezene |
| a-2-2 | 4,4'-diaminodiphenylmethane |
| a-2-3 | 4,4'-diaminodiphenyl ether |
|  | HCDA | a-2-4

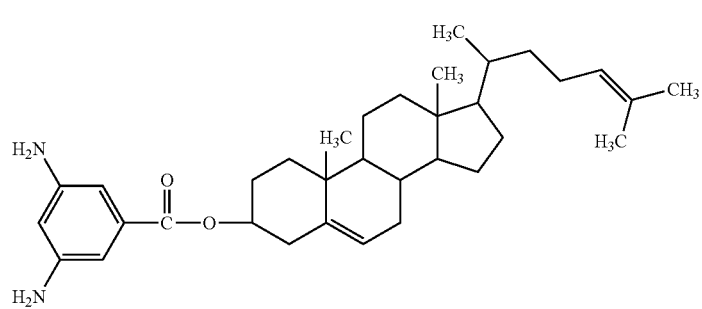

PCC5E a-2-5

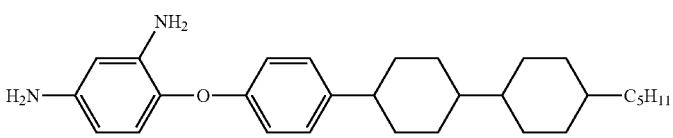

a-2-6    1-octadecoxy-2,4-diaminobenzene
a-2-7    3,3'-diaminochalcone a-2-8

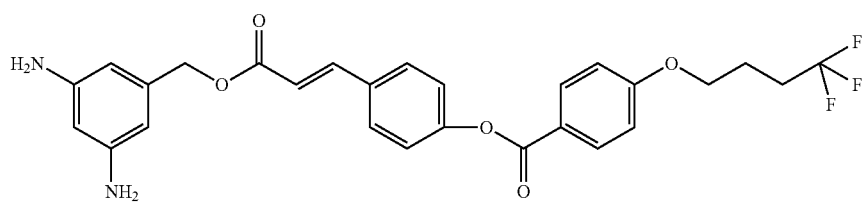 [SMILES: Nc1cc(N)cc(COC(=O)/C=C/c2ccc(OC(=O)c3ccc(OCCCC(F)(F)F)cc3)cc2)c1]

a-2-9

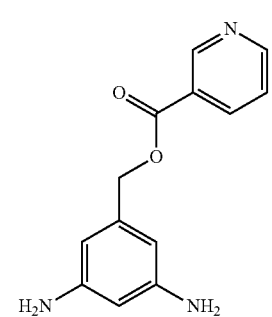 [SMILES: Nc1cc(N)cc(COC(=O)c2cccnc2)c1]

TABLE 1

| Component (unit: mole %) | | Synthesis Example | | | | | | | | | | | | | |
|---|---|---|---|---|---|---|---|---|---|---|---|---|---|---|---|
| | | A-1-1 | A-1-2 | A-1-3 | A-1-4 | A-1-5 | A-1-6 | A-1-7 | A-1-8 | A-1-9 | A-1-10 | A-2-1 | A-2-2 | A-2-3 | A-2-4 |
| Tetracarboxylic dianhydride component (a-1) | a1-1 | 100 | — | — | — | 50 | — | — | — | — | 100 | 100 | — | — | 100 |
| | a1-2 | — | 100 | — | 100 | — | 100 | — | 100 | 100 | — | — | — | 100 | — |
| | a1-3 | — | — | 100 | — | 50 | — | 100 | — | — | — | — | 100 | — | — |
| Diamine component (a-2) | a-2-1 | 100 | — | — | 70 | — | — | 50 | — | — | 60 | 100 | — | — | — |
| | a-2-2 | — | 100 | — | 20 | 80 | — | — | 20 | 55 | — | — | 75 | — | — |
| | a-2-3 | — | — | 100 | — | — | 90 | 35 | 60 | — | — | — | — | 70 | 40 |
| | a-2-4 | — | — | — | 10 | — | — | 15 | — | 5 | — | — | — | — | — |
| | a-2-5 | — | — | — | — | 20 | — | — | 15 | — | 10 | — | — | — | — |

TABLE 1-continued

| Component (unit: mole %) | Synthesis Example | | | | | | | | | | | | | |
|---|---|---|---|---|---|---|---|---|---|---|---|---|---|---|
| | A-1-1 | A-1-2 | A-1-3 | A-1-4 | A-1-5 | A-1-6 | A-1-7 | A-1-8 | A-1-9 | A-1-10 | A-2-1 | A-2-2 | A-2-3 | A-2-4 |
| a-2-6 | — | — | — | — | — | 10 | — | — | — | — | — | 15 | — | 20 |
| a-2-7 | — | — | — | — | — | — | — | — | 40 | — | — | — | 30 | — |
| a-2-8 | — | — | — | — | — | — | — | — | — | 30 | — | — | — | 40 |
| a-2-9 | — | — | — | — | — | — | — | 5 | — | — | — | 10 | — | — |
| Imidization ratio (%) | 0 | 0 | 0 | 0 | 0 | 0 | 0 | 0 | 0 | 0 | 18 | 25 | 43 | 32 |

Synthesis Examples of Photosensitive Polysiloxane (B)

Synthesis Examples B-1 to B-15 and Comparative Synthesis Examples B'-1 to B'-3 of the photosensitive polysiloxane (B) are described below:

Synthesis Example B-1

A stirrer, a condenser tube, and a thermometer were provided to a three-necked flask having a volume of 500 mL. Then, in the three-necked flask, 0.30 mole of 2-glycidoxyethyltrimethoxy silane (hereinafter "GETMS"), 0.50 mole of methyltrimethoxy silane (hereinafter "MTMS"), 0.20 mole of phenyltrimethoxy silane (hereinafter "PTMS"), and 6 g of propyleneglycolmonomethylether (hereinafter "PGME") were added, and the mixture was stirred under room temperature while an aqueous solution of triethylamine (hereinafter "TEA") (20 g of TEA/200 g of $H_2O$) was added within 30 min. Then, the three-necked flask was immersed in an oil bath at 30° C. and stirred for 30 min, and then the temperature of the oil bath was raised to 90° C. within 30 min. As the internal temperature of the solution reached 75° C., the mixture was continuously heated and stirred to perform polycondensation for 6 hours. After the reaction was complete, the organic layer was separated and washed with a 0.2 wt % aqueous solution of ammonium nitrate to obtain a solution containing a polysiloxane compound.

Then, 0.10 mole of the cinnamic acid derivative 5HBPA, 0.05 mole of the aromatic heterocyclic derivative (b-3-1) containing nitrogen, oxygen or sulfur, and 0.2 g of a curing promoter UCAT 18X (produced by SAN-APRO) were added to the solution containing a polysiloxane compound. Then, the three-necked flask was immersed in an oil bath at 30° C. and stirred for 10 min, and then the temperature of the oil bath was raised to 115° C. within 30 min. When the internal temperature of the solution reached 100° C., the mixture was continuously heated and stirred for 24 hours. After the reaction was complete, the organic layer was removed and washed with water. Then, drying was performed by using magnesium sulfate, and after the solvent was removed, polysiloxane (B-1) was obtained.

Synthesis Examples B-2 to B-15

Polysiloxanes (B-2) to (B-15) of Synthesis Examples B-2 to B-15 were prepared with the same steps as Synthesis Example B-1, except that the species and the amounts of the reactants of the polysiloxane (B), the species and the amount of the cinnamic acid derivative, the species and the amounts of the catalyst and the solvent, and the reaction temperature and the polycondensation time were changed (see Table 2).

Comparative Synthesis Examples B'-1 to B'-3

Polysiloxanes (B'-1) to (B'-3) of Comparative Synthesis Examples B'-1 to B'-3 were prepared with the same steps as Synthesis Example B-1, except that the species and the amounts of the reactants of the polysiloxane (B), the species and the amount of the cinnamic acid derivative, the species and the amounts of the catalyst and the solvent, and the reaction temperature and the polycondensation time were changed (see Table 2).

Compounds corresponding to the abbreviations in Table 2 are shown below.

| Abbreviation | Component |
|---|---|
| GETMS | 2-glycidoxyethyltrimethoxy silane |
| GBTMS | 4-glycidoxybutyltrimethoxysilane |
| ECETS | 2-(3,4-epoxycyclohexyl)ethyltrimethoxy silane |
| ECEES | 2-(3,4-epoxycyclohexyl)ethyltriethoxysilane |
| OXTMS | (3-ethyl-3-oxetanyl)methoxy)propyltrimethoxysilane |
| OXTES | (3-ethyl-3-oxetanyl)methoxy)propyltriethoxysilane |
| MTMS | Methyltrimethoxy silane |
| DMDMS | Dimethyldimethoxy silane |
| PTMS | Phenyltrimethoxy silane |
| PTES | Phenyltriethoxy silane |

5HBPA

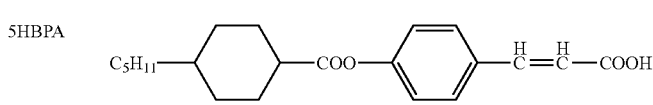

6PB2A

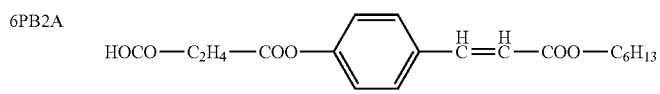

-continued
| Abbreviation | Component |
|---|---|
| FBPAA | 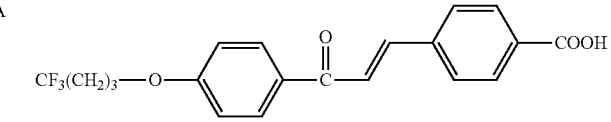 |
| 5BPAA | 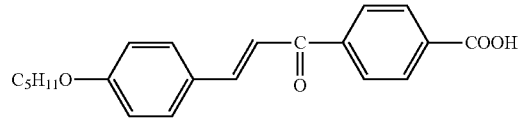 |
| 7BPBA | 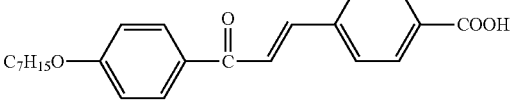 |
| b3-1 | 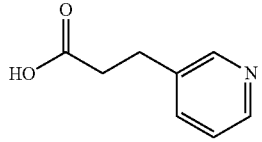<br>(4-107) |
| b3-2 | 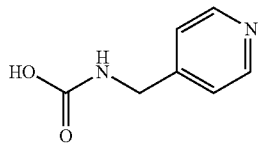<br>(4-110) |
| b3-3 | 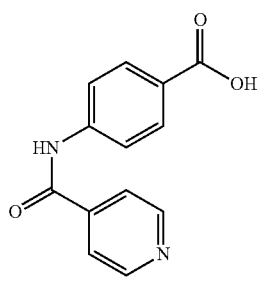<br>(4-147) |
| b3-4 | 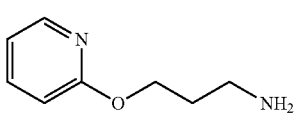<br>(4-105) |
| b3-5 | 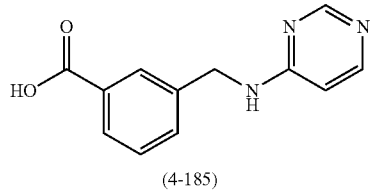 [SMILES: O=C(O)c1cccc(CNc2ccncn2)c1]<br>(4-185) |

-continued
| Abbreviation | Component |
|---|---|
| b3-6 | 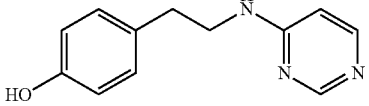<br>(4-174) |
| b3-7 | 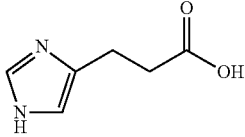<br>(4-87) |
| b3-8 | 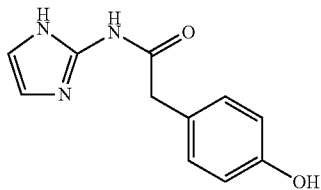<br>(4-80) |
| b3-9 | 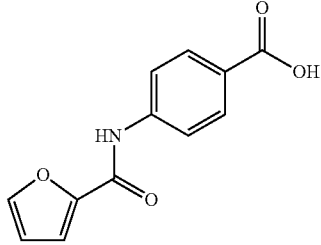<br>(4-30) |
| b3-10 | 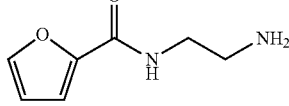<br>(4-3) |
| b3-11 | 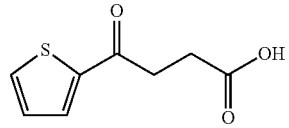<br>(4-236) |
| b3-12 | 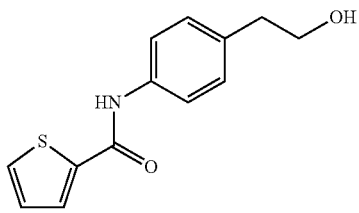<br>(4-211) |
| PGME | Propyleneglycolmonomethylether |
| MIBK | Methylisobutylketone |
| $H_2O$ | Water |
| TEA | Triethylamine |

TABLE 2

| | Component | | Synthesis Example | | | | | | | | | |
|---|---|---|---|---|---|---|---|---|---|---|---|---|
| | | | B-1 | B-2 | B-3 | B-4 | B-5 | B-6 | B-7 | B-8 | B-9 | B-10 |
| Polysiloxane (b-1) containing an epoxy group (mol) | Silane monomer (b-1-1) | GETMS | 0.30 | — | — | — | — | — | — | — | 1.00 | 0.30 |
| | | GBTMS | — | 0.40 | — | — | — | — | — | — | — | — |
| | | ECETS | — | — | 0.50 | — | — | — | — | 1.00 | — | — |
| | | ECEES | — | — | — | 0.60 | — | — | — | 0.90 | — | 0.50 |
| | | OXTMS | — | — | — | — | 0.70 | — | — | — | — | — |
| | | OXTES | — | — | — | — | — | 0.80 | — | — | — | — |
| | Other silane monomers (b-1-2) | MTMS | 0.50 | — | 0.40 | — | — | 0.10 | — | — | — | 0.20 |
| | | DMDMS | — | 0.60 | — | — | — | — | — | 0.10 | — | — |
| | | PTMS | 0.20 | — | 0.10 | 0.40 | — | — | — | — | — | — |
| | | PTES | — | — | — | — | 0.30 | 0.10 | — | — | — | — |
| Solvent (g) | | PGME | 6 | — | — | 6 | 6 | 6 | 8 | 2 | — | — |
| | | MIBK | — | 6 | 8 | 2 | — | 2 | — | 6 | 6 | 8 |
| Catalyst (g) | | H$_2$O | 200 | 200 | 250 | 250 | 200 | 200 | 200 | 250 | 200 | 250 |
| | | TEA | 20 | 20 | 22 | 25 | 20 | 20 | 20 | 25 | 20 | 20 |
| Reaction temperature (° C.) | | | 75 | 70 | 80 | 85 | 70 | 70 | 75 | 70 | 70 | 75 |
| Polycondensation time (hours) | | | 6.0 | 6.5 | 6.0 | 5.0 | 6.0 | 6.0 | 6.0 | 6.0 | 6.0 | 5.5 |
| Cinnamic acid derivative (b-2) (mol) | | 5HBPA | 0.10 | — | — | — | — | — | — | — | 0.10 | — |
| | | 6PB2A | — | 0.20 | — | — | — | — | — | 0.70 | — | 0.80 |
| | | FBPAA | — | — | 0.30 | — | — | — | 0.60 | — | — | — |
| | | 5BPBA | — | — | — | 0.40 | — | 0.50 | — | — | — | — |
| | | 7BPBA | — | — | — | — | 0.15 | — | — | — | — | — |
| Aromatic heterocyclic derivative (b-3) containing nitrogen, oxygen or sulfur (mol) | | b3-1 | 0.05 | — | — | — | — | — | — | — | — | — |
| | | b3-2 | — | 0.05 | — | — | — | — | — | — | — | — |
| | | b3-3 | — | — | 0.03 | — | — | — | — | — | — | — |
| | | b3-4 | — | — | — | 0.10 | — | — | — | — | — | — |
| | | b3-5 | — | — | — | — | 0.01 | — | — | — | — | — |
| | | b3-6 | — | — | — | — | — | 0.08 | — | — | — | — |
| | | b3-7 | — | — | — | — | — | — | 0.10 | — | — | — |
| | | b3-8 | — | — | — | — | — | — | — | 0.15 | — | — |
| | | b3-9 | — | — | — | — | — | — | — | — | 0.20 | — |
| | | b3-10 | — | — | — | — | — | — | — | — | — | 0.18 |
| | | b3-11 | — | — | — | — | — | — | — | — | — | — |
| | | b3-12 | — | — | — | — | — | — | — | — | — | — |
| Molar ratio (b-2)/(b-3) | | | 2.0 | 4.0 | 10.0 | 4.0 | 15.0 | 6.3 | 6.0 | 4.7 | 0.5 | 4.4 |

| | Component | | Synthesis Example | | | | | Comparative Synthesis Example | | |
|---|---|---|---|---|---|---|---|---|---|---|
| | | | B-11 | B-12 | B-13 | B-14 | B-15 | B'-1 | B'-2 | B'-3 |
| Polysiloxane (b-1) containing an epoxy group (mol) | Silane monomer (b-1-1) | GETMS | — | 0.20 | — | 0.90 | — | 0.80 | — | — |
| | | GBTMS | — | — | — | — | — | — | 1.00 | — |
| | | ECETS | 0.60 | 0.80 | — | — | — | — | — | — |
| | | ECEES | — | — | — | — | 1.00 | — | — | — |
| | | OXTMS | 0.10 | — | 0.80 | — | — | — | — | — |
| | | OXTES | — | — | — | — | — | — | — | — |
| | Other silane monomers (b-1-2) | MTMS | — | — | 0.20 | — | — | 0.20 | — | 0.60 |
| | | DMDMS | 0.20 | — | — | — | — | — | — | — |
| | | PTMS | 0.10 | — | — | 0.10 | — | — | — | 0.40 |
| | | PTES | — | — | — | — | — | — | — | — |
| Solvent (g) | | PGME | — | — | 6 | 2 | — | — | — | 6 |
| | | MIBK | 8 | 6 | 2 | 6 | 6 | 6 | 6 | — |
| Catalyst (g) | | H$_2$O | 250 | 200 | 250 | 250 | 200 | 200 | 200 | 200 |
| | | TEA | 25 | 25 | 22 | 22 | 20 | 20 | 20 | 20 |
| Reaction temperature (° C.) | | | 75 | 75 | 70 | 70 | 70 | 70 | 70 | 70 |
| Polycondensation time (hours) | | | 6.0 | 6.0 | 6.0 | 6.0 | 6.0 | 7.0 | 6.5 | 6.5 |
| Cinnamic acid derivative (b-2) (mol) | | 5HBPA | — | — | — | 0.30 | — | — | — | — |
| | | 6PB2A | — | — | 0.20 | — | — | — | 0.50 | — |
| | | FBPAA | 0.30 | — | — | 0.20 | — | — | — | — |
| | | 5BPBA | — | 0.35 | 0.10 | — | 0.90 | — | — | — |
| | | 7BPBA | — | — | — | — | — | — | — | — |
| Aromatic heterocyclic derivative (b-3) containing nitrogen, oxygen or sulfur (mol) | | b3-1 | — | — | — | — | — | — | — | — |
| | | b3-2 | — | — | 0.03 | — | — | 0.05 | — | — |
| | | b3-3 | — | — | — | 0.03 | — | — | — | — |
| | | b3-4 | — | — | 0.02 | — | — | — | — | — |
| | | b3-5 | — | — | — | — | — | — | — | — |
| | | b3-6 | — | — | — | — | 0.05 | — | — | — |
| | | b3-7 | — | — | — | — | — | — | — | — |
| | | b3-8 | — | — | — | — | — | — | — | — |
| | | b3-9 | — | — | — | 0.05 | — | — | — | — |
| | | b3-10 | — | — | — | — | — | — | — | — |
| | | b3-11 | 0.08 | — | — | — | — | — | — | — |
| | | b3-12 | — | 0.03 | — | — | 0.03 | — | — | — |
| Molar ratio (b-2)/(b-3) | | | 3.8 | 11.7 | 6.0 | 6.3 | 11.3 | 0.0 | — | — |

Examples and Comparative Examples of Liquid Crystal Alignment Agent, Liquid Crystal Alignment Film, and LCD Element Examples 1 to 16 and Comparative Examples 1 to 11 of the liquid crystal alignment agent, the liquid crystal alignment film, and the LCD element are described below.

a. Liquid Crystal Alignment Agent 100 weight parts of the polymer (A-1-1), 3 weight parts of the polysiloxane (B-1), and 1000 weight parts of N-methyl-2-pyrrolidone ("C-1", hereinafter) were weighed. Then, the components were continuously stirred at room temperature with a stirring apparatus until dissolved, thus forming the liquid crystal alignment agent of Example 1.

b. Liquid Crystal Alignment Film and LCD Element

The liquid crystal alignment agent was coated on a glass substrate having thereon a conductive film formed by ITO with a spin coating method. Then, pre-bake was performed on a heating plate at 70° C. for 3 min, and post-bake was performed in a circulation oven at 220° C. for 20 min, thereby obtaining a coating film.

A Hg—Xe lamp and a Glan-Taylor prism were used to irradiate the surface of the coating film with polarized ultraviolet containing a 313 nm bright line for 50 seconds from a direction inclined 40° from the normal of the substrate to provide liquid crystal alignment capability. A liquid crystal alignment film was thus fabricated. Here, the illumination of the irradiated surface under a wavelength of 313 nm was 2 mW/cm$^2$. The same operation was performed to fabricate 2 (1 pair) substrates having a liquid crystal alignment film.

Next, an epoxy resin binding agent containing alumina balls having a diameter of 5.5 μm was coated on the periphery of the surface of the pair of substrates on which a liquid crystal alignment film was formed with screen printing, and then the substrates were laminated in a manner that the liquid crystal alignment film of each substrate was opposite to each other, and the irradiation direction of the polarized ultraviolet was antiparallel, and then a pressure of 10 kg was applied with a hot press to perform hot press lamination at 150° C.

Next, a liquid crystal was injected from the liquid crystal injection hole, and an epoxy resin-based binding agent was used to seal the liquid crystal injection hole. To remove the flow alignment when the liquid crystal is injected, the liquid crystal was heated to 150° C. and then slowly cooled to room temperature. Lastly, the polarizers were laminated on two sides on the outside of the substrate in a manner that the polarization directions of the polarizers were perpendicular to each other and form 45° with the polarization direction of the ultraviolet of the liquid crystal alignment film, thereby obtaining the LCD element of Example 1. The LCD of Example 1 was evaluated by the following evaluation methods, and the results thereof are shown in Table 3.

Examples 2 to 16

The liquid crystal alignment agents, the liquid crystal alignment films, and the liquid crystal display elements of Examples 2 to 16 were respectively prepared by the same steps as Example 1, except that the species and the amounts of the components were changed, as shown in Table 3. The LCD element of each of Examples 2 to 16 was evaluated with the evaluation methods below, and the results thereof are shown in Table 3.

Comparative Examples 1 to 11

The liquid crystal alignment agents, the liquid crystal alignment films, and the LCD elements of Comparative Examples 1 to 11 were respectively prepared by the same steps as example 1, except that the species and the amounts of the components were changed, as shown in Table 4. The LCD element obtained in each of Comparative Examples 1 to 11 was evaluated with the evaluation methods below, and the results are shown in Table 4.

Compounds corresponding to the abbreviations in Tables 3 & 4 are shown below.

| Abbreviation | Component |
| --- | --- |
| A-1-1 | Polymer (A-1-1) |
| A-1-2 | Polymer (A-1-2) |
| A-1-3 | Polymer (A-1-3) |
| A-1-4 | Polymer (A-1-4) |
| A-1-5 | Polymer (A-1-5) |
| A-1-6 | Polymer (A-1-6) |
| A-1-7 | Polymer (A-1-7) |
| A-1-8 | Polymer (A-1-8) |
| A-1-9 | Polymer (A-1-9) |
| A-1-10 | Polymer (A-1-10) |
| A-2-1 | Polymer (A-2-1) |
| A-2-2 | Polymer (A-2-2) |
| A-2-3 | Polymer (A-2-3) |
| A-2-4 | Polymer (A-2-4) |
| B-1 | Polysiloxane (B-1) |
| B-2 | Polysiloxane (B-2) |
| B-3 | Polysiloxane (B-3) |
| B-4 | Polysiloxane (B-4) |
| B-5 | Polysiloxane (B-5) |
| B-6 | Polysiloxane (B-6) |
| B-7 | Polysiloxane (B-7) |
| B-8 | Polysiloxane (B-8) |
| B-9 | Polysiloxane (B-9) |
| B-10 | Polysiloxane (B-10) |
| B-11 | Polysiloxane (B-11) |
| B-12 | Polysiloxane (B-12) |
| B-13 | Polysiloxane (B-13) |
| B-14 | Polysiloxane (B-14) |
| B-15 | Polysiloxane (B-15) |
| B'-1 | Polysiloxanes (B'-1) |
| B'-2 | Polysiloxanes (B'-2) |
| B'-3 | Polysiloxanes (B'-3) |
| C-1 | N-methyl-2-pyrrolidone (NMP) |
| C-2 | Ethylene glycol n-butyl ether |
| C-3 | N,N-dimethylacetamide |
| D-1 | N,N,N',N'-tetraglycidyl-4,4'-diaminodiphenylmethane |
| D-2 | N,N-diglycidyl-4-glycidyloxyaniline |

Evaluation Methods a. Imidization Ratio

The imidization ratio refers to the proportion of the number of imide rings based on the total amount of the number of amic acid functional groups and the number of imide rings in the polymer, and is represented in percentage.

The detection method includes dissolving the polymers of the synthesis examples in a suitable deuteration solvent (e.g., deuterated DMSO) after respectively performing drying under a reduced pressure. Then, a result of $^1$H-NMR was detected under room temperature (such as 25° C.) by using tetramethylsilane as reference material. The imidization ratio (%) was obtained by Equation (1).

$$\text{Imidization ratio (\%)} = 1 - \frac{\Delta 1}{\Delta 2 \times \alpha} \times 100\% \tag{1}$$

Δ1: peak area generated due to chemical shift of an NH group proton near 10 ppm;

Δ2: peak area of other protons;

α: number ratio of one proton of NH group relative to other protons in precursor (polyamic acid) of polymer.

b. Reliability

A liquid crystal alignment film was made from the liquid crystal alignment agent of each of the Examples and the Comparative Examples, and an LCD element having the liquid crystal alignment films was made. Each LCD element was placed in an environment of 25° C. and a relative humidity of 85%, and then undergoes a reliability test. After 120 hours, the voltage holding ratio of the LCD element of each Example or Comparative Example was measured with an electrical measuring machine (made by Toyo Corporation, Model 6254). A voltage of 4 volts was applied for 2 milliseconds. The applied voltage was held for 1667 milliseconds. After the applied voltage was cut off for 1667 milliseconds, the voltage holding ratio was measured and the reliability of each of the LCD elements was evaluated according to the following standards:

◎: 98%≤Voltage holding ratio
○: 95%≤Voltage holding ratio<98%
Δ: 90%≤Voltage holding ratio<95%
×: Voltage holding ratio<90% c. Residual Image Test

A liquid crystal alignment film was made from the liquid crystal alignment agent of each of the Examples and the Comparative Examples, and an LCD element having the liquid crystal alignment film respectively was made. A direct voltage of 17 volts was applied to each LCD element at an ambient temperature of 100° C. for 20 hours. The residual voltage in the LCD element right after the direct voltage was cut off (remained DC voltage (mV)) was obtained by a flicker elimination method, and the residual image of each of the LCD elements was evaluated according to the following standards:

◎: Remained DC voltage≤200 mV
○: 200 mV<Remained DC voltage≤400 mV
Δ: 400 mV<Remained DC voltage≤600 mV
×: 600 mV<Remained DC voltage

TABLE 3

| Component (unit: weight parts) | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Polymer (A) | A-1-1 | 100 | — | — | — | — | — | — | — | — | — | 40 | — | — | — | — | — |
| | A-1-2 | — | 100 | — | — | — | — | — | — | — | — | — | — | — | — | — | — |
| | A-1-3 | — | — | 100 | — | — | — | — | — | — | — | — | — | — | — | — | — |
| | A-1-4 | — | — | — | 100 | — | — | — | — | — | — | — | — | 100 | — | — | 50 |
| | A-1-5 | — | — | — | — | 100 | — | — | — | — | — | — | — | — | 100 | — | — |
| | A-1-6 | — | — | — | — | — | 100 | — | — | — | — | 60 | — | — | — | 100 | — |
| | A-1-7 | — | — | — | — | — | — | 100 | — | — | — | — | — | — | — | — | — |
| | A-1-8 | — | — | — | — | — | — | — | 100 | — | — | — | — | — | — | — | — |
| | A-1-9 | — | — | — | — | — | — | — | — | — | — | — | — | — | — | — | — |
| | A-1-10 | — | — | — | — | — | — | — | — | — | — | — | — | — | — | — | — |
| | A-2-1 | — | — | — | — | — | — | — | — | 100 | — | — | 100 | — | — | — | 50 |
| | A-2-2 | — | — | — | — | — | — | — | — | — | 100 | — | — | — | — | — | — |
| | A-2-3 | — | — | — | — | — | — | — | — | — | — | — | — | — | — | — | — |
| | A-2-4 | — | — | — | — | — | — | — | — | — | — | — | — | — | — | — | — |
| Photosensitive polysiloxane (B) | B-1 | 3 | — | — | — | — | — | — | — | — | — | — | — | — | — | — | — |
| | B-2 | — | 10 | — | — | — | — | — | — | — | — | — | — | — | — | — | 10 |
| | B-3 | — | — | 15 | — | — | — | — | — | — | — | — | — | — | — | — | — |
| | B-4 | — | — | — | 20 | — | — | — | — | — | — | — | — | — | — | — | — |
| | B-5 | — | — | — | — | 25 | — | — | — | — | — | — | — | — | — | — | — |
| | B-6 | — | — | — | — | — | 30 | — | — | — | — | — | — | — | — | — | 10 |
| | B-7 | — | — | — | — | — | — | 35 | — | — | — | — | — | — | — | — | — |
| | B-8 | — | — | — | — | — | — | — | 40 | — | — | — | — | — | — | — | — |
| | B-9 | — | — | — | — | — | — | — | — | 45 | — | — | — | — | — | — | — |
| | B-10 | — | — | — | — | — | — | — | — | — | 50 | — | — | — | — | — | — |
| | B-11 | — | — | — | — | — | — | — | — | — | — | 20 | — | — | — | — | — |
| | B-12 | — | — | — | — | — | — | — | — | — | — | — | 15 | — | — | — | — |
| | B-13 | — | — | — | — | — | — | — | — | — | — | — | — | 5 | — | — | — |
| | B-14 | — | — | — | — | — | — | — | — | — | — | — | — | — | 30 | — | — |
| | B-15 | — | — | — | — | — | — | — | — | — | — | — | — | — | — | 20 | — |
| Photosensitive polysiloxane (B') of Comparative Synthesis Example | B'-1 | — | — | — | — | — | — | — | — | — | — | — | — | — | — | — | — |
| | B'-2 | — | — | — | — | — | — | — | — | — | — | — | — | — | — | — | — |
| | B'-3 | — | — | — | — | — | — | — | — | — | — | — | — | — | — | — | — |
| Solvent (C) | C-1 | 1000 | — | 2000 | 2000 | — | 6000 | 2000 | 2000 | 2000 | — | — | 1000 | — | 6000 | 1000 | — |
| | C-2 | — | 2000 | — | 2000 | 3000 | — | 2000 | 2000 | — | 1000 | 2000 | 1000 | 1500 | 2000 | 2000 | 1000 |
| | C-3 | — | — | 1000 | — | 2000 | — | 3000 | — | — | — | 1000 | — | 1000 | — | — | 1500 |
| Additive (D) | D-1 | — | — | 2 | — | — | — | — | — | — | 3 | — | — | — | — | — | — |
| | D-2 | — | — | — | — | — | 1 | — | — | — | 2 | — | — | — | — | — | — |
| Evaluation Item | Reliability | ◎ | ◎ | ◎ | ◎ | ○ | ◎ | ◎ | ◎ | ○ | ◎ | ◎ | ◎ | ◎ | ◎ | ◎ | ◎ |
| | Residual image | ○ | ○ | ○ | ○ | ○ | ○ | ○ | ◎ | ○ | ◎ | ○ | ○ | ○ | ○ | ○ | ○ |

TABLE 4

| Component (unit: weight parts) | | Comparative example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Polymer (A) | A-1-1 | 100 | — | — | — | — | — | — | — | — | — | — |
| | A-1-2 | — | 100 | — | — | — | — | — | — | — | — | — |
| | A-1-3 | — | — | — | — | — | — | — | — | — | — | — |
| | A-1-4 | — | — | — | — | — | — | — | — | — | — | — |
| | A-1-5 | — | — | — | — | — | — | — | — | — | — | — |
| | A-1-6 | — | — | — | — | — | — | — | — | — | — | — |
| | A-1-7 | — | — | — | — | — | — | — | — | — | — | — |
| | A-1-8 | — | — | 100 | — | — | — | — | — | — | — | — |
| | A-1-9 | — | — | — | 100 | — | 100 | — | — | — | — | — |
| | A-1-10 | — | — | — | — | 100 | — | 100 | — | — | — | — |
| | A-2-1 | — | — | — | — | — | — | — | — | — | — | — |
| | A-2-2 | — | — | — | — | — | — | — | 100 | — | — | — |
| | A-2-3 | — | — | — | — | — | — | — | — | 100 | — | — |
| | A-2-4 | — | — | — | — | — | — | — | — | — | 100 | 100 |
| Photosensitive polysiloxane (B) | B-1 | — | — | — | — | — | — | — | — | — | — | — |
| | B-2 | — | — | — | — | — | — | — | — | — | — | — |
| | B-3 | — | — | — | — | — | — | — | — | — | — | — |
| | B-4 | — | — | — | — | — | — | — | — | — | — | — |
| | B-5 | — | — | — | — | — | — | — | — | — | — | — |
| | B-6 | — | — | — | — | — | — | — | — | — | — | — |
| | B-7 | — | — | — | — | — | — | — | — | — | — | — |
| | B-8 | — | — | — | — | — | — | — | — | — | — | — |
| | B-9 | — | — | — | — | — | — | — | — | — | — | — |
| | B-10 | — | — | — | — | — | — | — | — | — | — | — |
| | B-11 | — | — | — | — | — | — | — | — | — | — | — |
| | B-12 | — | — | — | — | — | — | — | — | — | — | — |
| | B-13 | — | — | — | — | — | — | — | — | — | — | — |
| | B-14 | — | — | — | — | — | — | — | — | — | — | — |
| | B-15 | — | — | — | — | — | — | — | — | — | — | — |
| Photosensitive polysiloxane (B') of Comparative Synthesis Example | B'-1 | 20 | — | — | — | — | — | — | — | — | — | — |
| | B'-2 | — | 20 | — | — | — | — | — | — | — | — | — |
| | B'-3 | — | — | 20 | — | 20 | 10 | — | — | — | — | 20 |
| Solvent (C) | C-1 | 1000 | — | 1000 | 2000 | 1000 | 1000 | 500 | 2000 | 2000 | 1500 | — |
| | C-2 | 1000 | 2000 | — | — | 1000 | 500 | — | — | 1000 | 1500 | 1000 |
| | C-3 | — | — | 1000 | — | — | — | 1500 | — | — | — | 1000 |
| Additive (D) | D-1 | — | — | — | — | — | — | — | — | — | — | — |
| | D-2 | — | — | — | — | — | — | — | — | — | — | — |
| Evaluation Item | Reliability | x | x | x | x | x | x | x | x | x | x | x |
| | Residual image | x | x | x | x | x | x | x | x | x | x | x |

<Evaluation Results>

It can be known from Table 3 and Table 4 that, in comparison to the LCD elements made using the liquid crystal alignment agent containing only the polymer (A) (Comparative Examples 1-11), the LCD elements made using the liquid crystal alignment agent containing the photosensitive polysiloxane (B) formed by polysiloxane containing an epoxy group, the cinnamic acid derivative and the aromatic heterocyclic derivative containing nitrogen, oxygen or sulfur (Examples 1-16) had higher reliability and less residual image.

Moreover, when the molar ratio (b-2)/(b-3) of the cinnamic acid derivative (b-2) to the aromatic heterocyclic derivative (b-3) containing nitrogen, oxygen or sulfur is 3 to 12 (Examples 2 to 4, 6 to 8, and 10 to 16), the reliability of the formed LCD elements is better.

Based on the above, since the liquid crystal alignment agent of the invention includes the photosensitive polysiloxane formed by reacting a polysiloxane containing an epoxy group, the cinnamic acid derivative and the aromatic heterocyclic derivative containing nitrogen, oxygen or sulfur, when the liquid crystal alignment agent is applied in a liquid crystal alignment film, the liquid crystal alignment film has higher reliability and causes less residual image, such that the liquid crystal alignment film is suitable for an LCD element.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A liquid crystal alignment agent, comprising:
    a polymer (A);
    a photosensitive polysiloxane (B); and
    a solvent (C),
    wherein the polymer (A) is obtained by reacting a first mixture that comprises a tetracarboxylic dianhydride component (a-1) and a diamine component (a-2),
    the photosensitive polysiloxane (B) comprises a functional group derived from a cinnamic acid derivative and a functional group derived from an aromatic heterocyclic derivative containing nitrogen, oxygen or sulfur, and is obtained by reacting a polysiloxane (b-1)

containing an epoxy group, a cinnamic acid derivative (b-2), and an aromatic heterocyclic derivative (b-3) containing nitrogen, oxygen or sulfur, wherein the aromatic heterocyclic derivative (b-3) containing nitrogen, oxygen or sulfur comprises a compound represented by formula (4), and

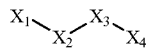
(4)

in formula (4),
X$_1$ represents a functional group having reactivity to epoxy group;
X$_2$ represents a single bond, or at least one divalent organic group selected from the group consisting of a C$_{1-20}$ aliphatic hydrocarbon group, a non-aromatic cyclic hydrocarbon group and an aromatic hydrocarbon group;
X$_3$ represents a single bond, or at least one divalent group selected from the group consisting of —O—, —NQ$^2$-, —CONQ$^2$-, -NQ$^2$CO—, —COO—, —OCO—, —CO—, —NQ$^2$(CH$_2$)$_r$— and —O(CH$_2$)$_r$—, wherein r represents an integer of 1 to 5, and Q$^2$ represents hydrogen or C$_{1-3}$ alkyl; and
X$_4$ represents an aromatic heterocyclic ring containing nitrogen, oxygen or sulfur, wherein the aromatic heterocyclic ring containing nitrogen contains at least one structure selected from the group consisting of formulae (4-I) and (4-III),

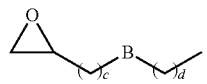
(4-I)

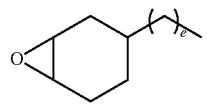
(4-III)

wherein Y$_1$ represents a C$_{1-5}$ straight or branched alkyl group.

2. The liquid crystal alignment agent of claim 1, wherein the polysiloxane (b-1) containing an epoxy group comprises at least one of a group represented by formula (2-1), a group represented by formula (2-2), and a group represented by formula (2-3),

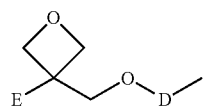
(2-1)

in formula (2-1), B represents —O— or a single bond, c represents an integer of 1 to 3, and d represents an integer of 0 to 6, wherein when d represents 0, B is a single bond;

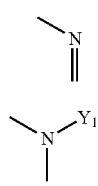
(2-2)

in formula (2-2), e represents an integer of 0 to 6;

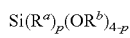
(2-3)

in formula (2-3), D represents C$_{2-6}$ alkylene, and E represents hydrogen or C$_{1-6}$ alkyl.

3. The liquid crystal alignment agent of claim 1, wherein the polysiloxane (b-1) containing an epoxy group comprises a copolymer obtained from hydrolysis and partial condensation of a second mixture, and the second mixture comprises a silane monomer (b-1-1) represented by formula (1-1), $$Si(R^a)_p(OR^b)_{4-p} \quad (1\text{-}1)$$

wherein in formula (1-1), each R$^a$ independently represents hydrogen, C$_{1-10}$ alkyl, C$_{2-10}$ alkenyl, C$_{6-15}$ aryl, an alkyl group containing an epoxy group, or an alkoxy group containing an epoxy group, wherein at least one R$^a$ is an alkyl group containing an epoxy group, or an alkoxy group containing an epoxy group; each R$^b$ independently represents hydrogen, C$_{1-6}$ alkyl, C$_{1-6}$ acyl, or C$_{6-15}$ aryl; p represents an integer of 1 to 3; when p represents 2 or 3, the plurality of R$^a$ can be the same or different; when p represents 1 or 2, the plurality of R$^b$ can be the same or different.

4. The liquid crystal alignment agent of claim 3, wherein based on a total amount of 1 mole of the monomers in the second mixture, the amount of the silane monomer (b-1-1) is 0.3 mole to 1.0 mole.

5. The liquid crystal alignment agent of claim 1, wherein the cinnamic acid derivative (b-2) is at least one compound selected from the group consisting of compounds represented by formula (3-1) to formula (3-2),

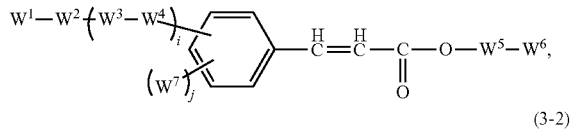
(3-1)

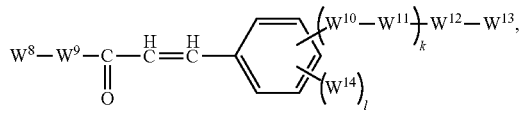
(3-2)

in formula (3-1),
W$^1$ represents hydrogen, C$_{1-40}$ alkyl, or a C$_{3-40}$ monovalent organic group containing an alicyclic group, wherein a part of or all of the hydrogen atoms of the alkyl are optionally substituted by fluorine atoms;
W$^2$ represents a single bond, —O—, —COO— or —OCO—;
W$^3$ represents a divalent aromatic group, a divalent alicyclic group, a divalent heterocyclic group, or a divalent fused-ring group;
W$^4$ represents a single bond, —O—, —COO— or —OCO—;
W$^5$ represents a single bond, methylene, C$_{2-10}$ alkylene, or a divalent aromatic group;
when W$^5$ represents a single bond, W$^6$ is hydrogen;

when $W^5$ represents methylene, $C_{2-10}$ alkylene or a divalent aromatic group, $W^6$ is carboxyl, hydroxyl, —SH, —NCO, —NHW, —CH=CH$_2$ or —SO$_2$Cl, wherein W represents hydrogen or $C_{1-6}$ alkyl;

$W^7$ represents fluorine or cyano;

i represents an integer of 0 to 3; and j represents an integer of 0 to 4;

in formula (3-2), $W^8$ represents $C_{1-40}$ alkyl or a $C_{3-40}$ monovalent organic group containing an alicyclic group, wherein a part of or all of the hydrogen atoms of the alkyl are optionally substituted by fluorine atoms;

$W^9$ represents —O—, or a divalent aromatic group;

$W^{10}$ represents —O—, —COO—, or —OCO—;

$W^{11}$ represents a divalent aromatic group, a divalent heterocyclic group, or a divalent fused-ring group;

$W^{12}$ represents a single bond, —OCO—(CH$_2$)$_e$—, or —O—(CH$_2$)$_g$—, wherein e and g each independently represent an integer of 1 to 10;

$W^{13}$ represents carboxyl, hydroxyl, —SH, —NCO, —NHW, —CH=CH$_2$, or —SO$_2$Cl, wherein W represents hydrogen or $C_{1-6}$ alkyl;

$W^{14}$ represents fluorine or cyano;

k represents an integer of 0 to 3; and l represents an integer of 0 to 4.

6. The liquid crystal alignment agent of claim 1, wherein $X_1$ represents at least one monovalent organic group selected from the group consisting of HO—, HNQ$^1$-, HCONQ$^1$-, HNQ$^1$CO— and HOCO—, wherein Q$^1$ represents hydrogen or $C_{1-3}$ alkyl.

7. The liquid crystal alignment agent of claim 1, wherein based on 100 weight parts of the polymer (A), an amount of the photosensitive polysiloxane (B) is 3 to 50 weight parts; and an amount of the solvent (C) is 1000 to 8000 weight parts.

8. The liquid crystal alignment agent of claim 1, wherein a molar ratio (b-2)/(b-3) of the cinnamic acid derivative (b-2) to the aromatic heterocyclic derivative (b-3) containing nitrogen, oxygen or sulfur is 2 to 20.

9. A liquid crystal alignment film formed by the liquid crystal alignment agent of claim 1.

10. A liquid crystal display element, comprising the liquid crystal alignment film of claim 9.

* * * * *